US009828957B2

(12) United States Patent
Fujino et al.

(10) Patent No.: US 9,828,957 B2
(45) Date of Patent: Nov. 28, 2017

(54) FUEL INJECTOR AND METHOD FOR MANUFACTURING FUEL INJECTOR

(75) Inventors: Tomoki Fujino, Okazaki (JP); Takashi Furukawa, Nisshin (JP); Yusuke Hongo, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 14/345,800

(22) PCT Filed: Sep. 12, 2012

(86) PCT No.: PCT/JP2012/005789
§ 371 (c)(1),
(2), (4) Date: Mar. 19, 2014

(87) PCT Pub. No.: WO2013/042335
PCT Pub. Date: Mar. 28, 2013

(65) Prior Publication Data
US 2014/0224903 A1  Aug. 14, 2014

(30) Foreign Application Priority Data

Sep. 20, 2011 (JP) ................................. 2011-204724
Mar. 29, 2012 (JP) ................................. 2012-077236
Jul. 18, 2012 (JP) ................................. 2012-159884

(51) Int. Cl.
*B05B 1/30* (2006.01)
*F02M 51/06* (2006.01)
(Continued)

(52) U.S. Cl.
CPC .... *F02M 51/0625* (2013.01); *F02M 21/0254* (2013.01); *F02M 21/0266* (2013.01);
(Continued)

(58) Field of Classification Search
CPC .................................................. F02M 51/061
(Continued)

(56) References Cited

U.S. PATENT DOCUMENTS 5,836,521 A * 11/1998 Holm et al. ................... 239/584
6,213,413 B1 * 4/2001 Kojima .............. F02M 51/0667
239/533.11
2007/0029413 A1 * 2/2007 Nakajima .......... F02M 21/0254
239/585.5

FOREIGN PATENT DOCUMENTS

JP        5-6150      1/1993
JP     11-157436      6/1999
(Continued)

OTHER PUBLICATIONS

International Search Report for PCT/JP2012/005789, dated Oct. 9, 2012.
(Continued)

*Primary Examiner* — Arthur O Hall
*Assistant Examiner* — Adam J Rogers
(74) *Attorney, Agent, or Firm* — Nixon & Vanderhye P.C.

(57) ABSTRACT

A fuel injector 100 includes a nozzle member 60 having a fuel passage 60a leading to an injection port 60b; a valve main body 51 adapted to reciprocate for opening and closing the fuel passage 60a; an elastic portion 56 elastically deformable in closing the fuel passage 60a by movement of the valve main body 51 in a closing direction, the elastic member being attached to one of the nozzle member 60 and the valve main body 51 and adapted to be abutted against the other of the nozzle member 60 and the valve main body 51 to close the fuel passage 60a by moving the valve main body 51 in the closing direction; and a stopper 70 adapted to restrict movement of the valve main body 51 in the closing direction by being abutted against the valve main body 51, the stopper 70 being formed of material different from the nozzle member 60.

23 Claims, 22 Drawing Sheets

(51) Int. Cl.
*F02M 61/18* (2006.01)
*F02M 61/16* (2006.01)
*F02M 21/02* (2006.01)
*F02M 61/08* (2006.01)

(52) U.S. Cl.
CPC .... *F02M 21/0269* (2013.01); *F02M 51/0664* (2013.01); *F02M 51/0682* (2013.01); *F02M 51/0685* (2013.01); *F02M 61/08* (2013.01); *F02M 61/166* (2013.01); *F02M 61/1893* (2013.01); *F02M 21/0212* (2013.01); *F02M 2200/9015* (2013.01); *Y02T 10/32* (2013.01); *Y10T 29/49002* (2015.01)

(58) Field of Classification Search
USPC ..................................................... 239/585.1
See application file for complete search history.

(56) References Cited

FOREIGN PATENT DOCUMENTS

| | | |
|---|---|---|
| JP | 2001-141061 | 5/2001 |
| JP | 2002-227742 | 8/2002 |
| JP | 2007-321677 | 12/2007 |
| JP | 2009-180137 | 8/2009 |
| JP | 2011-132974 | 7/2011 |

OTHER PUBLICATIONS

Written Opinion of the ISA for PCT/JP2012/005789, dated Oct. 9, 2012.

\* cited by examiner

PRIOR ART

FUEL INJECTOR AND METHOD FOR MANUFACTURING FUEL INJECTOR

CROSS REFERENCE TO RELATED APPLICATION

This application is the U.S. national phase of International Application No. PCT/JP2012/005789 filed 12 Sep. 2012 which designated the U.S. and claims priority to Japanese Patent Applications No. 2011-204724 filed on Sep. 20, 2011, Japanese Patent Application No. 2012-77236 filed on Mar. 29, 2012, and Japanese Patent Application No. 2012-159884 filed on Jul. 18, 2012, the disclosures of which are incorporated herein by reference.

TECHNICAL FIELD

The present disclosure relates to a fuel injector for injecting fuel to an internal combustion engine, and a method for manufacturing the fuel injector.

BACKGROUND

Patent Literature 1 discloses a fuel injector in which either a seat portion of a valve body or a valve seat of a valve seat formation portion is formed of an elastic member. Further, Patent Literature 1 also discloses a technique for providing a stopper for restricting movement of the valve body toward the valve seat when a predetermined increase in stroke of the valve body is reached even though the seat portion is repeatedly attached on and detached from the valve seat to generate a compression permanent deformation in the elastic member.

Patent Literatures 2 and 3 disclose a gas cutoff valve in which a valve body is provided with a seal member formed of elastic material, and being attachable/detachable on/from a valve seat. As described in Patent Literature 2, a sizing portion is provided on the valve seat for defining a crushing margin of the seal member when the seal member sits on the valve seat. Thus, the crushing margin of the seal member is defined upon closing the valve.

In the fuel injector disclosed in Patent Literature 1, however, the stroke of the valve body immediately after manufacturing the fuel injector differs from that of the valve body after the compression permanent deformation occurs in the elastic member, which varies a quantity of the fuel injected. Specifically, by repeatedly opening and closing the fuel injector, the elastic member may wear, so that the crushing margin may be varied. Also, a variation in fuel pressure may vary the crushing margin of the elastic member.

The cutoff valve disclosed in Patent Literature 2, upon closing the valve, the valve body is abutted against the sizing portion (protrusion) to stabilize the crushing margin of the seal member. Even in use of the elastic member as the seal member, the changes in stroke of the valve body can be suppressed. In the cutoff valve, however, the sizing portion for defining the crushing margin of the seal member is integral with a member for forming the valve seat on which the seal member is to sit. In use of the sizing portion for defining the crushing margin of the seal member, the crushing margin depends on the relative positions of the sizing portion and the valve seat in the direction along the movement direction of the valve body. When the sizing portion and the valve seat are formed from one member, even though the dimensional accuracy of the sizing portion and valve seat is enhanced, a large dimension error of the seal member may vary the crushing margin of an individual product. In order to set the crushing margin to the same level for each product, the dimensional accuracy of the seal member has to be enhanced in the same way as other components. However, in general, it is difficult to improve the dimensional accuracy of the elastic member.

PRIOR ART LITERATURES

Patent Literature

Patent Literature 1: JP-A No. 2002-227742
Patent Literature 2: JP-A No. 2011-132974
Patent Literature 3: JP-U No. H5(1993)-6150

SUMMARY OF THE INVENTION

It is an object of the present disclosure to provide a fuel injector that can stabilize the amount of fuel injected without increasing the dimensional accuracy of the elastic member so much, and a method for manufacturing the fuel injector.

According to the present disclosure, a movement restricting portion (70, 570) abutted against a valve member for restricting movement of the valve member in the closing direction is formed of material different from a passage formation portion (60, 161, 560, 661) with a fuel passage (60a, 161a, 560a, 661a) leading to an injection port (60b, 570b).

In a related-art structure including a passage formation portion and a movement restricting portion formed of the same material, in order to set a crushing margin of an elastic member to a predetermined value in the closed state of a fuel passage, it is necessary to increase the dimensional accuracy of the members for forming the passage formation portion and movement restricting portion to thereby improve the accuracy of the relative positions of the passage formation portion and the movement restricting portion, and also to increase the dimensional accuracy of the elastic member.

In the present disclosure, the passage formation portion (60, 161, 560, 661) and the movement restricting portion (70, 570) are formed of different materials. With this arrangement, only by changing the relative positional relationship between the passage formation portion and the movement restricting portion, the relative positions of the passage formation portion and movement restricting portion can be adjusted when providing the passage formation portion and movement restricting portion in the main body. For this reason, the crushing margin of the elastic member can be adjusted to the predetermined value without increasing the dimensional accuracy of at least the elastic member as much as in the related art to thereby stabilize the amount of fuel injected.

Following structures are added to the feature of the above configuration described above, following effects can be achieved. That is, the movement restricting portion is abutted against the valve member in a position where the crushing margin of the elastic member due to the elastic deformation of the elastic member reaches a predetermined value with a fuel passage closed by movement of the valve member to thereby restrict the movement of the valve member in the closing direction.

The movement restricting portion (70, 570) is abutted against the valve member in a position where the crushing margin of the elastic member (56, 156, 556, 656) reaches a predetermined value with a fuel passage (60a, 161a, 560a, 661a) closed by movement of the valve member (51, 150, 551, 650) to thereby restrict the movement of the valve member in the closing direction, which stabilizes the crushing margin of the elastic member in the closing state of the fuel passage. This arrangement suppresses the change in crushing margin due to variations in pressure of fuel flowing into the fuel injector, the change in crushing margin due to wear of the elastic member caused by the repeated opening and closing of the fuel passage, and the influences of the compression permanent deformation, thus restricting changes in stroke of the valve member to stabilize the amount of fuel injected.

A general electromagnetic fuel injector in the related art includes a valve body reciprocatingly disposed in a body, and driving means for driving the valve body using an electromagnetic attractive force. A fuel passage is opened and closed by connecting and disconnecting a body seat portion provided in the body with respect to a movable seat portion provided in the valve body.

The body seat portion and the movable seat portion are repeatedly abutted against each other and both are formed of metal with excellent resistance to wear. If both seat portions are made of metal to be metal seal valve portions, the high sealability is difficult to be obtained.

As shown in FIG. 27, a fuel injector is proposed which includes an elastic seal valve portion $91x$ having one seal portion made of elastic material, such as rubber, on the upstream side of a fuel flow with respect to a metal seal valve portion $90x$, thereby improving the sealability (see, for example, Patent Literature 3)

The conventional fuel injector, however, needs to strictly manage the amount of deformation of the elastic material upon closing the valve in order to highly accurately control the set load of the metal seal valve portion $90x$ and the set load of the elastic seal valve portion $91x$. For this reason, it is necessary to strictly manage a distance $L1x$ between two seat portions of a body $92x$ and a distance $L2x$ between two seat portions of a valve body $93x$. Thus, the body $92x$ and valve body $93$ are required to be processed with high accuracy.

In view of the foregoing points, it is an object of the present disclosure to easily manage the set load of the metal seal valve portion and the set load of the elastic seal valve portion with high accuracy without needing the high-accuracy processing of the body and valve body.

In order to achieve the above object, a fuel injector includes an upstream-movable-seat portion ($40x$, $310x$, $311x$) provided in a metal movable portion ($3x$, $4x$) which reciprocates, and a downstream-movable-seat portion ($320x$) downstream of the upstream-movable-seat portion ($40x$, $310x$, $311x$) with respect to a fuel flow. An upstream-body-seat portion ($141x$, $150x$, $151x$) is provided to a metal body ($1x$), and a downstream-body-seat portion ($140x$, $152x$) is provided downstream of the upstream-body-seat portion ($141x$, $150x$, $151x$) with respect to the fuel flow. One of the upstream-movable-seat portion ($40x$, $310x$, $311x$) and the upstream-body-seat portion ($141x$, $150x$, $151x$), or one of the downstream-movable-seat portion ($320x$) and the downstream-body-seat portion ($140x$, $152x$) is formed of elastic material with more excellent elasticity than metal. A fuel passage is opened and closed by connection and disconnection between the upstream-movable-seat portion ($40x$, $310x$, $311x$) and the upstream-body-seat portion ($141x$, $150x$, $151x$). Also the fuel passage is opened and closed by connection and disconnection between the downstream-movable seat portion ($320x$) and the downstream-body-seat portion ($140x$, $152x$). The movable portion ($3x$, $4x$) is urged by a spring ($5x$) in a direction for closing the valve. The body ($1x$) includes a first body ($14Ax$, $15x$) provided with the upstream-body-seat portion ($141x$, $150x$, $151x$), and a second body ($14x$, $15Ax$) provided with the downstream-body-seat portion ($140x$, $152x$). The first body ($14Ax$, $15x$) and the second body ($14x$, $15Ax$) are separately formed and then integrated together.

With this arrangement, in the assembly stage, the relative positions of the first body ($14Ax$, $15x$) and the second body ($14x$, $15Ax$) can be adjusted to easily manage a set load on an elastic seal valve portion comprised of the upstream-movable-seat portion ($40x$, $310x$, $311x$) and an upstream-body-seat portion ($141x$, $150x$, $151x$) with high accuracy. Another set load on a metal seal valve portion comprised of a downstream-movable seat portion ($320x$) and a downstream-body-seat portion ($140x$, $152x$) can be easily adjusted with high accuracy even though the body ($1x$) and the movable portion ($3x$, $4x$) are not formed with high accuracy. Alternatively, a set load on an elastic seal valve portion comprised of the downstream-movable seat portion ($320x$), and a downstream-body seat portion ($140x$, $152x$), and another set load on a metal seal valve portion comprised of an upstream-movable seat portion ($40x$, $310x$, $311x$) and an upstream-body seat portion ($141x$, $150x$, $151x$) can be easily managed with high accuracy.

Following structures are added to the feature of the above configuration described above, following effects can be achieved. That is, the upstream-body-seat portion ($150x$, $151x$) and the downstream-body-seat portion ($140x$) are tapered, and a taper angle of the upstream-body-seat portion ($150x$, $151x$) is larger than that of the downstream-body-seat portion ($140$).

Thus, the seat diameter of the elastic seal valve portion can be smaller than that of the metal seal valve portion, which can reduce the force required to open the valve.

The upstream-movable-seat portion ($40x$, $310x$, $311x$) and the downstream-movable-seat portion ($320x$) may be disposed in a reciprocating direction of the movable portion ($3x$, $4x$), and the fuel passage may be opened by moving the movable portion ($3x$, $4x$) in a direction from the upstream-movable-seat portion ($40x$, $310x$, $311x$) toward the downstream-movable-seat portion ($320x$).

With this arrangement, the so-called outward opening valve can be configured.

The upstream-movable-seat portion ($310x$) and the downstream-movable-seat portion ($320x$) may be disposed in a reciprocating direction of the movable portion ($3x$, $4x$), and the fuel passage may be opened by moving the movable portion ($3x$, $4x$) in a direction from the downstream-movable-seat portion ($320x$) toward the upstream-movable-seat portion ($310x$).

With this arrangement, the so-called inward opening valve is configured, which can produce the fuel injector with an injection port.

The first body ($14Ax$, $15x$) and the second body ($14x$, $15Ax$) may be integral with each other by full-circuit welding.

This arrangement can seal between the first body ($14Ax$, $15x$) and the second body ($14x$, $15Ax$) without using a seal member.

The first body ($14Ax$, $15x$) and the second body ($14x$, $15Ax$) may be integral with each other by intermittent welding, and a clearance between the first body ($14Ax$, $15x$) and the second body ($14x$, $15Ax$) is sealed by a seal member ($8x$).

This method can reduce a welding cost as compared to full-circle welding.

The spring ($5x$) is a coil spring, and the movable portion ($3x$, $4x$) is disposed to penetrate the spring ($5x$). The upstream-movable-seat portion (40*x*, 310*x*) may be positioned upstream of the spring (5*x*) with respect to the fuel flow. The downstream-movable-seat portion (320*x*) may be positioned downstream of the spring (5*x*) with respect to the fuel flow.

In use of the fuel injector for direct injection, the heat of the combustion gas at high temperature might erode the seat portion formed of elastic material. The seat portion formed of elastic material can stay away from the heat of the combustion gas, thereby preventing erosion of the seat portion.

The upstream-movable-seat portion (40*x*, 310*x*) can be formed of elastic material.

The upstream-body-seat portion (151*x*) can be formed of elastic material.

Gas fuel can be used as the fuel.

BRIEF DESCRIPTION OF DRAWINGS

The above and other objects, features and advantages of the present disclosure will become more apparent from the following detailed description made with reference to the accompanying drawings. In the drawings.

FIRST EMBODIMENT

Figure 1:
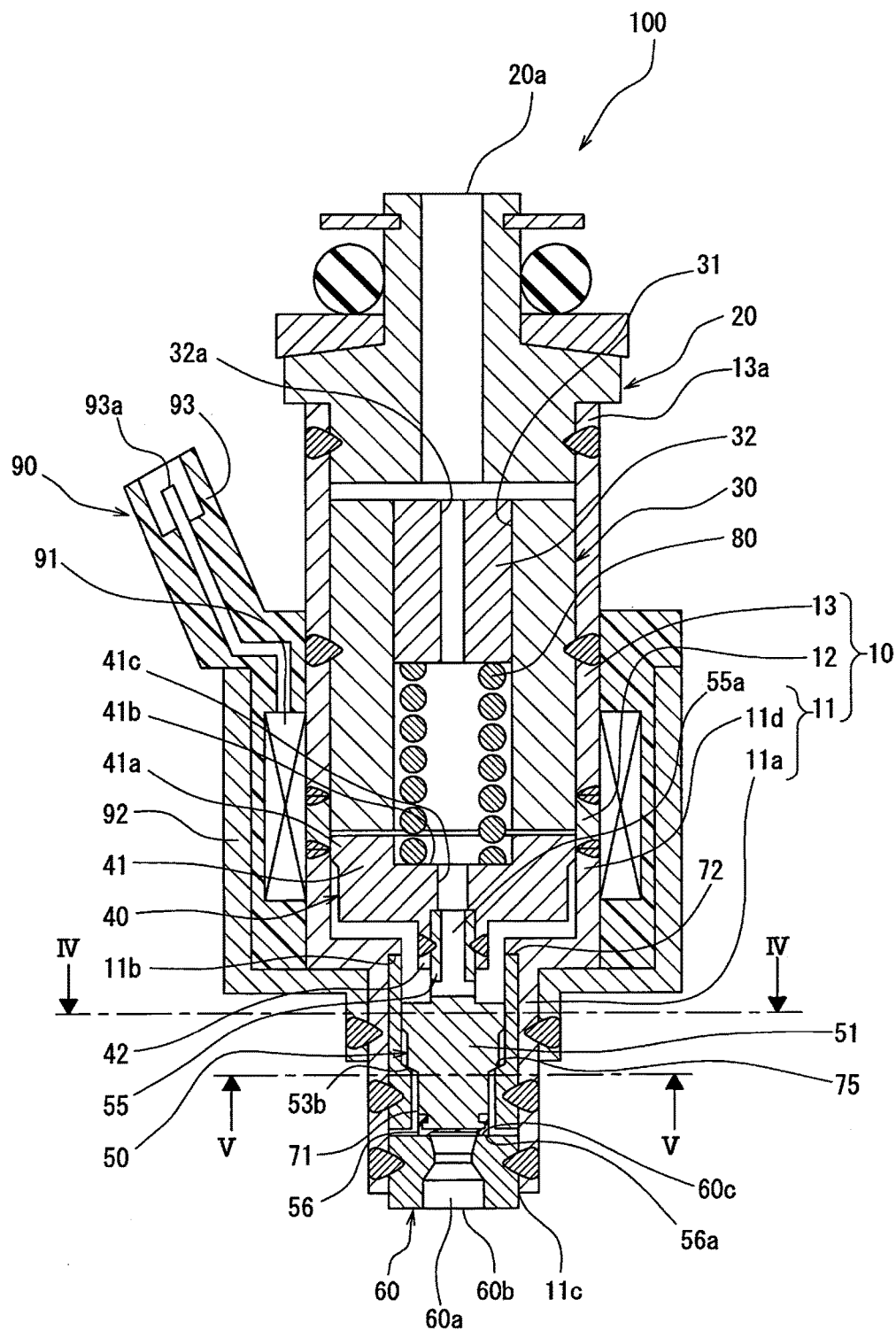
FIG. 1 is a cross-sectional view showing the structure of a fuel injector, and taken along a line I-I of FIG. 4, according to a first embodiment.

A fuel injector 100 shown in FIG. 1 is installed in an engine functioning as an internal combustion engine, and serves to inject gas fuel, such as CNG (Compressed Natural Gas), LNG (Liquefied Natural Gas), or hydrogen gas, into a combustion chamber of the engine. Now, the structure of the fuel injector 100 will be described below using FIGS. 1 to 6. The fuel injector 100 includes a housing 10, an inlet member 20, a fixed core 30, a movable core 40, a valve body 50, a nozzle member 60, a stopper 70, and a driving unit 90.

The housing 10 is entirely formed cylindrically, and has both its ends in the axial direction opened. The housing 10 has a first magnetic portion 11, a non-magnetic portion 12, and a second magnetic portion 13 in this order from one end to the other end in the axial direction. The first and second magnetic portions 11 and 13 formed of ferrite-based stainless steel functioning as a magnetic material are connected by laser welding or the like to the non-magnetic portion 12 formed of austenite-based stainless steel as a non-magnetic material. The non-magnetic portion 12 can prevent a short-circuiting of magnetic flux between the first magnetic portion 11 and the second magnetic portion 13.

The first magnetic portion 11 has a large-diameter portion 11*d* connected to the non-magnetic portion 12, and a small-diameter portion 11*a* having an outer diameter smaller than that of the large-diameter portion 11*d*. The nozzle member 60 is provided at one end of the small-diameter portion 11*a* opposite to the non-magnetic portion 12, that is, at the opening 11*c* formed downstream of a fuel flow within the housing 10. The stopper 70 is provided between one end and the other end of the housing 10 in the axial direction. The inlet member 20 is provided at an end 13*a* of the second magnetic portion 13 opposite to the non-magnetic portion 12.

The inlet member 20 is cylindrically formed and has an inlet 20*a* formed at its center in the diameter direction so as to allow fuel supplied from a fuel pump through a fuel pipe to the fuel injector 100. The inlet member 20 is connected and fixed to the end 13*a* of the second magnetic portion 13 by laser welding or the like.

The fixed core 30 is cylindrically formed of ferrite stainless steel functioning as magnetic material, and coaxially fixed to the inner peripheral walls of the non-magnetic portion 12 and the second magnetic portion 13. The fixed core 30 is provided with a receiving hole 31 axially penetrating the center in a radial direction. A spring 80 made of a coil spring as an urging member is accommodated in the receiving hole 31, in an elastically deformable manner, and an adjusting pipe 32 for adjusting a set load on the spring 80 is fixed by being press-fitted thereinto. The spring 80 has its one end supported by the adjusting pipe 32. The adjusting pipe 32 is formed cylindrically, and provided with a through hole 32a axially penetrating the center in the radial direction. With this arrangement, the fuel flowing through the inlet member 20 flows into the receiving hole 31. Then, the fuel flowing into the receiving hole 31 is discharged from the end of the fixed core 30 on the nozzle member 60 through the through hole 32a.

The movable core 40 is cylindrically formed of ferrite stainless steel functioning as magnetic material. The movable core 40 is coaxially accommodated in the inner periphery of the housing 10, and positioned above the nozzle member 60 rather than the fixed core 30.

The movable core 40 has a core main body 41 cylindrically formed. The core main body 41 has on its outer periphery wall, a guide portion 41a for guiding along the respective inner peripheral walls of the large-diameter portion 11d of the first magnetic portion 11 and the non-magnetic portion 12. With this arrangement, the movable core 40 axially reciprocates by being guided by the guide portion 41a along the respective inner peripheral walls of the large-diameter portion 11d and the non-magnetic portion 12.

A seat portion 41b is formed at the end of the core main body 41 on the fixed core 30. The seat portion 41b serves to support the end of the spring 80 on the nozzle member 60 at the center in the radial direction of the seat portion. Thus, the movable core 40 is constantly subjected to an urging force in a direction toward the nozzle member 60 according to the set load on the spring 80.

The core main body 41 is provided with a through hole 41c axially penetrating its center in a radial direction. The through hole 41c allows the fuel discharged toward the nozzle member 60 of the fixed core 30 via the receiving hole 31 to flow toward the nozzle member 60 in the movable core 40 through the through hole 41c.

The movable core 40 has a cylindrical receiving portion 42 protruding from the core main body 41 toward the nozzle member 60 coaxially with respect to the through hole 41c of the core main body 41. The receiving portion 42 accommodates a part of a coupling portion 55 of the valve body 50 to be described later. The coupling portion 55 is connected and fixed to the receiving portion 42 by laser welding or the like. The axial reciprocating movement of the movable core 40 causes the valve body 50 to reciprocate in the axial direction together with the movable core 40.

The valve body 50 is entirely formed in a stick-like shape, coaxially accommodated on the inner periphery of the first magnetic portion 11, and positioned above the nozzle member 60 with respect to the movable core 40. The valve body 50 reciprocates in the axial direction to open and close a fuel passage 60a formed in the nozzle member 60 to be described later, discontinuously injecting the fuel from the injection port 60b into the combustion chamber.

Figure 3:
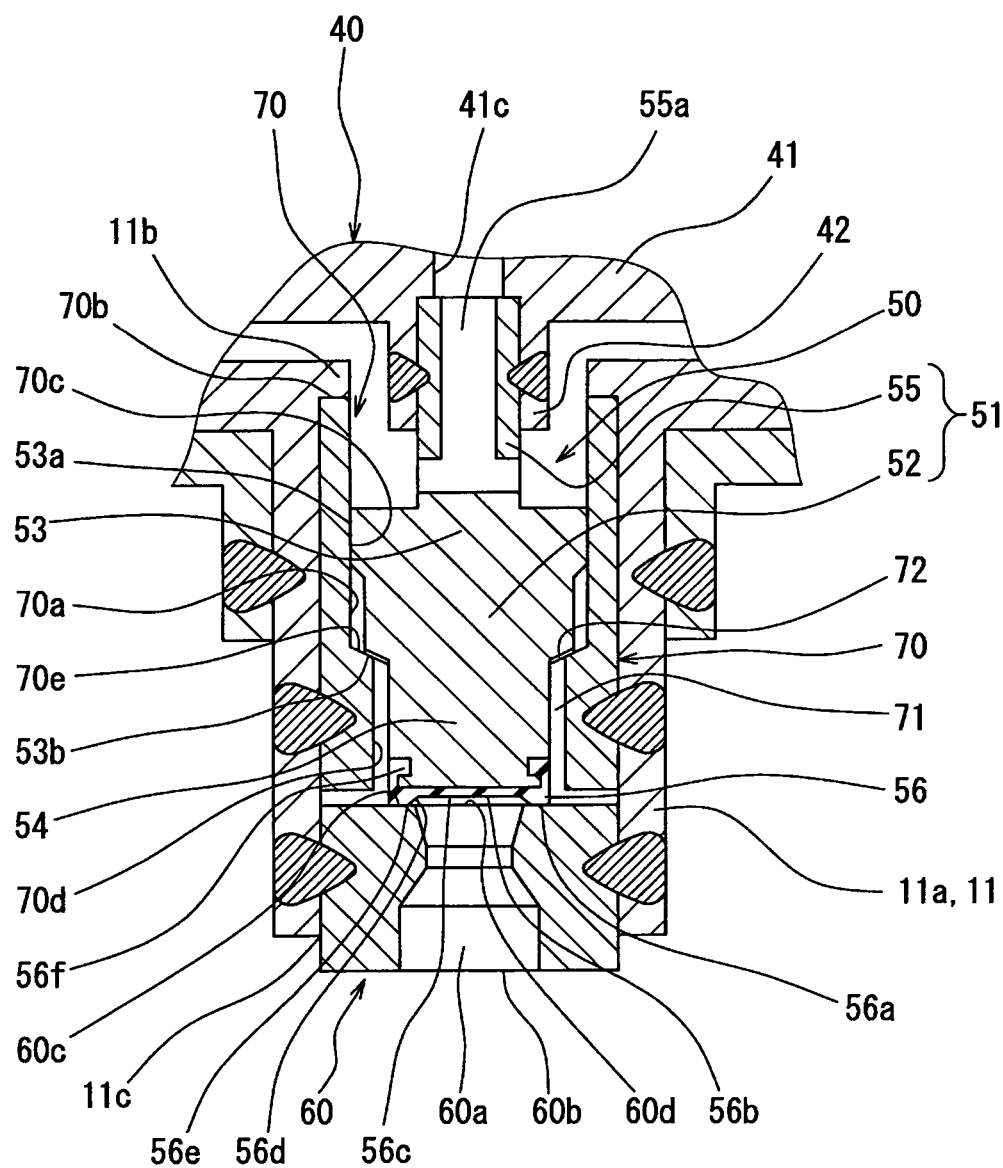
FIG. 3 is an enlarged cross-sectional view of the structure of the fuel injector in the first embodiment.

As shown in FIG. 3, the valve body 50 has a valve main body 51 coupled with the movable core 40. The valve main body 51 is formed in the stick-like shape of a martensite-based stainless steel functioning as the non-magnetic material. The valve main body 51 includes a stick-like coupling portion 55 coupled to the movable core 40, and a support portion 52 positioned above the nozzle member 60 with respect to the coupling portion 55 with the elastic portion 56 to be described later attached, and adapted to support the elastic portion 56.

The coupling portion 55 is provided with a fuel passage 55a for making a space within the through hole 41c of the movable core 40 communicate with a space between the movable core 40 and the support portion 52 on the outer periphery of the coupling portion 55. Thus, the fuel flowing into the fuel passage 55a through the through hole 41c is discharged into the space between the movable core 40 and the support portion 52 on the outer periphery of the coupling portion 55.

Figure 2:
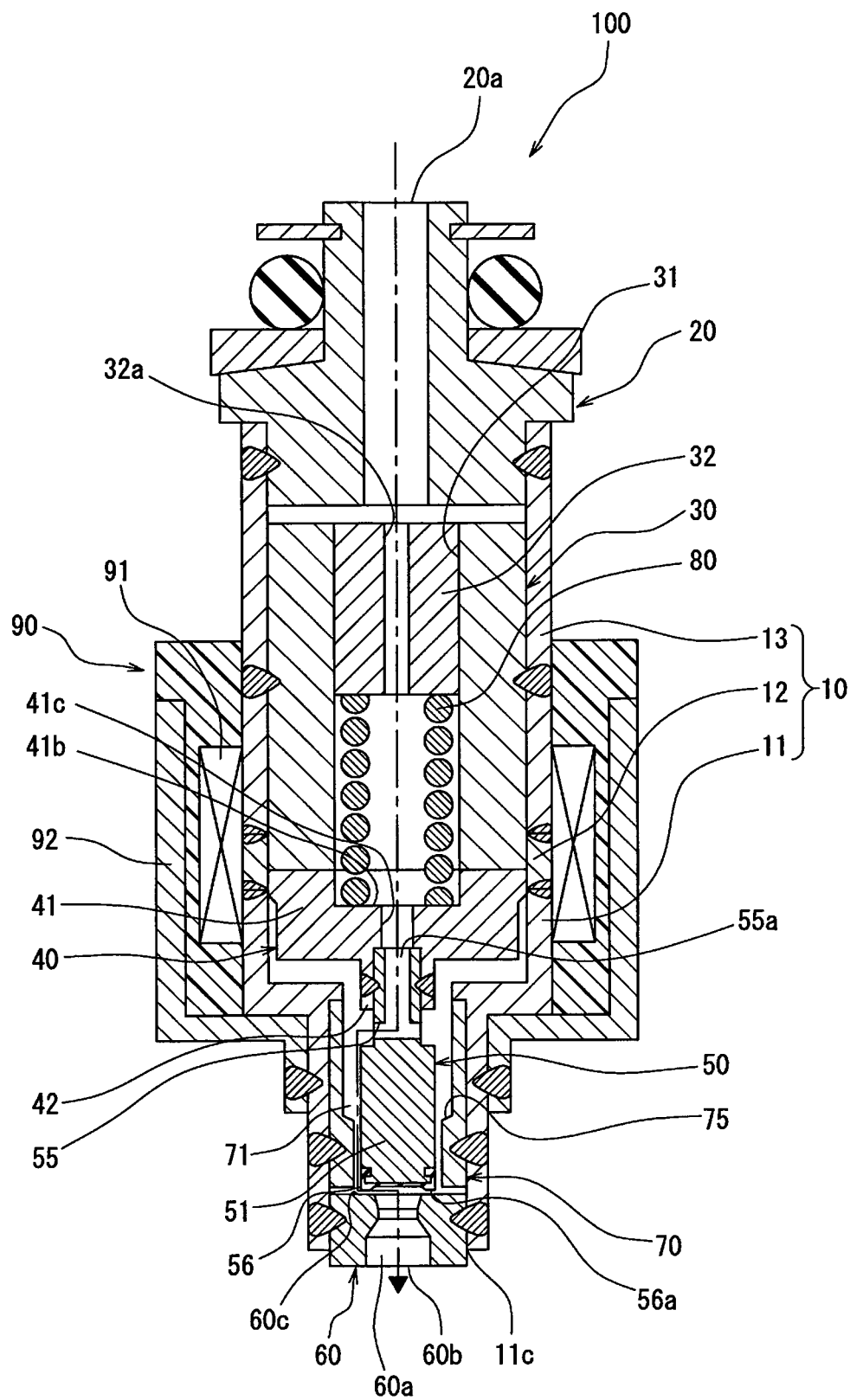
FIG. 2 is a cross-sectional view showing the structure of the fuel injector, and taken along the line II-II of FIG. 4, according to the first embodiment.

The support portion 52 includes a quadrangular prism portion 53 positioned above the coupling portion 55, and has a columnar portion 54 positioned above the nozzle member 60 with respect to the quadrangular prism portion 53. The guide portion 53a is provided at the corner of a side surface of the quadrangular prism portion 53 to be guided along the inner peripheral wall of the stopper 70 which is provided coaxially with respect to the small-diameter portion 11a of the first magnetic portion 11. Thus, the valve body 50 can reciprocate along the axial direction by the guide portion 53a along the inner peripheral wall of the stopper 70. The corner at the bottom of the quadrangular prism portion 53 on the nozzle member 60 is provided with an abutment surface 53b against which the stopper 70 is abutted by the movement of the valve body 50 toward the nozzle member 60 as will be described later. The abutment surface 53b is abutted against the stopper 70, restricting the movement of the valve body 50 toward the nozzle member 60, that is, the movement of the valve body 50 in the closing direction. As shown in FIGS. 1 to 3, the abutment surface 53b is inclined toward the nozzle member 60.

The columnar portion 54 has its cross-sectional shape inscribed in a section of the quadrangular prism portion 53 in the direction intersecting its axial direction. The diameter of the columnar portion 54 is set to such a size that allows the fuel to pass through between the columnar portion 54 and the inner peripheral wall of the stopper 70.

The elastic portion 56 is attached at the end of the columnar portion 54 on the nozzle member 60. The elastic portion 56 is formed in a disk-like shape to provide a seat portion 56a in the position opposed to the nozzle member 60. The elastic portion 56 is made of an elastic member elastically deformable by attaching and detaching of the valve body 50 on and from the nozzle member 60. In the present embodiment, the elastic portion 56 is made of fluorine rubber with excellent resistance to low temperature and to oil. When injecting a fuel by use of gas fuel as the fuel, the pressure of the fuel around the injection port 60b is decreased, which results in a temperature of the fuel near the injection port 60b of about −30° C. to −40° C. The fluorine rubber serving as the elastic portion 56 is material that is elastically deformable under the circumstance at ultralow temperature, such as that described above, thereby ensuring the sealability. The elastic portion 56 is attached to the end of the columnar portion 54 on the nozzle member 60 by insert molding.

The outer peripheral surface of the columnar portion 54 is provided with a groove recessed in the direction intersecting the reciprocating direction of the valve body 50. On the other hand, the elastic portion 56 has on its periphery, anchors 56f arranged to fit into the groove of the columnar portion 54. Thus, the elastic portion 56 is solidly fixed to the support portion 52. Particularly, the fixing strength in the reciprocating direction of the valve body 50 is increased.

A ring-like seat portion 56a is formed at one surface of the elastic portion 56 opposed to the nozzle member 60 to protrude toward the nozzle member 60 at the outer periphery of the surface. The seat portion 56a has on its inner peripheral, a recessed portion 56b recessed opposite to the nozzle member 60. The diameter of the inner peripheral surface 56d formed at the periphery of the bottom 56c of the recessed portion 56b is larger than that of an opening portion 60d on the valve body 50 of the fuel passage 60a of the nozzle member 60. The diameter of the inner peripheral surface 56d can be set by the range of the outer diameter of the elastic portion 56. The seat portion 56a is formed on the outer periphery of the recessed portion 56b at the surface of the elastic portion 56 facing the nozzle member 60. A corner 56e of the inner peripheral surface 56d on the nozzle member 60 can be abutted so as to enclose the outer periphery of the opening 60d. That is, the seat portion 56a can be abutted so as to enclose the outer periphery of the opening 60d. In this way, the fuel passage 60a is closed. The inner peripheral surface 56d of the recessed portion 56b is inclined such that the depth of the recessed portion 56b gradually becomes deeper toward the center in the radical direction of the recessed portion 56b.

The nozzle member 60 is cylindrically formed of a martensite-based stainless steel functioning as the non-magnetic material. The fuel passage 60a is formed to axially penetrate the center in the radial direction of the nozzle member 60. In the present embodiment, the nozzle member 60 is formed of material different from that of the housing 10 and the stopper 70. The nozzle member 60 is inserted from the opening 11c formed at one end of the small-diameter portion 11a of the first magnetic portion 11, and connected and fixed to the opening 11c by the laser welding and the like. A valve seat 60c attachable and detachable to and from the seat portion 56a is formed at the peripheral edge of the opening of the fuel passage 60a at the end surface of the nozzle member 60 on the valve body 50. The valve body 50 of the fuel passage 60a has the injection port 60b for injecting the fuel therefrom on its end opposite to the valve body 50.

The seat portion 56a is adapted to close the fuel passage 60a by a closing operation including causing the seat portion to stand on the valve seat 60c as shown in FIG. 1. In this way, the flow of fuel into the injection port 60b is stopped. At this time, the elastic portion 56 is elastically deformed according to the amount of movement of the valve body 50. On the other hand, as shown in FIG. 2, the seat portion 56a is adapted to open the fuel passage 60a by an opening operation including detaching the seat portion from the valve seat 60c. In this way, the fuel is allowed to flow into the injection port 60b.

The stopper 70 is formed in the cylindrical shape of a martensite-based stainless steel functioning as the non-magnetic material. The stopper 70 has the receiving hole 70a for receiving the support portion 52 of the valve body 50, at the center in the radial direction of the stopper 70. In the present embodiment, the stopper 70 is formed of material different from that of the housing 10.

The stopper 70 is positioned with respect to the housing 10 while the end surface 70b on the movable core 40 is abutted against a stepped portion 11b formed at the inner peripheral wall of the small-diameter portion 11a. The stopper 70 is connected and fixed to the small-diameter portion 11a by the laser welding or the like while the stopper is positioned in the housing 10. The receiving hole 70a has a circular cross-sectional shape in the direction intersecting the axial direction. The receiving hole 70a forms a first inner peripheral surface 70c on the movable core 40, and forms a second inner peripheral surface 70d on the nozzle member 60, the second inner peripheral surface having an inner diameter smaller than that of the first inner peripheral surface 70c.

Figure 4:
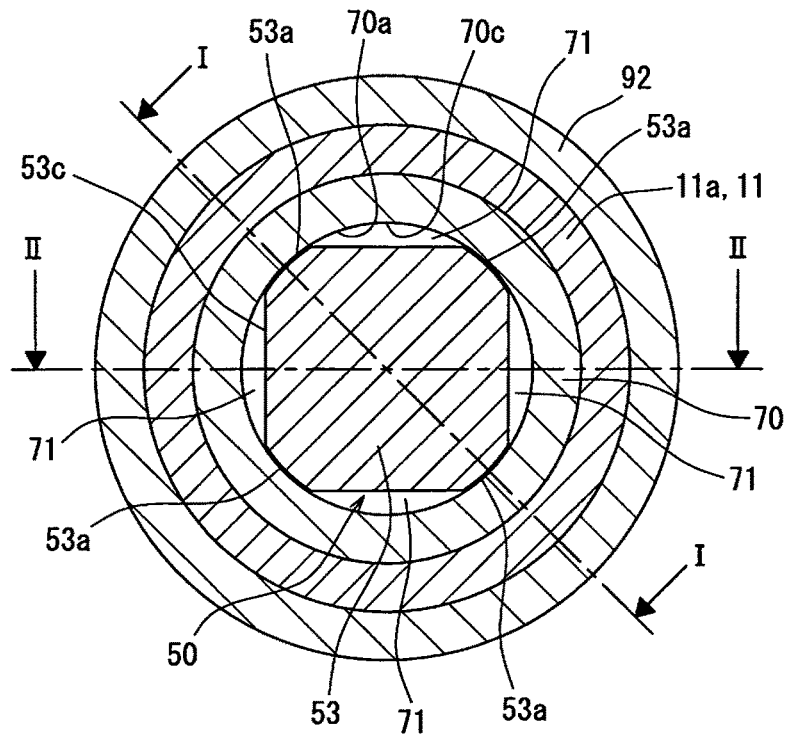
FIG. 4 is a cross-sectional view showing the structure of the fuel injector, and taken along the line IV-IV of FIG. 1 in the first embodiment.
Figure 5:
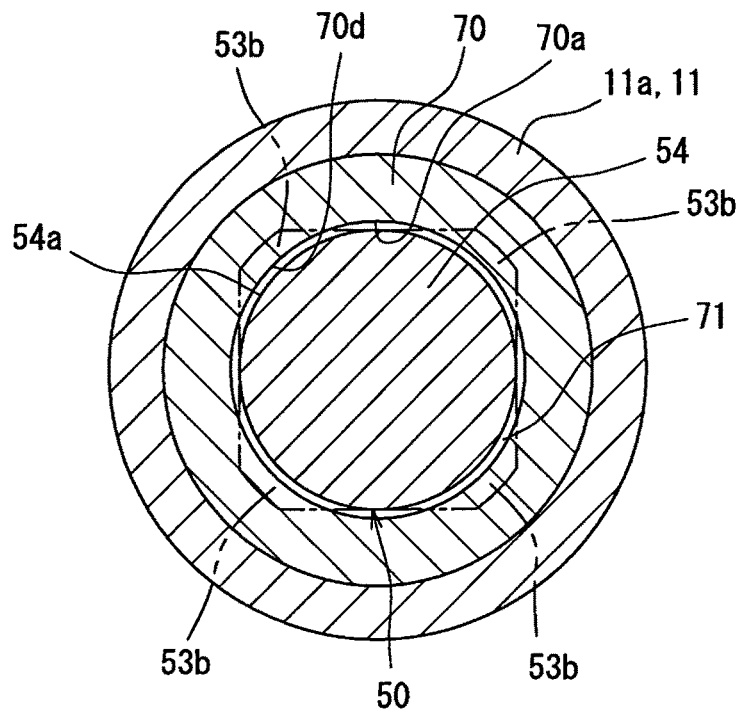
FIG. 5 is a cross-sectional view showing the structure of the fuel injector, and taken along the line V-V of FIG. 1 in the first embodiment.

As shown in FIGS. 3 and 4, the quadrangular prism portion 53 of the valve body 50 is accommodated on the inner periphery of the first inner peripheral surface 70c, and the first inner peripheral surface 70c guides all guide portions 53a provided at four corners of the outer peripheral surface 53c of the quadrangular prism portion 53. As shown in FIGS. 3 and 5, the columnar portion 54 of the valve body 50 and the elastic portion 56 are accommodated on the inner periphery of the second inner peripheral surface 70d. The diameter of the part of the second inner peripheral surface 70d is set to form a clearance in between the outer peripheral surface 54a of the columnar portion 54 and the second inner peripheral surface that enables the fuel to flow through the nozzle member 60. In the direction intersecting the axial direction, the first inner peripheral surface 70c has a circular shape, and the quadrangular prism portion 53 has a quadrilateral shape, which forms a clearance between the first inner peripheral surface 70c and a part of the outer peripheral surface 53c of the quadrangular prism portion 53 except for the guide portions 53a, and also forms another clearance between the second inner peripheral surface 70d and the outer peripheral surface 54a of the columnar portion 54. These clearances are in communication with each other. Such a clearance between the outer peripheral surface of the valve body 50 and the inner peripheral surface of the stopper 70 is partitioned even when a tapered surface 70e of the stopper 70 is abutted against the abutment surface 53b of the valve body 50 as will be described later. The clearance functions as a fuel passage 71. The fuel passage 71 is constantly in communication with the fuel passage 55a of the coupling portion 55, and allows the fuel discharged toward the outer periphery of the coupling portion 55 to be guided up to the nozzle member 60.

The receiving hole 70a has the tapered surface 70e that can be abutted against the abutment surface 53b of the valve body 50 between the first inner peripheral surface 70c and the second inner peripheral surface 70d. The tapered surface 70e is formed in a ring-like shape and inclined to have its diameter decreased from the movable core 40 to the nozzle member 60. The tapered surface 70e is abutted against the abutment surface 53b to restrict the movement of the valve body 50 in the closing direction. The tapered surface 70e is provided in a position where the elastic portion 56 sits on the valve seat 60c of the nozzle member 60 and then elastically deformed in the direction along the movement direction of the valve body 50 to cause the crushing margin of the elastic portion 56 to reach a predetermined value. The predetermined value is set to such a value that can suppress changes in stroke of the valve body 50, while preventing any damage due to the compression permanent deformation of the elastic portion 56. Herein, the predetermined value is set to a value that can close the fuel passage 60a even under occurrence of the compression permanent deformation of the elastic portion 56 or the inclination of the valve structure due to a geometric tolerance, while preventing the damage to the elastic material 56 by the compression thereof. For example, the predetermined value is preferably set to the minimum value that enables sealing in a compression ratio of the elastic portion 56 of 8 to 35% even under occurrence of the compression permanent deformation of the elastic portion 56 or the inclination of the valve structure due to a geometric tolerance.

An inclination angle of the tapered surface 70e formed between the central axis of the fuel injector 100 and the tapered surface is smaller than that of the abutment surface 53b formed between the central axis and the abutment surface 53b. Material for use in the stopper 70 is the same as that for use in the support portion 52 of the valve body 50 as mentioned above. Thus, the tapered surface 70e of the stopper 70 has substantially the same hardness as that of the abutment surface 53b of the valve body 50. The abutment surface 53b of the valve body 50 is provided with a coated layer 72 made of, for example, DLC (diamond-like carbon), or polytetrafluoroethylene (registered mark: Teflon). The coated layer 72 may be provided at the tapered surface 70e of the stopper 70, or may be provided at both the abutment surface 53b of the valve body 50 and the tapered surface 70e of the stopper 70. In the present embodiment, the coated layer 72 is formed only at the abutment surface 53b, thus reducing the manufacturing cost as compared to the case of forming the coated layer 72 at both the abutment surface 53b and the tapered surface 70e. The coated layer 72 covers the outer peripheral surface of the valve body 50, which can facilitate the coating of the coated layer 72 as compared to the case of coating the inner peripheral surface of the stopper 70.

With this arrangement, while the abutment surface 53b of the valve body 50 is abutted against the tapered surface 70e of the stopper 70, the seat portion 56a of the elastic portion 56 sits on the valve seat 60c to close the fuel passage 60a, so that the fuel flowing from the inlet 20a to the fuel passage 71 via the receiving hole 31, through hole 32a, through hole 41c, and fuel passage 55a in that order is not injected from the injection port 60b. When the valve body 50 moves toward the fixed core 30 together with the movable core 40 to exceed the crushing margin of the elastic portion 56, the seat portion 56a is detached from the valve seat 60c to open the fuel passage 60a, so that the fuel leading to the fuel passage 71 is injected from the injection port 60b via the clearance between the elastic portion 56 and the nozzle member 60 through the fuel passage 60a.

As shown in FIGS. 1 and 2, the driving unit 90 includes a magnetic coil 91, a yoke 92, a connector 93, and the like. The electromagnetic coil 91 is comprised of a metal wire rod wound around a resin bobbin. The electromagnetic coil 91 is coaxially disposed on the outer peripheral in the radial direction of the housing 10. The connector 93 includes a terminal 93a for electrically connecting the electromagnetic coil 91 to an external control circuit. By the external control circuit, the energization of the electromagnetic coil 91 is controlled.

The yoke 92 is cylindrically formed of a ferrite stainless steel functioning as a magnetic material, and disposed on the outer peripheral in the radial direction of the electromagnetic coil 91 and housing 10 to cover the electromagnetic coil 91. The yoke 92 has a small-diameter portion formed at its one end on the nozzle member 60. The small-diameter portion is connected and fixed to the small-diameter portion 11a of the first magnetic portion 11 by laser welding or the like.

When the electromagnetic coil 91 is energized and excited by supplement of the power to the electromagnetic coil 91 via the terminal 93a, a magnetic flux flows in a magnetic circuit formed of the yoke 92, the first magnetic portion 11, the movable core 40, the fixed core 30, and the second magnetic portion 13 together. As a result, a magnetic attractive force is generated between the movable core 40 and the fixed core 30 opposed to each other to serve as a "magnetic force" for driving and attracting the movable core 40 toward the fixed core 30. On the other hand, when the electromagnetic coil 91 is demagnetized by stopping the energization, the magnetic flux does not flow in the magnetic circuit, eliminating the magnetic attractive force between the movable core 40 and fixed core 30.

The operation of the fuel injector 100 will be described in detail below. When the energization of the electromagnetic coil 91 is stopped in the fuel injector 100 in the state shown in FIG. 1, the magnetic attractive force to act on the movable core 40 is eliminated, so that the abutment surface 53b of the valve body 50 is pressed against the tapered surface 70e of the stopper 70 by an urging force of the spring 80 toward the movable core 40. At this time, the seat portion 56a of the elastic portion 56 sits on the valve seat 60c to close the injection port 60b. Thus, the fuel flowing from the inlet 20a to the fuel passage 71 is not injected from the injection port 60b.

Then, when the electromagnetic coil 91 is energized to cause the magnetic attractive force to act on the movable core 40 and the magnetic attractive force becomes larger than the urging force of the spring 80 in the state shown in FIG. 1, the movable core 40 starts moving toward the fixed core 30. When the amount of movement of the movable core 40 exceeds to the crushing margin of the elastic portion 56, the seat portion 56a is detached from the valve seat 60c. Thus, the fuel reaching the fuel passage 71 as indicated by a dashed-dotted line of FIG. 2 flows into the fuel passage 60a via the clearance between the seat portion 56a and the valve seat 60c, and then is injected from the injection port 60b. The movable core 40 moves until the movable core 40 is abutted against the fixed core 30 (see FIG. 2). The stroke corresponds to a movement distance of the valve main body 51 in which the movable core 40 is abutted against the fixed core 30 after the seat portion 56a is detached from the valve seat 60c.

Figure 6:
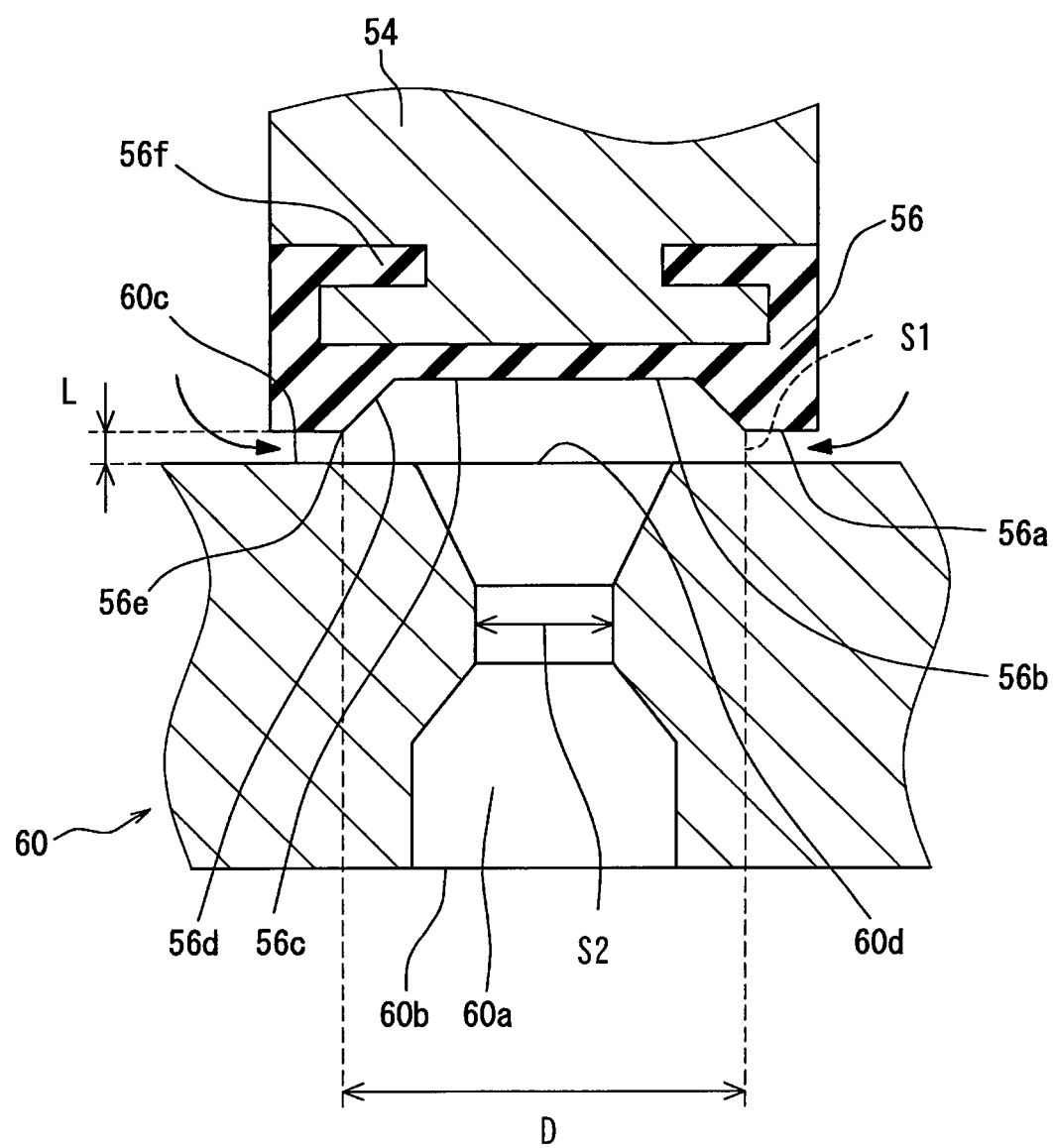
FIG. 6 is a diagram showing the flow of fuel near an injection port of the fuel injector in the first embodiment.

Referring to FIG. 6, the flow of fuel near the seat portion 56a will be described. Herein, D is a seat diameter of the seat portion 56a, L is a stroke of the valve main body 51, S1 is an opening area of an opening part formed between the seat portion 56a and the valve seat 60c in opening the valve, and S2 is a minimum passage area in the fuel passage 60a. The seat diameter D is a diameter of an inner peripheral part of the seat portion 56a formed by the corners 56e, and the opening area S1 is one determined by a following formula:

$$S1 = D \times \pi \times L$$

The seat diameter D, stroke L, and passage area S2 are preferably determined such that the opening area S1 is equal to or more than the passage area S2. Preferably, the opening area S1 is 1.4 times or more as large as the passage area S2.

At strokes of the valve main body 51 for L minutes, the fuel reaching the fuel passage 71 flows into a clearance between the seat portion 56a and the valve seat 60c (see arrows shown in FIG. 6). The fuel flowing into the clearance between both elements 56a and 60c flows into a recessed portion 56b from an opened part having the opening area S1 formed in the clearance, and then flows into the opening 60d of the fuel passage 60a. As a result, the fuel is discharged from the injection port 60b through the fuel passage 60a. An inner peripheral surface 56d of the recessed portion 56b is inclined, which can decrease the loss of pressure as much as possible when the fuel flowing into the recessed portion 56b from the clearance between both elements 56a and 60c. By setting the opening area S1 to one or more times larger than the passage area S2, the fuel flowing from the clearance between both the elements 56a and 60c can be discharged from the injection port 60b. When the opening area S1 is set to 1.4 times or more larger than the passage area S2, the amount of fuel flowing into the fuel passage 60a via a clearance between both the elements 56a and 60a can be increased to suppress the fuel from being discharging from the fuel passage 60a, thereby preventing the decrease in pressure of the fuel within the fuel passage 60a. As a result, the pressure of fuel discharged from the injection port 60b, that is, the injection pressure can approach the pressure of fuel flowing into the fuel injector 100 as much as possible.

Then, when the energization of the electromagnetic coil 91 is stopped again, the magnetic attractive force acting on the movable core 40 is eliminated. Thus, the force acting on the movable core 40 is only the urging force of the spring 80, whereby the movable core 40 starts moving toward the nozzle member 60. The movement of the movable core 40 first causes the seat portion 56a to stand on the valve seat 60c. The seat portion 56a sits on the valve seat 60c to terminate the inflow of the fuel reaching the fuel passage 71 into the fuel passage 60a, which stops the injection of fuel from the injection port 60b. Even after the seat portion 56a is attached on the valve seat 60c, the valve body 50 substantially moves toward the nozzle member 60, while the elastic portion 56 is being elastically deformed. Then, when the abutment surface 53b of the valve body 50 is abutted against the tapered surface 70e of the stopper 70, the movement of the valve body 50 toward the nozzle member 60 is stopped. At this time, the crushing margin of the elastic portion 56 becomes the predetermined value.

In this way, the movement of the valve body 50 toward the nozzle member 60 is restricted by the stopper 70 to set the crushing margin of the elastic portion 56 to the predetermined value, which can stabilize the crushing margin of the elastic portion 56 to thereby make the stroke of the valve main body 51 stable. As a result, the amount of fuel injected is stabilized.

In the present embodiment, in a state where the fuel does not flow into the fuel injector 100 with no fuel pressure of the fuel applied to respective internal elements thereof, the electromagnetic coil 91 is non-energized. In this state, even though the urging force of the spring 80 acts on the valve body 50 to cause the seat portion 56a to be attached or stand on the valve seat 60c, the abutment surface 53b of the valve body 50 is not abutted against the tapered surface 70e of the stopper 70 to form the clearance therebetween. When the fuel flows into the fuel injector 100 to apply a fuel pressure to the internal respective elements such as the valve body 50, the valve body 50 moves toward the nozzle member 60, causing the elastic portion 56 elastically deformed. In this way, the abutment surface 53b is abutted against the tapered surface 70e. When the electromagnetic coil 91 is in the non-energization state, the abutment surface 53b may be constantly abutted against the tapered surface 70e regardless of whether or not the fuel pressure acts on the internal respective elements of the fuel injector 100.

In the following, a method for manufacturing the fuel injector 100 will be described.

(Stopper Installing Step)

The stopper 70 is inserted from the opening 11c of the first magnetic portion 11 in the housing 10 formed by connecting the first magnetic portion 11, the non-magnetic portion 12, and the second magnetic portion 13 by laser welding. The stopper 70 is inserted until an end surface 70b of the stopper 70 is abutted against the stepped portion 11b of the first magnetic portion 11. Thereafter, the stopper 70 is fixed to the housing 10 by laser welding or the like. Then, the stopper 70 is provided between one end and the other end of the housing 10 in the axial direction.

(Valve Body Formation Step)

The coupling portion 55 of the valve body 50 with the elastic portion 56 attached thereto is inserted into the receiving portion 42 of the movable core 40. The coupling portion 55 is fixed to the receiving portion 42 by the laser welding or the like.

(Distance Measurement Step)

An integrated member of the movable core 40 and the valve body 50 is inserted from the second magnetic portion 13, and the abutment surface 53b of the valve body 50 is abutted against the tapered surface 70e of the stopper 70. With this state being kept, the position of the valve body 50 is fixed with respect to the stopper 70. Thereafter, in an abutment state where the abutment surface 53b of the valve body 50 is abutted against the tapered surface 70e of the stopper 70, a distance from the opening 11c of the first magnetic portion 11 serving as a reference position to the seat portion 56a of the elastic portion 56 is measured.

(Insertion Amount Calculation Step)

An amount of insertion of the nozzle member 60 into the first magnetic portion 11 is calculated by adding a predetermined crushing margin (predetermined value) of the elastic portion 56 to the result of measurement obtained in the distance measurement step. Herein, a method for connecting and fixing members together by applying heat by use of the laser welding or the like might sometimes cause a heat strain, accompanied by heat applied to the members. In the present embodiment, the nozzle member 60 is connected and fixed to the housing 10 by the laser welding or the like. Thus, the insertion amount is calculated by taking into consideration the heat strain generated by the laser welding in the nozzle member 60 and housing 10.

(Insertion Amount Adjustment Step)

The nozzle member 60 is inserted from the opening 11c of the first magnetic portion 11 by the amount of insertion calculated in the insertion amount calculation step, whereby the crushing margin of the elastic portion 56 is adjusted to the predetermined value.

(Nozzle Member Fixing Step)

The nozzle member 60 is connected and fixed to the first magnetic portion 11 by the laser welding. Thus, the relative positional relationship between the nozzle member 60 and the stopper 70 in the direction along the movement direction of the valve body 50 is fixed, and the abutment surface 53b is abutted against the tapered surface 70e, so that the crushing margin of the elastic portion 56 can be set to the predetermined value when the seat portion 56a of the elastic portion 56 sits on the valve seat 60c. In the present embodiment, a welded part between the first magnetic portion 11 and the nozzle member 60 lies over the entire periphery. The welding can ensure the sealing between the first magnetic portion 11 and the nozzle member 60.

(Fixed Core and Spring Installing Step)

The fixed core 30 is inserted from the second magnetic portion 13. The fixed core 30 is inserted up to a position where a predetermined clearance is formed from the movable core 40 with the abutment surface 53b of the valve body 50 being abutted against the tapered surface 70e of the stopper 70, and then fixed to the housing 10 by the laser welding or the like (see FIGS. 1 and 2). The spring 80 is accommodated in the receiving hole 31 of the fixed core 30. An adjusting pipe 32 is press-fitted into the receiving hole 31 to thereby adjust the set load of the spring 80.

(Inlet Member and Driving Unit Attachment Step)

The inlet member 20 is attached to the second magnetic portion 13. Both components are connected and fixed together by the laser welding or the like. The driving unit 90 comprised of the electromagnetic coil 91, the connector 93, and the yoke 92 is fitted into the outer periphery of the housing 10, and then the yoke 92 is connected and fixed to the housing 10 by the laser welding or the like.

In the fuel injector 100 using the above structure described above, the stopper 70 is abutted against the valve main body 51 in a position where the crushing margin of the elastic portion 56 becomes a predetermined value with the fuel passage 60a being closed by the movement of the valve main body 51. Thus, the stopper 70 serves to strict the movement of the valve main body 51 in the closing direction to stably set the crushing margin of the elastic portion 56 to the predetermined value with the fuel passage 60a being closed. This arrangement suppresses the change in crushing margin due to variations in pressure of fuel flowing into the fuel injector 100, the change in crushing margin due to wear of the elastic portion 56 caused by the repeated opening and closing of the fuel passage 60a, and the influences of the compression permanent deformation, thus restricting changes in stroke of the valve main body 51 to stabilize the amount of fuel injected.

The nozzle member 60 and the stopper 70 are formed of different materials. In providing the nozzle member 60 and the stopper 70 in the housing 10, the relative positions of the nozzle member 60 and the stopper 70 can be adjusted only by changing the relative positional relationship between the nozzle member 60 and the stopper 70. For this reason, the crushing margin of the elastic portion 56 can be adjusted to the predetermined value even though the dimensional accuracy of at least the elastic portion 56 is not so high to thereby stabilize the amount of fuel injected.

The method for adjusting the crushing margin of the elastic portion 56 to the predetermined value involves adjusting the relative positions of the nozzle member 60 and the stopper 70 in the direction along the movement direction of the valve body 50 including the valve main body 51 so as to adjust the crushing margin of the elastic portion 56, and then fixing the nozzle member 60 to the housing 10 with the stopper 70 fixed thereto by the laser welding so as to fix the relative positions.

The nozzle member 60 and the stopper 70 are formed of different materials, so that the relative positional relationship between the nozzle member 60 and the stopper 70 can be changed before fixing the nozzle member 60 to the housing 10 with the stopper 70 fixed thereto. The stopper 70 is abutted against the valve body 50 in a position where the crushing margin of the elastic portion 56 due to the elastic deformation becomes the predetermined value with the fuel passage 60a of the nozzle member 60 being closed by the movement of the valve body 50 including the valve main body 51 to thereby restrict the movement in the closing direction. Thus, the relative positions of the nozzle member 60 and the stopper 70 in the direction along the reciprocating direction of the valve body 50 are adjusted in the insertion amount adjustment step such that the crushing margin of the elastic portion 56 becomes the predetermined value before fixing the nozzle member 60 to the housing 10. Thus, the crushing margin of the elastic portion 56 can be set to the predetermined value. After adjusting the relative positions of the nozzle member 60 and the stopper 70 in the direction along the reciprocating direction of the valve body 50 in the insertion amount adjustment step, the nozzle member 60 is welded and fixed to the housing 10 in the nozzle member fixing step. Thus, the relative positions of the nozzle member 60 and the stopper 70 can be firmly fixed to the positions after the adjustment.

In the present embodiment, the nozzle member 60 is fixed to the housing 10 by welding and fixing, but both the insertion amount adjustment step and the nozzle member fixing step may be performed at one time. For example, the nozzle member 60 is pressed-fixed and fixed into the housing 10, which can perform both steps at one time. A method for fixing the nozzle 60 may involve caulking the nozzle member 60 to the housing 10.

The distance between the valve seat 60c and the injection port 60b is made short as much as possible, which is preferable from the viewpoint of the controllability of the amount of combustion injection. This is because the fuel stored in a space from the position where the seat portion 56a is abutted against the valve seat 60c (hereinafter referred to as the abutment position) to the injection port 60b is sometimes discharged even though the seat portion 56a of the valve body 50 sits on the valve seat 60c to bring the valve into the non-injection state in closing the valve.

The present embodiment employs the structure in which the nozzle member 60 is positioned downstream of the stopper 70 in the fuel flow toward the injection port 60b within the housing 10. With this structure, the stopper 70 does not exist at least between the nozzle member 60 and the injection port 60b, which can decrease the distance from the abutment position to the injection port 60b as much as possible. Thus, the amount of fuel stored from the abutment position to the injection port 60b to be discharged can be suppressed as much as possible in closing the valve.

Additionally, in the present embodiment, the injection port 60b is formed on the end of the fuel passage 60a downstream of the fuel flow. This structure can shorten the distance from the abutment position to the injection port 60b, and thus can further suppress the amount of fuel stored from the abutment position to the injection port 60b to be discharged in closing the valve.

In the present embodiment, the valve body 50 is reciprocatingly accommodated in the stopper 70 cylindrically formed. With the valve body 50 being abutted against the stopper 70, there are the clearances serving as the fuel passage 71 for allowing the flow of fuel into the nozzle member 60 and formed between the first inner peripheral surface 70c of the stopper 70 and the outer peripheral surface 53c of the valve body 50, and between the second inner peripheral surface 70d and the outer peripheral surface 54a of the valve body 50. With this structure, the fuel can be guided to the nozzle member 60 even though the valve body 50 is abutted against the stopper 70. Thus, as soon as the valve body 50 moves to open the fuel passage 60a, the fuel is injected from the injection port 60b.

In the present embodiment, the elastic portion 56 has the seat portion 56a protruding toward the nozzle member 60, on the outer periphery of the elastic portion 56 facing the nozzle member 60. The seat portion 56a is abutted against to enclose the outer periphery of the opening 60d of the fuel passage 60a to close the fuel passage 60a. With the above structure the seat diameter D can be set larger than that of the opening 60d. When the surface of the elastic portion 56 facing the nozzle member 60 is flat, the seat diameter is substantially the same as that of the opening 60d. Since the seat diameter D can be set larger than that of the opening 60d, the part of the elastic portion 56 corresponding to the seat diameter D, that is, the opening area S1 formed on the inner periphery of the seat portion 56a can be set larger. Thus, the amount of fuel flowing into the fuel passage 60a can be increased as compared to the case where the surface of the elastic portion 56 facing the nozzle member 60 is flat, thereby suppressing the decrease in injection pressure.

Further, in the present embodiment, the inner peripheral surface 56d is inclined such that the recessed portion 56b is getting deeper toward the center of the recessed portion 56b in the radial direction, which can suppress the loss in pressure of the fuel flowing into the recessed portion 56b through the clearance between the seat portion 56a and the valve seat 60c. As a result, the decrease in injection pressure due to the loss in pressure of the fuel can be suppressed.

In the present embodiment, the elastic portion 56 has an anchor portion 56f biting into the columnar portion 54 of the valve body 50 in the direction intersecting the reciprocating direction of the valve body 50. The anchor portion 56f firmly fixes the elastic portion 56 to the support portion 52 of the valve body 50. Particularly, the fixing strength in the reciprocating direction of the valve body 50 is increased.

In the present embodiment, the stopper 70 is disposed between one end and the other end of the housing 10 in the axial direction. Then, the nozzle member 60 formed of material different from the housing 10 is inserted from the opening 11c of the first magnetic portion 11. After adjustment of the amount of insertion and also adjustment of the crushing margin of the elastic portion 56, the nozzle member 60 is fixed to the opening 11c.

In this way, the amount of insertion of the nozzle member 60 fixed to the opening 11c into the housing 10 is adjusted to thereby adjust the crushing margin of the elastic portion 56, which facilitates the adjustment operation of the crushing margin as compared to the case of adjustment of the position of the stopper 70 disposed between the one end and the other end of the housing 10.

In the present embodiment, the nozzle member 60 is formed of material different from the housing 10, and the stopper 70 is also formed of material different from the housing 10. When the nozzle member 60 and the stopper 70 are respectively formed of materials different from the housing 10, the adjustment of the relative positions of the nozzle member 60 and the stopper 70 for adjusting the crushing margin of the elastic portion 56 might be complicated. In the present embodiment, the stepped portion 11b formed in the first magnetic portion 11 of the housing 10 is abutted against the end surface 70b of the stopper 70 to thereby determine the position of the stopper 70 with respect to the housing 10. In this way, the adjustment of the relative positions of the nozzle member 60 and the stopper 70 can be performed only by moving the nozzle member 60. Thus, the fuel injector 100 can be manufactured easily.

The stopper 70 is a part abutted against the valve body 50. Thus, for example, the material that can ensure the shock caused by the abutment against the valve body 50 is preferably selected as material used for the stopper 70. Since in the present embodiment, the stopper 70 is formed of material different from the housing 10, the material for the stopper 70 can be selected without being restricted by the material used for the housing 10.

Every time the valve body 50 sits on the valve seat 60c, the tapered surface 70e of the stopper 70 is abutted against the abutment surface 53b of the valve body 50. For example, when the tapered surface 70e is formed of material different from the abutment surface 53b, the abutment between both elements is repeatedly performed, which might deform one of them having a lower hardness. This might not be capable of stabilizing the stroke of the valve body 50 for a long term.

For this problem, the present embodiment employs the structure in which the tapered surface 70e of the stopper 70 is formed of the same material as the abutment surface 53b of the valve body 50. With this arrangement, the taper surface 70e can have substantially the same hardness as that of the abutment surface 53b. Therefore, the occurrence of deformation in abutment of the stopper 70 against the valve body 50 can be suppressed. The tapered surface and the abutment surface may be formed of different kinds of materials as long as both materials have the same hardness.

When the tapered surface 70e and the abutment surface 53b are formed of the same material, the repeated abutment therebetween might cause baking between these surfaces 75 and 53b. For this problem, in the present embodiment, either the surface 75 or 53b has on its front surface, the coated layer 72 made of DLC or polytetrafluoroethylene. This can suppress the occurrence of barking between the stopper 70 and the valve body 50.

Generally, rubber is known to be material that makes it difficult to enhance the dimensional accuracy as compared to metal material. A mentioned above, in the present embodiment, the crushing margin of the elastic portion 56 is adjusted by adjusting the relative positions of the nozzle member 60 and the stopper 70. In this way, in adjustment of the crushing margin of the elastic portion 56, it is not necessary to improve the dimensional accuracy of the elastic portion 56. Thus, rubber can be used as the elastic portion 56.

In the present embodiment, rubber for use in forming the elastic portion 56 is fluorine rubber. The fluorine rubber is known as material exhibiting elasticity at an ultralow temperature (for example, in a range of −30 to −40° C.). In particular, the fluorine rubber is material appropriate in use of gas fuel as the fuel.

In the present embodiment, the fuel handled by the fuel injector 100 is gas fuel. In use of the gas fuel as the fuel, it is important to ensure the airtightness. In the present embodiment, the seat portion 56a is formed of an elastic member, which can easily ensure the airtightness upon closing the fuel injector 100. The seat portion 56a is suitable for use in gas fuel.

In the present embodiment, the housing 10 corresponds to a "main body", the fuel passage 60a corresponds to a "fuel passage leading to an injection port", the nozzle member 60 corresponds to a "passage formation portion", the valve main body 51 corresponds to a "valve member", the elastic portion 56 corresponds to an "elastic member", and the stopper 70 corresponds to a "movement restricting portion".

In the present embodiment, the process from the stopper installing step to the insertion amount adjustment step corresponds to an "adjustment step", and the nozzle member fixing step corresponds to a "relative position fixing step". Further, the stopper installing step corresponds to an "installing step", and the insertion amount adjustment step corresponds to an "insertion step".

SECOND EMBODIMENT

Figure 7:
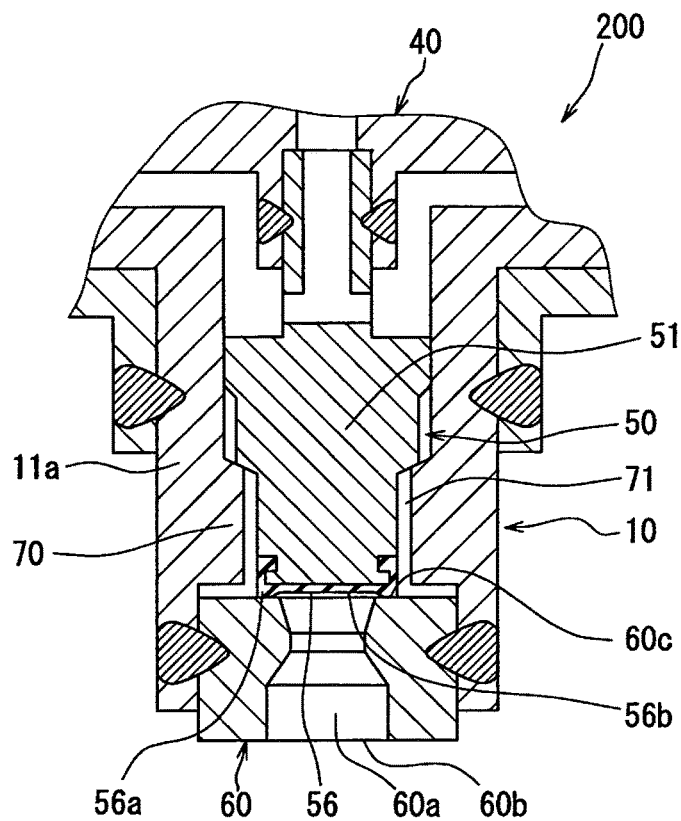
FIG. 7 is an enlarged cross-sectional view of the structure of a fuel injector according to a second embodiment.

Although in the first embodiment, the stopper 70 is a different member from the housing 10, and is connected and fixed to the housing 10 by the laser welding or the like, like a fuel injector 200 of a second embodiment shown in FIG. 7, the stopper 70 may be formed in the housing 10 by cutting or casting. Even with this arrangement, the nozzle member 60 is still a different member from the stopper 70, so that the crushing margin of the elastic portion 56 can be adjusted by adjusting the relative positions of the nozzle member 60 and the stopper 70. The second embodiment also employs the same structure as that in the first embodiment except for the above structure, and thus can have the same operation and effects as those of the first embodiment.

THIRD EMBODIMENT

Figure 8:
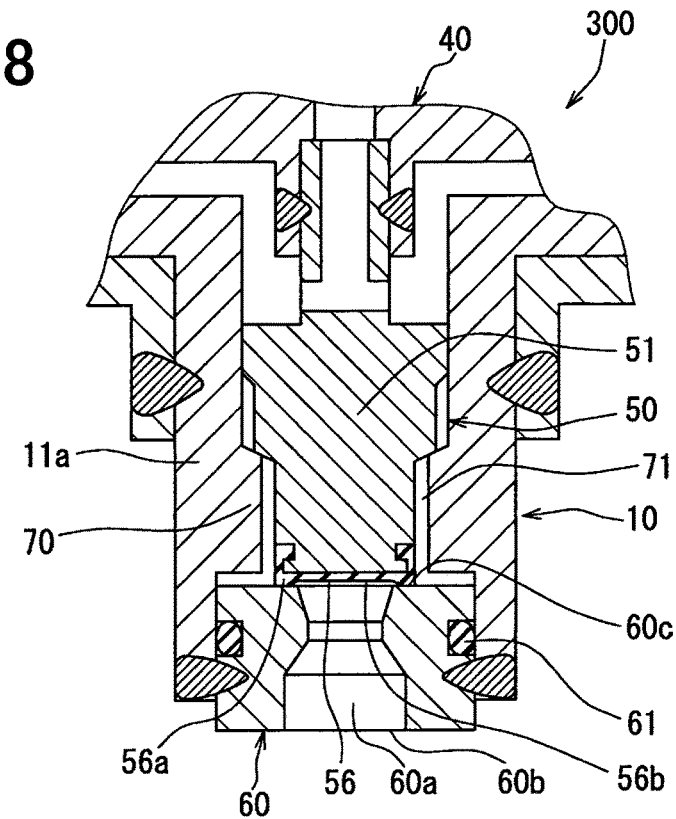
FIG. 8 is an enlarged cross-sectional view showing the structure of a fuel injector according to a third embodiment.

In the first and second embodiments, the laser welding is performed on the entire periphery of the nozzle member 60 on the outer peripheral in the radial direction, so that the nozzle member 60 is connected and fixed to the housing 10. In a fuel injector 300 of a third embodiment shown in FIG. 8, the nozzle member 60 is connected and fixed to the housing 10 not by performing the laser welding or the like on its entire periphery, but by welding several points (spot welding) in its peripheral direction. This structure, however, might generate a clearance between the nozzle member 60 and the housing 10 in between adjacent welded parts to leak the fuel from the clearance. In the present embodiment, an O ring 61 is provided on the outer peripheral surface in the radial direction of the nozzle member 60. Even when the nozzle member 60 is connected and fixed to the housing 10 by spot welding, the O ring 61 can ensure the sealability between the housing 10 and the nozzle member 60. Instead of the spot welding, press-fitting or caulking may be performed. The stopper 70 of the present embodiment is integral with the housing 10, but the stopper 70 may be provided separately from the housing 10, like the first embodiment.

FOURTH EMBODIMENT

Figure 9:
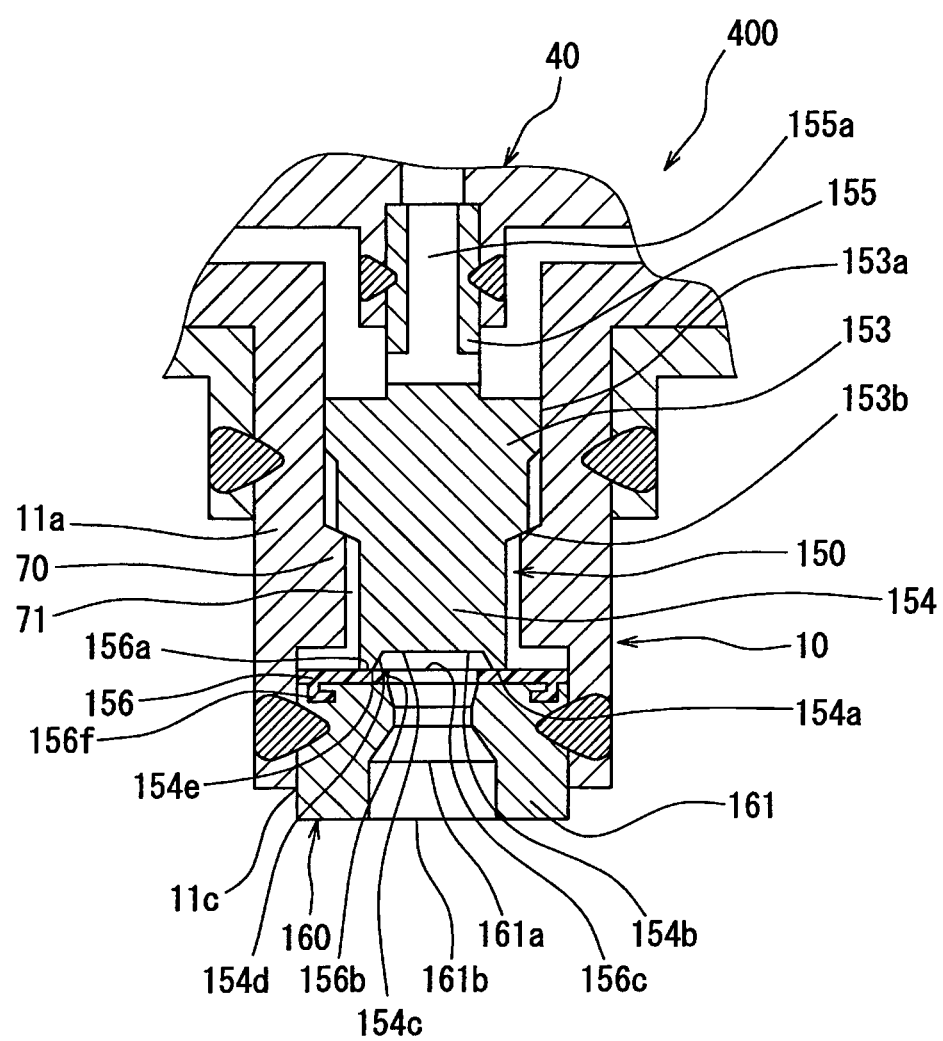
FIG. 9 is an enlarged cross-sectional view showing the structure of a fuel injector according to a fourth embodiment.

Although in the first to third embodiments, the elastic portion 56 is provided in the valve body 50 and the seat portion 56a is formed in the elastic portion 56, in a fuel injector 400 of a fourth embodiment shown in FIG. 9, an elastic portion 156 is attached to a nozzle main body 161 of a nozzle member 160.

In the following, the nozzle member 160 and the valve body 150 having different structures as those of the first embodiment will be described in detail. The nozzle member 160 includes the nozzle main body 161 cylindrically formed of martensite stainless steel, and the elastic portion 156 formed in a disk-like shape of elastic material, such as fluorine rubber.

The nozzle main body 161 is provided with a fuel passage 161a axially penetrating its center in the radial direction. The fuel passage 161a has on its end opposite to the valve body 150, an injection port 161b for injecting the fuel therefrom. The nozzle main body 161 is connected and fixed to the opening 11c of the small-diameter portion 11a in the first magnetic portion 11 by laser welding and the like.

The elastic portion 156 is attached to the end surface of the nozzle main body 161 on the valve body 150. A through hole 156b is formed to axially penetrate the center in the radial direction of the elastic portion 156. The through hole 156b and the fuel passage 161a are arranged coaxially. A valve seat 156a surrounding the through hole 156b is formed on the surface of the elastic portion 156 on the valve body 150.

The elastic portion 156 has an anchor portion 156f for increasing the fixing strength to the nozzle main body 161. The anchor portion 156f is formed in the nozzle main body 161, and disposed to bite into the groove recessed in the direction intersecting the reciprocating direction of the valve body 150. This structure enhances the fixing strength to the nozzle main body 161. Particularly, the fixing strength in the reciprocating direction of the valve body 150 is increased.

The valve body 150 is formed in a stick-like shape of martensite stainless steel functioning as a non-magnetic material, and coaxially accommodated on the inner periphery of the first magnetic portion 11. The valve body 150 includes a coupling portion 155, a quadrangular prism portion 153, and a columnar portion 154.

The coupling portion 155 has the same shape and function as those of the coupling portion 55 of the first embodiment, and is coupled to the movable core 40. The coupling portion 155 has the same shape and function as those in the first embodiment.

The quadrangular prism 153 is disposed on the nozzle member 160 with respect to the coupling portion 155. The quadrangular prism 153 has the same shape as that of the first embodiment, and has guide portions 153a guided along the inner peripheral wall surface of the stopper 70 at the corners of the side surfaces. At the corners of the bottom surface of the quadrangular prism portion 153 on the nozzle member 160, abutment surfaces 153b are formed. When the valve body 150 moves to the nozzle member 160, each abutment surface 153b is abutted against the tapered surface 70e of the stopper 70. The respective inclination angles of the abutment surface 153b and the tapered surface 70e are the same as those of the first embodiment.

The cross-sectional shape and diameter of the columnar portion 154 are the same as those of the first embodiment. A seat portion 154a attachable and detachable to and from the valve seat 156a is formed on the end of the columnar portion 154 on the nozzle member 160 in the present embodiment.

A ring-like seat portion 154a is formed at a surface of the columnar portion 154 facing the nozzle member 160 to protrude toward the nozzle member 160 from the outer periphery of the surface. A recessed portion 154b is formed on the inner periphery of the seat portion 154a to be recessed toward the opposite side to the nozzle member 160c. The diameter of the inner peripheral surface 154d formed at the periphery of the bottom surface 154c of the recessed portion 154b is larger than that of an opening 156c of the through hole 156b in the elastic portion 156. The diameter of the inner peripheral surface 154d can be set in a range of the outer diameter of the columnar portion 154. The seat portion 154a is formed on the outer periphery of the recessed portion 154b at the surface of the columnar portion 154 facing the nozzle member 160. Corners 154e on the nozzle member 160 of the inner peripheral surface 154d can be abutted to enclose the outer periphery of the opening 156c. That is, the corners can be abutted such that the seat portion 154a encloses the outer periphery of the opening 156c. In this way, the fuel passage 161a is closed. The inner peripheral surface 154d of the recessed portion 154b is inclined such that the recessed portion 154b is getting gradually deeper toward the center of the recessed portion 154b in the radial direction.

Also in the present embodiment, like the first embodiment, in opening the valve, the seat diameter D, the stroke L, and the passage area S2 are set such that the opening area S1 formed between the seat portion 154a and the valve seat 156a is equal to or more than the passage area S2 of the fuel passage 161a. Preferably, in the present embodiment, the opening area S1 is 1.4 times or more as large as the passage area S2.

By the nozzle member 160 and valve body 150 with the above arrangement, the abutment surface 153b of the valve body 150 is abutted against the taper surface 70e of the stopper 70 to restrict the movement of the valve body 150 toward the nozzle member 160, which can set the crushing margin of the elastic portion 156 provided in the nozzle member 160 to the predetermined value.

Next, the adjustment of the crushing margin of the elastic portion 156 will be described below. In the distance measuring step, a distance from the opening 11c of the first magnetic portion 11 as a reference position to the seat portion 154a of the valve portion 150 is measured while the abutment surface 153b of the valve body 150 is abutted against the tapered surface 70e of the stopper 70. Then, in the insertion amount calculation step, a predetermined crushing margin (predetermined value) of the elastic portion 156 is added to the result of measurement in the distance measurement step to thereby calculate the amount of insertion of the nozzle member 160. Thereafter, the nozzle main body 161 is inserted into the opening 11c by the amount of insertion calculated, so that the nozzle main body 161 is connected and fixed to the first magnetic portion 11 by the laser welding or the like. Also in the present embodiment, like the first embodiment, the amount of insertion is preferably calculated taking into consideration the occurrence of heat strain of the first magnetic portion 11 and nozzle main body 161 due to the laser welding or the like. As mentioned in the first embodiment, the nozzle member 160 may be fixed to the first magnetic portion 11 by press-fitting or caulking.

The stopper 70 of the present embodiment is integral with the housing 10, but the stopper 70 may be provided separately from the housing 10, like the first embodiment. In the present embodiment, like the third embodiment, a method of connecting the nozzle member 160 may involve connecting and fixing the nozzle member 160 to the housing 10 by spot welding. In this case, the O-ring 61 may be provided at the outer peripheral surface in the radial direction of the nozzle main body 161. Thus, the sealability between the nozzle main body 161 and the housing 10 can be ensured.

Particularly, in the present embodiment, the columnar portion 154 has the seat portion 154a protruding toward the nozzle member 160, on the outer periphery of the surface of the columnar portion 154 facing the nozzle member 160. The seat portion 154a is abutted against to enclose the outer periphery of the opening 156c of the through hole 156b to close the fuel passage 161a. With the above structure the seat diameter D can be set larger than that of the opening 156c. When the surface of the columnar portion 154 facing the nozzle member 160 is flat, the seat diameter is substantially the same as that of the through hole 156b. Since the seat diameter D can be set larger than that of the opening 156c, the part of the columnar portion 154 corresponding to the seat diameter D, that is, the opening area S1 formed on the inner periphery of the seat portion 154a can be set larger. Thus, the amount of fuel flowing into the fuel passage 161a can be increased as compared to the case where the surface of the columnar portion 154 facing the nozzle member 160 is flat, thereby suppressing the decrease in injection pressure.

By setting the opening area S1 to one or more times larger than the passage area S2, the fuel flowing from the clearance between both the elements 154a and 156a can be discharged from the injection port 161b. When the opening area S1 is set to 1.4 times or more larger than the passage area S2, the amount of fuel flowing into the fuel passage 161a via a clearance between both the elements 154a and 156a can be increased to suppress the fuel from being discharging from the fuel passage 161a, thereby preventing the decrease in pressure of the fuel within the fuel passage 161a. As a result, the pressure of fuel discharged from the injection port 161b, that is, the injection pressure can approach the pressure of fuel flowing into the fuel injector 400 as much as possible.

In the present embodiment, the housing 10 corresponds to a "main body" described in the accompanied claims, the fuel passage 161a corresponds to a "fuel passage leading to an injection port", the nozzle main body 161 corresponds to a "passage formation portion", the valve body 150 corresponds to a "valve member", the elastic portion 156 corresponds to an "elastic member", and the stopper 70 corresponds to a "movement restricting portion".

FIFTH EMBODIMENT

In the first to fourth embodiments described above, the forms of the valves of the fuel injectors 100, 200, 300, and 400 are the so-called inward opening valve. On the other hand, in a fifth embodiment shown in FIG. 10, the valve form of a fuel injector 500 is the so-called outward opening valve. The fuel injector 500 includes a housing 510, an inlet member 520, a fixed core 530, a movable core 540, a valve body 550, a passage formation member 560, a stopper 570, and a driving unit 590.

The housing 510 is entirely formed cylindrically, and has a first magnetic portion 511, a non-magnetic portion 512, and a second magnetic portion 513 in that order from one end to the other end in the axial direction. The first and second magnetic portions 511 and 513 formed of ferrite-based stainless steel functioning as a magnetic material are connected by laser welding or the like to the non-magnetic portion 512 formed of austenite-based stainless steel functioning as non-magnetic material.

The first magnetic portion 511 has a large-diameter portion 511d connected to the non-magnetic portion 512, and a small-diameter portion 511a having an outer diameter smaller than that of the large-diameter portion 511d. The stopper 570 is provided at one end of the small-diameter portion 511a opposite to the non-magnetic portion 512, that is, at the opening 511c formed at an end downstream of a fuel flow within the housing 510. The passage formation member 560 is provided between one end and the other end of the housing 510 in the axial direction. The inlet member 520 is provided at an end 513a of the second magnetic portion 513 opposite to the non-magnetic portion 512.

The inlet member 520 is cylindrically formed, and has an inlet 520a formed at its center in the radial direction so as to allow fuel supplied from a fuel pump through a fuel pipe to the fuel injector 500. The inlet member 520 is connected and fixed to the end 513a of the second magnetic portion 513 by laser welding or the like.

The fixed core 530 is cylindrically formed of ferrite stainless steel functioning as magnetic material, and coaxially fixed to the inner peripheral walls of the non-magnetic portion 512 and the second magnetic portion 513. The fixed core 530 is provided with a through hole 530a axially penetrating the center in a radial direction of the core.

The movable core 540 is formed cylindrically of ferrite stainless steel functioning as magnetic material. The movable core 540 is coaxially accommodated on the inner periphery of the housing 510, and positioned between the fixed core 530 and the inlet member 520.

The movable core 540 has on its outer peripheral wall, guide portions 541a guided along the respective inner peripheral walls of the second magnetic portion 513 and non-magnetic portion 512. With this arrangement, the movable core 540 is axially reciprocatingly movable by the guide portion 541a along the respective inner peripheral walls of the second magnetic portion 513 and the non-magnetic portion 512. The movable core 540 is provided with a through hole 541b axially penetrating the center in a radial direction of the core. The coupling portion 552 of the valve body 550 to be described later is press-fitted and fixed to the through hole 541b.

The valve body 550 is entirely formed in the stick-like shape, and accommodated coaxially on the inner periphery of the housing 510. The valve body 550 reciprocates in the axial direction to open and close a fuel passage 560a formed in the passage formation portion 560 to be described later, so that the fuel is discontinuously injected from the injection port 570b into the combustion chamber.

Figure 10:
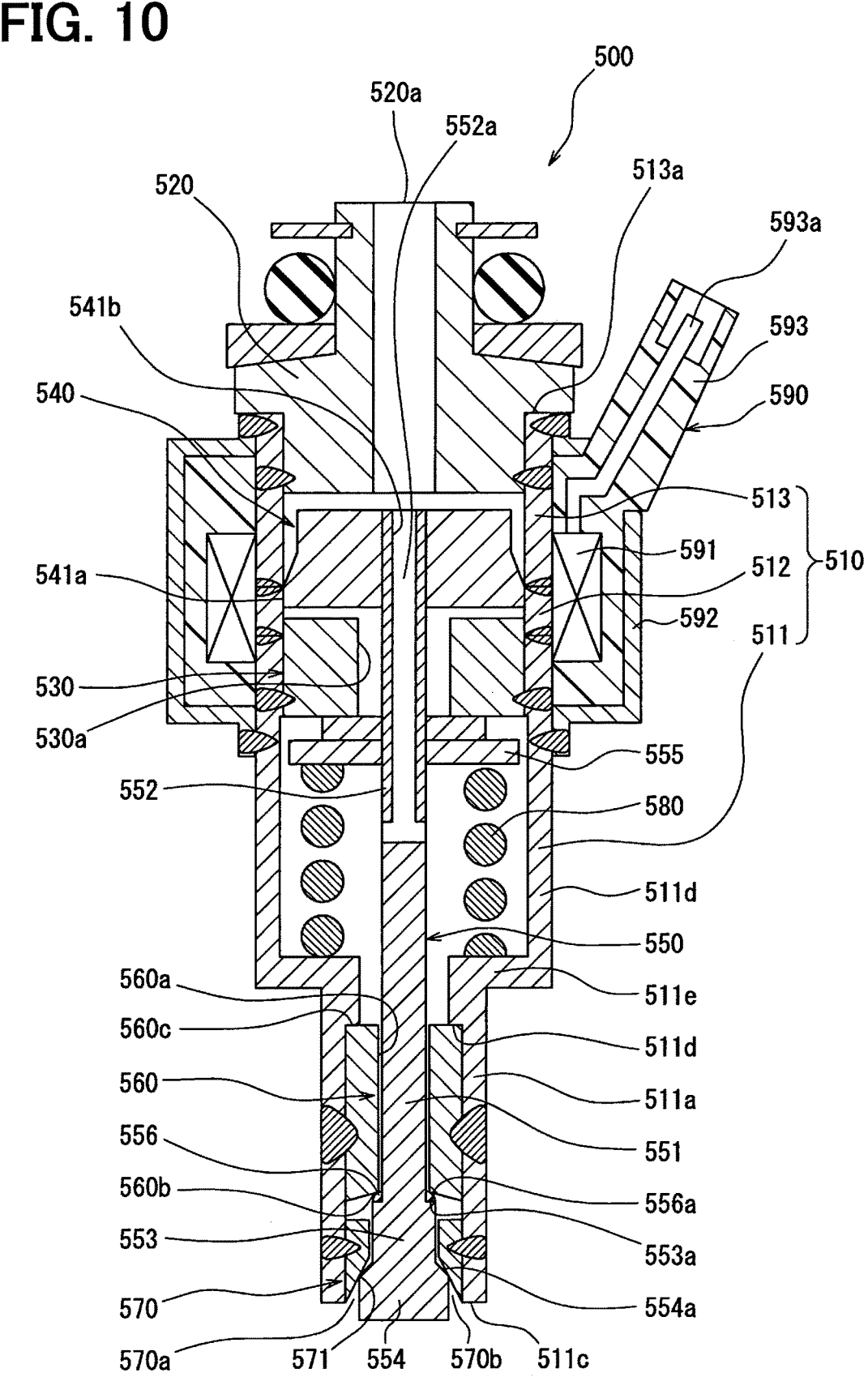
FIG. 10 is a cross-sectional view showing the structure of a fuel injector according to a fifth embodiment.
Figure 11:
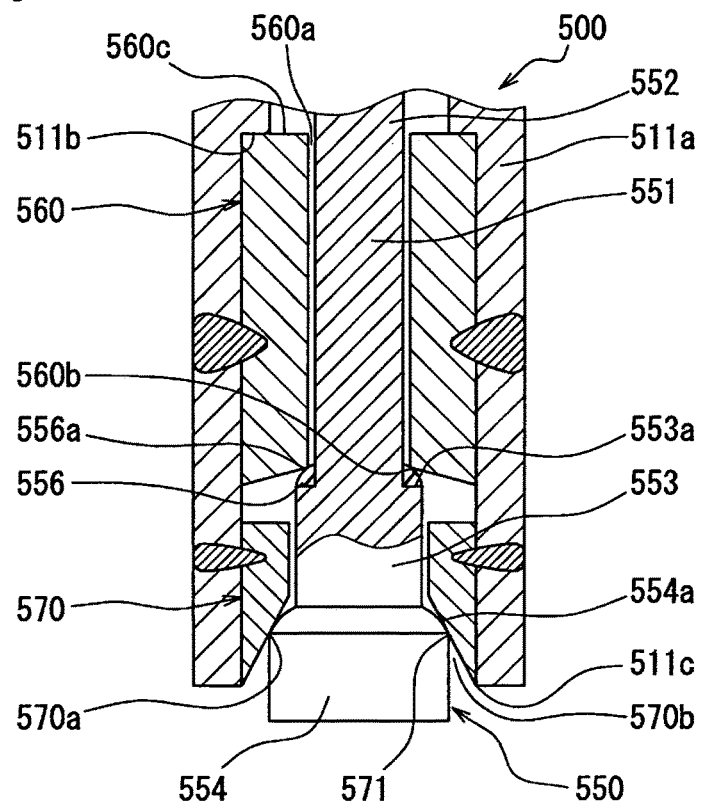
FIG. 11 is another enlarged cross-sectional view showing the structure of the fuel injector in the fifth embodiment.

As shown in FIGS. 10 and 11, the valve body 550 has a valve main body 551 coupled to the movable core 540. The valve main body 551 is formed in the stick-like shape of a martensite-based stainless steel functioning as the non-magnetic material. The valve main body 551 includes a stick-like coupling portion 552 coupled to the movable core 540, a small-diameter portion 553 positioned above the injection port 570b with respect to the coupling portion 552 and having an elastic portion 556 attached thereto to be described later, and a large-diameter portion 554 positioned above the injection port 570b with respect to the small-diameter portion 553 and having a larger diameter than that of the small-diameter portion 553.

The coupling portion 552 has its one end on the inlet member 520 disposed in the through hole 541b of the movable core 540, and fixed to the movable core 540. The coupling portion 552 has its other end penetrating the through hole 530a of the fixed core 530 and the fuel passage 560a of the passage formation member 560 and disposed on the injection port 570b in the passage formation member 560. The coupling portion 552 has a fuel passage 552a that communicates a space between the inlet member 520 and the movable core 540 with a space between the fixed core 530 and the passage formation member 560 on the outer periphery of the coupling portion 552. Thus, the fuel flowing into the fuel passage 552a from the inlet member 520 is discharged into the space between the fixed core 530 and the passage formation member 560 on the outer periphery of the coupling portion 552.

The small-diameter portion 553 has a larger outer diameter than that of the coupling portion 552, and disposed on the injection port 570b of the coupling portion 552. The outer diameter of the small-diameter portion 553 is smaller than the inner diameter of the inner peripheral wall of the stopper 570. With the small-diameter portion 553 being disposed on the inner periphery of the stopper 570, a clearance is formed to allow the fuel to pass through between the outer peripheral wall of the small-diameter portion 553 and the inner peripheral wall of the stopper 570. The small-diameter portion 553 has a ring-like stepped portion 553a formed at its end on the coupling portion 552. The ring-like elastic portion 556 is attached to the stepped portion 553a. The elastic portion 556 is attached to the stepped portion 553a by an adhesive or the like. Alternatively, like the first embodiment, the elastic portion 556 may be attached to the small-diameter portion 553 by insert molding.

The large-diameter portion 554 has a larger outer diameter than that of the small-diameter portion 553, and disposed on the injection port 570b of the small-diameter portion 553. The large-diameter portion 554 has an abutment surface 554a that gradually increases its diameter toward the injection port 570b. The abutment surface 554a is abutted against the tapered surface 570a, restricting the movement of the valve body 550 toward the inlet member 520, that is, the movement of the valve body 550 in the closing direction. The outer diameter of the large-diameter portion 554 is set such that when the valve body 550 moves in the direction of movement of the abutment surface 554a away from the tapered surface 570a, the fuel having passed through between the abutment surface 554a and the tapered surface 570a is guided to the injection port 570b.

The elastic portion 556 is an elastic member that is elastically deformable by the attaching or detaching on or from the passage formation member 560, and the seat portion 556a is formed in the position facing the passage formation member 560. In the present embodiment, the elastic portion 556 is made of fluorine rubber with excellent resistance to low temperature and to oil. With this arrangement, the valve body 550 also moves in the axial direction together with the movable core 540, accompanied by the axial reciprocating movement of the movable core 540. The elastic portion 556 is disposed upstream of the fuel flow with respect to the stopper 570.

A spring 580 serving as an urging member made of a spring coil is disposed on the outer periphery of a part of the coupling portion 552 of the valve body 550 between the fixed core 530 and the passage formation member 560. The spring 580 is disposed coaxially with respect to the coupling portion 552. The spring 580 has its one end supported by the seat member 555 fixed to the coupling portion 552, and its other end supported by the stepped portion 511e formed between the large-diameter portion 551d and the small-diameter portion 511a of the first magnetic portion 511. The spring 580 is disposed between the seat member 555 and the stepped portion 551e such that the urging force toward the fixed core 530 is constantly applied to the valve body 550.

The abutment surface 554a of the valve body 550 is provided with a coated layer 571 made of, for example, DLC (diamond-like carbon), or polytetrafluoroethylene (registered mark: Teflon). The coated layer 571 may be provided at the tapered surface 570a of the stopper 570, or may be provided at both the abutment surface 554a of the valve body 550 and the tapered surface 570a of the stopper 570. In the present embodiment, the coated layer 571 is formed only at the abutment surface 554a, thus reducing the manufacturing cost as compared to the case of forming the coated layer at both the abutment surface 554a and the tapered surface 570a. The coated layer 571 covers the outer peripheral surface of the valve body 550, which can facilitate the coating of the coated layer 571 as compared to the case of coating the inner peripheral surface of the stopper 570.

As shown in FIGS. 10 and 11, the passage formation member 560 is formed of material different from the housing 510 having the stopper 570. The passage formation member 560 is cylindrically formed of martensite stainless steel functioning as a non-magnetic material. The passage formation portion 560 is provided with a fuel passage 560a penetrating its center in the axial direction. The fuel passage 560a accommodates therein a part of the coupling portion 552 of the valve body 550, and has a diameter larger than that of the coupling portion 552. With this arrangement, the fuel discharged from the fuel passage 560a of the coupling portion 552 can be passed through a clearance between the inner wall of the fuel passage 560a and the outer wall of the coupling portion 552. In the present embodiment, the passage formation member 560 is formed of material different from that of the housing 510. The passage formation member 560 is provided in the first magnetic portion 511 by being inserted into the opening 511c of the first magnetic portion 511. The passage formation member 560 is positioned with respect to the housing 510 while the end surface 560c on the movable core 540 is abutted against a stepped portion 511*b* formed at the inner peripheral wall of the small-diameter portion 511*a*. The passage formation member 560 is connected and fixed to the small-diameter portion 511*a* by the laser welding or the like while being positioned by the housing 510. A valve seat 560*b* attachable and detachable to and from the seat portion 556*a* is formed at the peripheral edge of the opening of the fuel passage 560*a* at the end surface of the passage formation member 560 on the injection port 570*b*.

The seat portion 556*a* is adapted to close the fuel passage 560*a* by a closing operation which involves causing the seat portion 556*a* to stand on the valve seat 560*b*. In this way, the flow of fuel into the injection port 570*b* is stopped. At this time, the elastic portion 556 is elastically deformed according to the amount of movement of the valve body 550. At this time, the abutment surface 554*a* of the valve body 550 is abutted against the tapered surface 570*a* of the stopper 570. On the other hand, the seat portion 556*a* is adapted to open the fuel passage 560*a* by an opening operation including detaching the seat portion 556*a* from the valve seat 560*b*. At this time, the abutment surface 554*a* of the valve body 550 is detached from the tapered surface 570*a* of the stopper 570. Thus, the fuel discharged from the fuel passage 560*a* can pass through the clearance between the abutment surface 554*a* and the tapered surface 570*a*, thus allowing the flow of fuel into the injection port 570*b* formed on the tip with respect to the tapered surface 570*a*.

The stopper 570 is cylindrically formed of a martensite-based stainless steel functioning as the non-magnetic material as shown in FIGS. 10 and 11. In the present embodiment, the stopper 570 is formed of material different from the housing 10. The stopper 570 is inserted from the small-diameter portion 511*a* of the first magnetic portion 511, and connected and fixed to the opening 511*c* by the laser welding or the like.

The stopper 570 has on its inner peripheral wall, a tapered surface 570*a* formed to increase its inner diameter toward its tip. The tapered surface 570*a* is abutted against the abutment surface 554*a* to restrict the movement of the valve body 550 in the closing direction. The tapered surface 570*a* is provided in a position where the elastic portion 556 sits on the valve seat 560*b* of the passage formation member 560 in the direction along the movement direction of the valve body 550 and then elastically deformed to cause the crushing margin of the elastic portion 556 to reach a predetermined value. An injection port 570*b* is formed at the tip of the tapered surface 570*a* of the stopper 570. The predetermined value is set to such a value that can suppress changes in stroke of the valve body 550, while preventing any damage due to the compression permanent deformation of the elastic portion 556. Herein, the predetermined value is set to a value that can close the fuel passage 560*a* even under occurrence of the compression permanent deformation of the elastic portion 556 or the inclination of the valve structure due to a geometric tolerance, while preventing the damage to the elastic material 556 by the compression thereof. For example, the predetermined value is preferably set to the minimum value that enables sealing in a compression ratio of the elastic portion 556 of 8 to 35% even under occurrence of the compression permanent deformation of the elastic portion 556 or the inclination due to a geometric tolerance.

As shown in FIG. 10, the driving unit 590 includes an electromagnetic coil 591, a yoke 592, a connector 593, and the like. The electromagnetic coil 591 is comprised of a metal wire rod wound around a resin bobbin. The electromagnetic coil 591 is coaxially disposed on the outer peripheral in the radial direction of the housing 510. The connector 593 includes a terminal 593*a* for electrically connecting the electromagnetic coil 591 to an external control circuit. By the external control circuit, the energization of the electromagnetic coil 591 is controlled.

The yoke 592 is cylindrically formed of a ferrite stainless steel functioning as a magnetic material, and disposed on the outer peripheral in the radial direction of the electromagnetic coil 591 and housing 10 to cover the electromagnetic coil 591. The yoke 592 has small-diameter portions formed on both ends thereof in the axial direction. The small-diameter portions are connected to the large-diameter portion 511*d* of the first magnetic portion 11, and the second magnetic portion 513, respectively, by the laser welding or the like.

When the electromagnetic coil 591 is energized and excited by supplement of the power to the electromagnetic coil 591 via a terminal 593*a*, a magnetic flux flows in a magnetic circuit formed of the yoke 592, the first magnetic portion 511, the fixed core 530, the movable core 540, and the second magnetic portion 513 together. As a result, a magnetic attractive force is generated between the movable core 540 and the fixed core 530 opposed to each other to serve as a "magnetic force" for driving and attracting the movable core 540 toward the fixed core 530. On the other hand, when the electromagnetic coil 591 is demagnetized by stopping the energization, the magnetic flux does not flow in the magnetic circuit, eliminating the magnetic attractive force between the movable core 540 and fixed core 530.

The operation of the fuel injector 500 will be described in detail below. When the energization of the electromagnetic coil 591 is stopped in the fuel injector 500 in the state shown in FIG. 10, the magnetic attractive force to act on the movable core 540 is eliminated, so that the abutment surface 554*a* of the valve body 550 is pressed against the tapered surface 570*a* of the stopper 570 by an urging force of the spring 580. At this time, the seat portion 556*a* of the elastic portion 556 sits on the valve seat 560*c* to close the injection port 570*b*. Thus, the fuel flowing from the inlet 520*a* to the fuel passage 560*a* via the fuel passage 522*a* and the space between the fixed core 530 and the passage formation member 560 is not injected from the injection port 570*b*.

Then, in the state shown in FIG. 10, when the electromagnetic coil 591 is energized to cause the magnetic attractive force to act on the movable core 540 and the magnetic attractive force becomes larger than the urging force of the spring 580, the movable core 540 starts moving toward the fixed core 530. When the amount of movement of the movable core 540 exceeds the crushing margin of the elastic portion 556, the seat portion 556*a* is detached from the valve seat 560*b*. Together with this, the abutment surface 554*a* of the valve body 550 is detached from the tapered surface 570*a*. Thus, the fuel reaching the fuel passage 560*a* leads to the clearance between the abutment surface 554*a* and the tapered surface 570*a* via the clearance between the seat portion 556*a* and the valve seat 560*a*, and then is injected from the injection port 570*b*. The movable core 540 moves until the movable core 540 is abutted against the fixed core 530. The stroke corresponds to a movement distance of the valve body 550 in which the movable core 540 is abutted against the fixed core 530 after the seat portion 556*a* is detached from the valve seat 560*b*.

Then, when the energization of the electromagnetic coil 591 is stopped again, the magnetic attractive force acting on the movable core 540 is eliminated. Thus, the force acting on the movable core 540 is only the urging force of the spring 580, whereby the movable core 540 starts moving toward the inlet member 520. The movement of the movable core 540 first causes the seat portion 556a to stand on the valve seat 560b. The seat portion 556a sits on the valve seat 560b to terminate the discharge of the fuel from the fuel passage 560a into the injection port 570b, which stops the injection of fuel from the injection port 570b. Even after the seat portion 556a sits on the valve seat 560b, the valve body 550 substantially moves toward the inlet member 520, while the elastic portion 556 is being elastically deformed. Then, when the abutment surface 554a of the valve body 550 is abutted against the tapered surface 570a of the stopper 570, the movement of the valve body 550 toward the inlet member 520 is stopped. At this time, the crushing margin of the elastic portion 556 becomes the predetermined value.

In the following, a method for manufacturing the fuel injector 500 will be described.

(Passage Formation Member Installing Step)

The passage formation member 560 is inserted from the opening 511c of the first magnetic portion 511 into the housing 510 formed by connecting the first magnetic portion 511, the non-magnetic portion 512, and the second magnetic portion 513 by laser welding. The passage formation member 560 is inserted until an end surface 560c of the passage formation member 560 is abutted against the stepped portion 511b of the first magnetic portion 511. Thereafter, the passage formation member 560 is fixed to the housing 510 by laser welding or the like. Thus, the passage formation member 560 is provided between one end and the other end of the housing 510 in the axial direction.

(Valve Body Formation Step)

The elastic portion 556 is attached to the stepped portion 553a of the valve main body 551 by insert molding.

(Distance Measurement Step)

A distance between the opening 511c of the first magnetic portion 511 as the reference position to the valve seat 560b of the passage formation member 560 is measured.

(Insertion Amount Calculation Step)

The amount of insertion of the stopper 570 into the first magnetic portion 511 is calculated based on the result of measurement in the distance measurement step, the dimension of each component of the stopper 570 previously measured, in particular, the distance in which the stopper 570 is abutted against the abutment surface 554a of the valve body 550 within an area from the end surface of the stopper 570 in the axial direction to the tapered surface 570a, and the predetermined crushing margin (predetermined value) of the elastic portion 556. In the present embodiment, the stopper 570 is connected and fixed to the housing 510 by the laser welding or the like. Thus, the insertion amount is calculated by taking into consideration the heat strain generated by the laser welding in the stopper 570 and housing 510.

(Insertion Amount Adjustment Step)

The stopper 570 is inserted from the opening 511c of the first magnetic portion 511 by the amount of insertion calculated in the insertion amount calculation step, whereby the crushing margin of the elastic portion 556 is adjusted to the predetermined value.

(Stopper Fixing Step)

The stopper 570 is connected and fixed to the first magnetic portion 511 by the laser welding. Thus, the relative positional relationship between the passage formation portion 560 and the stopper 570 in the direction along the movement direction of the valve body 550 is fixed, and the abutment surface 554a is abutted against the tapered surface 570a, so that the crushing margin of the elastic portion 556 can be set to the predetermined value when the seat portion 556a of the elastic portion 556 sits on the valve seat 560b. In the present embodiment, a welded part between the first magnetic portion 511 and the stopper 570 lies over the entire periphery. The welding can ensure the sealing between the first magnetic portion 511 and the stopper 570.

(Spring, Fixed Core, and Movable Core Installing Step)

The fixed core 580 is inserted from the second magnetic portion 513. Thereafter, the valve body 550 is inserted from the first magnetic portion 511. The seat member 555 is further inserted from the second magnetic portion 513, and fixed to the coupling portion 552 of the valve body 550. Then, the fixed core 530 is inserted from the second magnetic portion 513 and fixed in a predetermined position. Then, the movable core 540 is inserted from the second magnetic portion 513 and fixed to the coupling portion 552.

(Inlet Member, and Driving Unit Attachment Step)

The inlet member 520 is attached to the second magnetic portion 513, and then both components are connected and fixed together by laser welding or the like. The driving unit 590 comprised of the electromagnetic coil 591, the connector 593, and the yoke 592 is fitted into the outer periphery of the housing 510, and then the yoke 592 is connected and fixed to the housing 510 by the laser welding or the like.

Even in the fuel injector 500 with the structure described above, like the first embodiment, the passage formation portion 560 and the stopper 570 are formed of different materials. With this arrangement, also in the present embodiment, the crushing margin of the elastic portion 556 can be easily adjusted to a predetermined value without increasing the dimensional accuracy of parts of the elastic portion 556 more than necessary, which can exhibit the effect and operation of stabilizing the fuel injection amount while reducing the increase in manufacturing cost. The elastic portion 556 is disposed upstream of the fuel flow with respect to the stopper 570. For example, in use of the fuel injector 500 for direct injection, the elastic portion 556 can be away from the combustion chamber as far as possible. This arrangement can reduce the influence of heat of the combustion gas at high temperature in the combustion chamber to thereby suppress the damage to the elastic portion 556 by the heat (for example, erosion).

In the present embodiment, the passage formation member 560 is disposed between one end and the other end of the housing 510 in the axial direction. Then, the stopper 570 formed of material different from the housing 510 is inserted from the opening 511c of the first magnetic portion 511. After adjustment of the amount of insertion and also adjustment of the crushing margin of the elastic portion 556, the stopper 570 is fixed to the opening 511c.

In this way, the amount of insertion of the stopper 570 fixed to the opening 511c into the housing 510 is adjusted to thereby adjust the crushing margin of the elastic portion 556, which facilitates the adjustment operation of the crushing margin as compared to the case of adjustment of the position of the passage formation member 560 disposed between the one end and the other end of the housing 510.

In the present embodiment, after adjusting the relative positions of the passage formation member 560 and the stopper 570 in the direction along the reciprocating direction of the valve body 550 in the insertion amount adjustment step, the stopper 570 is welded and fixed to the housing 510 in the stopper fixing step. Thus, the relative positions of the passage formation member 560 and the stopper 570 can be firmly fixed to the positions after the adjustment.

In the present embodiment, the stopper 570 is fixed to the housing 510 by welding and fixing, but both the insertion amount adjustment step and the stopper fixing step may be performed at one time. For example, the stopper 570 is pressed-fixed and fixed into the housing 510, which can perform both steps at one time. A method for fixing the stopper 570 may involve caulking and fixing the stopper 570 to the housing 510.

In the present embodiment, the stopper 570 is formed of material different from the housing 510, and the passage formation portion 560 is also formed of material different from the housing 510. When the passage formation member 560 and the stopper 570 are respectively formed of materials different from the housing 510, the adjustment of the relative positions of the stopper 570 and passage formation member 560 for adjusting the crushing margin of the elastic portion 556 might be complicated. In the present embodiment, the stepped portion 511b formed in the first magnetic portion 511 of the housing 510 is abutted against the end surface 560c of the passage formation member 560 to thereby determine the position of the passage formation member 560 with respect to the housing 510. In this way, the adjustment of the relative positions of the stopper 570 and the passage formation member 560 can be performed only by moving the stopper 570. Thus, the fuel injector 500 can be easily manufactured.

The stopper 570 is a part abutted against the valve body 550. Thus, for example, the material that can ensure the shock caused by the abutment against the valve body 550 is preferably selected as material used for the stopper 570. Since in the present embodiment, the stopper 570 is formed of material different from the housing 510, the material for the stopper 570 can be selected without being restricted by the material used for the housing 510.

When the valve body 550 sits on the valve seat 560b, the tapered surface 570a of the stopper 570 is abutted against the abutment surface 554a of the valve body 550. For example, when the tapered surface 570a is formed of material different from the abutment surface 554a, the abutment between both elements is repeatedly performed, which might deform one of them having a lower hardness. This might not be capable of stabilizing the stroke of the valve body 550 for a long term.

For this problem, the present embodiment employs the structure in which the tapered surface 570a of the stopper 570 is formed of the same material as the abutment surface 554a of the valve body 550. With this arrangement, the taper surface 570a can have substantially the same hardness as that of the abutment surface 554a. Therefore, the occurrence of deformation in abutment of the stopper 570 against the valve body 550 can be suppressed.

When the tapered surface 570a and the abutment surface 554a are formed of the same material, the repeated abutment therebetween might cause baking between these surfaces 570a and 554a. For this problem, in the present embodiment, either the surface 570a or 554a has on its front surface, a coated layer 571 made of DLC or polytetrafluoroethylene. This can suppress the occurrence of baking between the stopper 570 and the valve body 550.

Generally, rubber is known as material that makes it difficult to enhance the dimensional accuracy as compared to metal material. As mentioned above, in the present embodiment, the relative positions of the stopper 570 and passage formation member 560 are adjusted by adjusting the crushing margin of the elastic portion 556. In this way, in adjustment of the crushing margin of the elastic portion 556, it is not necessary to improve the dimensional accuracy of the elastic portion 556. Thus, rubber can be used as the elastic portion 556.

In the present embodiment, rubber for use in forming the elastic portion 556 is fluorine rubber. The fluorine rubber is known as material exhibiting elasticity at an ultralow temperature (for example, in a range of −30° C. to −40° C.). In particular, the fluorine rubber is material appropriate in use of gas fuel as the fuel.

In the present embodiment, the fuel handled by the fuel injector 500 is gas fuel. In using the gas fuel as the fuel, the gas fuel can be gasified within the fuel injector 500. Thus, it is very important to ensure the airtightness. In the present embodiment, the seat portion 556a is formed of an elastic material, which can easily ensure the airtightness upon closing the fuel injector 500. The seat portion 556a is suitable for use in gas fuel.

In the present embodiment, the housing 510 corresponds to a "main body", the fuel passage 560a corresponds to a "fuel passage leading to an injection port", the passage formation member 560 corresponds to a "passage formation portion", the valve main body 551 corresponds to a "valve member", the elastic portion 556 corresponds to an "elastic member", and the stopper 570 corresponds to a "movement restricting portion".

In the present embodiment, the process from the passage formation member installing step to the insertion amount adjustment step corresponds to an "adjustment step", and the stopper fixing step corresponds to a "relative position fixing step". Further, the passage formation member installing step corresponds to an "installing step", and the insertion amount adjustment step corresponds to an "insertion step".

SIXTH EMBODIMENT

Figure 12:
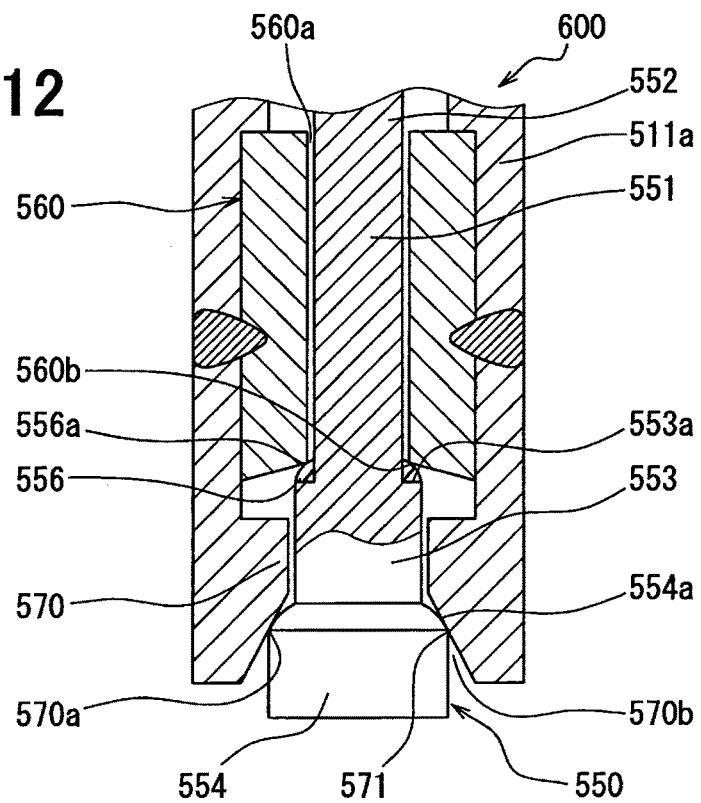
FIG. 12 is another enlarged cross-sectional view showing the structure of the fuel injector according to a sixth embodiment.

In the fifth embodiment, the stopper 570 is a different member from the housing 510. The stopper 570 is connected and fixed to the housing 510 by the laser welding or the like. A fuel injector 600 of a sixth embodiment shown in FIG. 12 has a stopper 570 formed in the housing 510 by cutting or casting. Even with this arrangement, since the passage formation member 560 is still a different member from the stopper 570, the crushing margin of the elastic portion 556 can be adjusted by adjusting the relative positions of the passage formation member 560 and the stopper 570. The sixth embodiment employs the same structure as that in the fifth embodiment except for the above structure, and thus can have the same operation and effects as those of the fifth embodiment.

SEVENTH EMBODIMENT

Figure 13:
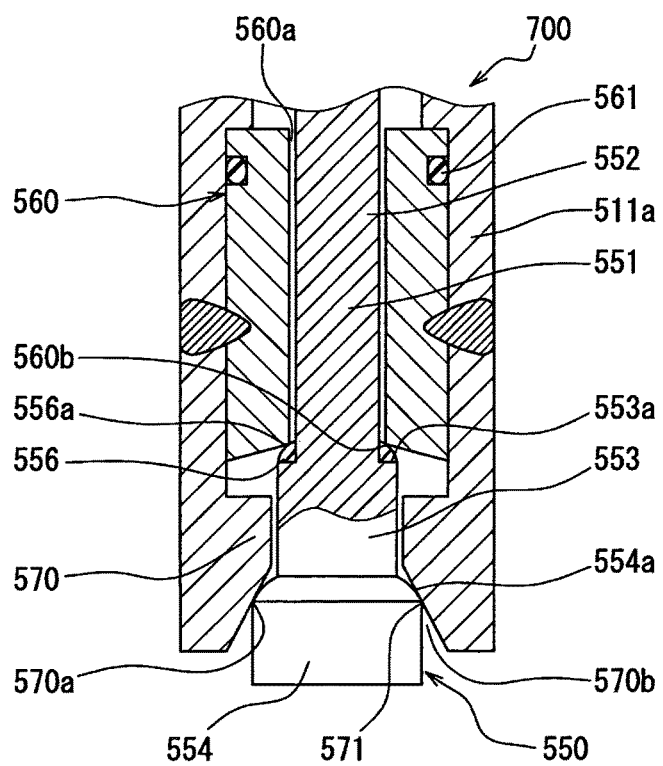
FIG. 13 is another enlarged cross-sectional view showing the structure of the fuel injector according to a seventh embodiment.

In the fifth and sixth embodiments, the laser welding is performed on the entire outer periphery of the passage formation member 560 in the radial direction, so that the passage formation portion 560 is connected and fixed to the housing 510. In a fuel injector 700 of a seventh embodiment shown in FIG. 13, the passage formation member 560 is connected and fixed to the housing 510 not by performing the laser welding or the like on its entire periphery, but by welding several points (spot welding) in its peripheral direction. This structure, however, might generate a clearance between the passage formation member 560 and the housing 510 in between adjacent welded parts to leak the fuel from the clearance. In the present embodiment, an O-ring 561 is provided on the outer peripheral surface in the radial direction of the passage formation member 560. Even when the passage formation member 560 is connected and fixed to the housing 510 by spot welding, the O-ring 561 can ensure the sealability between the housing 510 and the passage formation member 560. The stopper 570 of the present embodiment is integral with the housing 510, but the stopper 570 may be provided separately from the housing 510, like the fifth embodiment.

Eighth Embodiment

Figure 14:
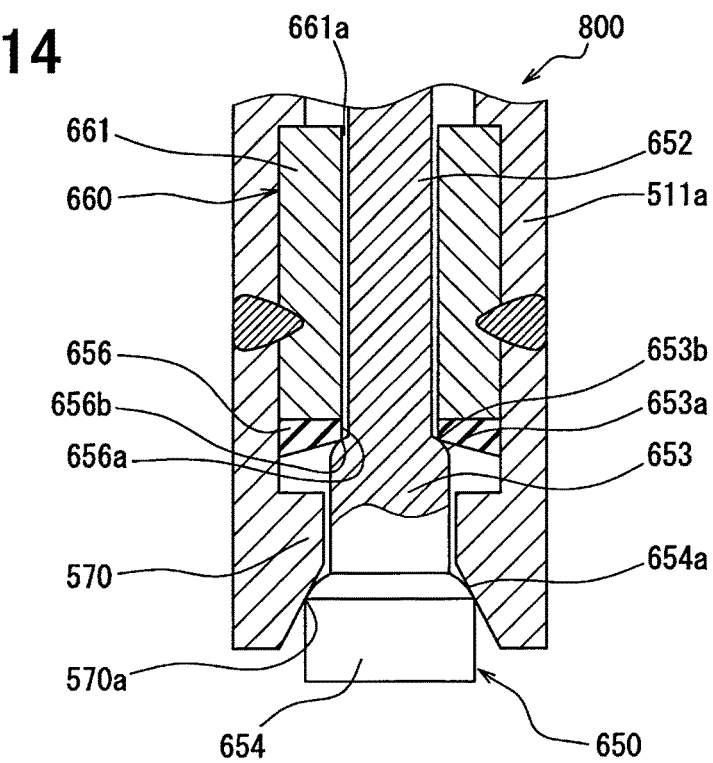
FIG. 14 is another enlarged cross-sectional view showing the structure of the fuel injector according to an eighth embodiment.

In the fifth to seventh embodiments, the elastic portion 656 is provided in the valve body 650 and the seat portion 653b is formed in the elastic portion 656. In a fuel injector 800 of an eighth embodiment shown in FIG. 14, an elastic portion 656 is attached to a passage main body 661 of the passage formation member 660.

In the following, the passage formation member 660 and the valve body 650 having different structures as those of the fifth embodiment will be described in detail. The passage formation member 660 includes a passage main body 661 cylindrically formed of martensite stainless steel, and an elastic portion 656 formed in a disk-like shape of elastic material, such as fluorine rubber.

The passage main body 661 is provided with a fuel passage 661a axially penetrating its center in the axial direction. The inlet member 661 is connected and fixed to the small-diameter portion 511a of the first magnetic portion 511 by laser welding or the like.

The elastic portion 656 is attached to the end surface of the passage main body 661 on the valve body 650. A through hole 656a is formed to axially penetrate the center in the radial direction of the elastic portion 656. The through hole 656a and the fuel passage 661a are arranged coaxially. A valve seat 656b surrounding the through hole 656a is formed on the surface of the elastic portion 656 confronting to the valve body 650.

The valve body 650 is formed in a stick-like shape of martensite stainless steel functioning as a non-magnetic material, and coaxially accommodated on the inner periphery of the first magnetic portion 511. The valve body 650 includes a coupling portion 652, a small-diameter portion 653, and a large-diameter portion 654.

The coupling portion 652 has the same shape and function as those of the coupling portion 652 of the fifth embodiment, and is coupled to the movable core 540. The coupling portion 652 has the same fuel passage as that in the fifth embodiment.

The small-diameter portion 653 is the same as the small-diameter portion 553 of the fifth embodiment, and is disposed on the injection port 570b with respect to the coupling portion 652. Each stepped portion 653a of the small-diameter portion 653 on the coupling portion 652 is provided with a seat portion 653b attachable and detachable on and from a valve seat portion 656b.

A large-diameter portion 654 is the same as the large-diameter portion 554 of the fifth embodiment, and is disposed on the injection port 570b with respect to the small-diameter portion 653. The large-diameter portion 654 has an abutment surface 654a that gradually increases its diameter toward the injection port 570b. The abutment surface 654a is abutted against the tapered surface 570a to thereby restrict the movement of the valve body 650 toward the inlet member 520, that is, the movement of the valve body 650 in the closing direction. The outer diameter of the large-diameter portion 654 is set such that when the valve body 650 moves in the direction of movement of the abutment surface 654a away from the tapered surface 570a, the fuel having passed through between the abutment surface 654a and the tapered surface 570a is guided to the injection port 570b.

By the passage formation member 660 and valve body 650 with the above arrangement, the abutment surface 654a of the valve body 650 is abutted against the taper surface 570a of the stopper 570 to restrict the movement of the valve body 650 toward the inlet member 520, which can set the crushing margin of the elastic portion 656 provided in the passage formation member 660 to the predetermined value.

Next, the adjustment of the crushing margin of the elastic portion 656 will be described below. In the distance measurement step, a distance from the opening 511c of the first magnetic portion 511 as the reference position to the valve seat 656b of the passage formation member 660 is measured. Then, in the inserting amount calculation step, the amount of insertion of the stopper 570 is calculated based on the result of measurement in the distance measurement step, the dimension of each component of the stopper 570 previously measured, in particular, the distance in which the stopper 570 is abutted against the abutment surface 654a of the valve body 650 within an area from the end surface of the stopper 570 in the axial direction to the tapered surface 570a, and the crushing margin (predetermined value) of the elastic portion 656. Thereafter, the stopper 570 is inserted into the opening 511c by the amount of insertion calculated, so that the stopper 570 is connected and fixed to the first magnetic portion 511 by the laser welding or the like. Also in the present embodiment, like the fifth embodiment, the amount of insertion is preferably calculated in view of an occurrence of heat strain of the first magnetic portion 511 and stopper 570 due to the laser welding or the like.

The stopper 570 of the present embodiment is integral with the housing 510, but the stopper 570 and the housing 510 of the fifth embodiment may be provided separately from each other. In the present embodiment, like the seventh embodiment, a method of connecting the passage formation member 660 may involve connecting and fixing the passage formation member 660 to the housing 510 by spot welding. In this case, an O-ring 561 may be provided at the outer peripheral surface in the radial direction of the passage main body 661. Thus, the sealability between the passage main body 661 and the housing 510 can be ensured.

In the present embodiment, the housing 510 corresponds to a "main body" described in the accompanied claims, the fuel passage 661a corresponds to a "fuel passage leading to an injection port", the passage main body 661 corresponds to a "passage formation portion", the valve body 650 corresponds to a "valve member", the elastic portion 656 corresponds to an "elastic member", and the stopper 570 corresponds to a "movement restricting portion".

NINTH EMBODIMENT

A ninth embodiment of the invention will be described below. FIG. 15A shows a cross-sectional view of a fuel injector according to the ninth embodiment; and FIG. 15B shows an enlarged cross-sectional view of a main part of the fuel injector shown in FIG. 15A.

Figure 15:
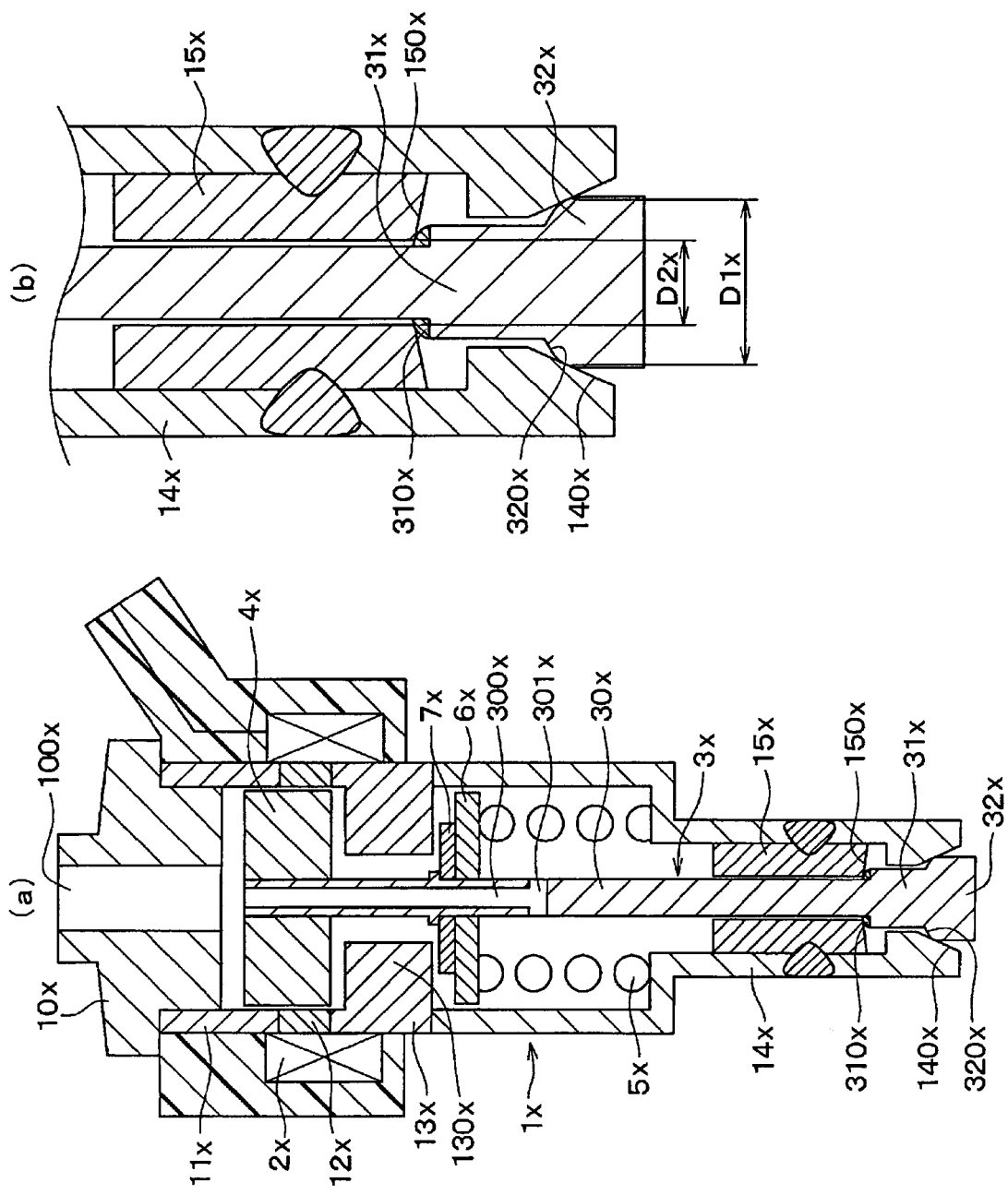
FIGS. 15(*a*) and 15(*b*) are cross-sectional views showing the structure of a fuel injector according to a ninth embodiment.

As shown in FIG. 15, the fuel injector includes a cylindrical body $1x$ formed by connecting a plurality of metal components. A cylindrical coil $2x$ forming a magnetic field in energization is disposed on the outer periphery of the body $1x$. A metal valve body $3x$ reciprocating by being driven by the electromagnetic force is disposed within the body $1x$.

Then, gas fuel, such as hydrogen or CNG (compression natural gas) supplied from the fuel supply device (not shown) flows from the upper end of the body $1x$ as shown on the paper surface of FIG. 15A into the body $1x$, and passes through the body $1x$. Then, the fuel is directly injected into the combustion chamber of the internal combustion engine (not shown) from the lower end of the body 1x as shown on the paper surface of FIG. 15A.

The body 1x, coil 2x and valve body 3x are coaxially arranged. Herein, a common axis line is hereinafter simply referred to as an "axis line", the direction of the common axis line is hereinafter simply referred to as an "axial direction", and the direction vertical to the common axis line is hereinafter simply referred to as a "radial direction".

The body 1x includes cylindrical or substantially cylindrical first to fifth cylindrical portions 10x to 14x arranged in that order from the upstream of the fuel flow toward the downstream of the fuel flow. The sixth cylindrical portion 15x is disposed within the fifth cylindrical portion 14x.

The first cylindrical portion 10x is provided with a fuel inlet hole 100x serving as an inlet for fuel supplied from a fuel supply device. The second cylindrical portion 11x is made of magnetic metal to form a magnetic circuit. The third cylindrical portion 12x is made of non-magnetic metal. The fourth cylindrical portion 13x is made of magnetic metal, and includes a lift restricting portion 130x protruding inward in the radial direction to form the magnetic circuit.

The fifth cylindrical portion 14x serving as a second body is made of metal having excellent corrosion resistance (for example, stainless). A downstream-body-seat portion 140x for opening and closing the fuel passage by connecting and disconnecting to and from a downstream-movable-seat portion (to be described in detail below) of the valve body 3x is formed downstream end of the fuel flow in the fifth cylindrical portion 14x. The downstream-body-seat portion 140x forms a taper expanding from the upstream of the fuel flow toward the downstream of the fuel flow.

The sixth cylindrical portion 15x serving as a first body is made of metal having excellent corrosion resistance (for example, stainless), and disposed upstream of the fuel flow with respect to the downstream-body-seat portion 140x. An upstream-body-seat portion 150x for opening and closing the fuel passage by connecting and disconnecting to and from an upstream-movable-seat portion (to be described in detail below) of the valve body 3x is formed downstream end of the fuel flow of the sixth cylindrical portion 15x. The upstream-body-seat portion 150x forms a taper expanding from the upstream of the fuel flow toward the downstream of the fuel flow.

The valve body 3x includes cylindrical or substantially cylindrical first to third axial portions 30x, 31x, and 32x arranged in that order from the upstream of the fuel flow toward the downstream of the fuel flow. Among the first to third axial portions 30x, 31x, and 32x, the first axial portion 30x has the smallest diameter, and the third axial portion 32x has the largest diameter.

The first axial portion 30x is provided with a valve body vertical hole 300x serving as a fuel passage extending from the end surface upstream of the fuel flow in the axial direction, and a valve body transverse hole 301x extending in the radial direction to serve as a fuel passage for making the valve body vertical hole 300x communicate with a space of the body 1x.

The end of the second axial portion 31x upstream of the fuel flow is bonded to a ring-like upstream-movable-seat portion 310x made of elastic material having more excellent heat resistance and elasticity than metal. The upstream-movable-seat portion 310x is adapted to open and close the fuel passage by being connected and disconnected to and from the upstream-body-seat portion 150x of the body 1x.

Specifically, the upstream-movable-seat portion 310x can be formed using fluororubber, acrylonitrile butadiene rubber (NBR), fluororesin, tetrafluoro ethylene (PTFE), polybutylene terephthalate (PBT), and the like.

In the upstream valve portion comprised of the upstream-body-seat portion 150x and the upstream-movable-seat portion 310x, one of the seat portions is formed of elastic material. Hereinafter, the upstream valve body is referred to as an "elastic seal valve portion".

A downstream-movable-seat portion 320x is formed at the end of the third axial portion 32x upstream of the fuel flow. The downstream-movable-seat portion 320x is adapted to open and close the fuel passage by being connected and disconnected to and from the downstream body seat 140x of the body 1x. The downstream-movable-seat portion 320x is positioned above the downstream of the fuel flow with respect to the upstream-movable-seat portion 310x.

In the downstream valve portion comprised of the downstream-body-seat portion 140x and the downstream-movable-seat portion 320x, both the seat portions are formed of metal. Hereinafter, the downstream valve portion is referred to as a "metal seal valve portion".

The taper angle of the upstream-body-seat portion 150x is larger than that of the downstream-body-seat portion 140x so that an area of the flow passage of the metal seal valve portion in opening the valve is smaller than that of the elastic seal valve portion in opening the valve, and so that a seat diameter D2x of the elastic seal valve portion is smaller than a seat diameter D1x of the metal seal valve portion.

The upstream-movable-seat portion 310x and the downstream-movable-seat portion 320x are arranged along the reciprocating direction (that is, the axial direction) of the valve body 3x. The valve body 3x moves in the direction from the upstream-movable-seat portion 310x to the downstream-movable-seat portion 320x (that is, downward shown on the paper surface of FIG. 15) to thereby open the fuel passage. In short, the fuel injector of the present embodiment serves as the so-called outward opening valve.

An armature 4x made of magnetic metal is bonded to the end of the upstream of the fuel flow in the first axis portion 30x. In more details, the armature 4x is positioned in a space enclosed by the first to fourth cylindrical portions 10x to 13 of the body 1x, that is, upstream of the fuel flow with respect to the lift restricting portion 130x of the fourth cylindrical portion 13x. The valve body 3x and the armature 4x form the movable portion of the invention.

A spring 5x for urging the valve body 3x in the direction for closing the valve is disposed in a space enclosed by the fourth to sixth cylindrical portions 13x to 15x of the body 1x, that is, downstream of the fuel flow of the fourth cylindrical portion 13x with respect to the lift restricting portion 130x. In other words, the elastic seal valve portion and the metal seal valve portion are disposed downstream of the fuel flow with respect to the spring 5x. The spring 5x is a coil spring, and the valve body 3x is disposed to penetrate the spring 5x.

A spring bearing 6x for receiving the spring 5x and a shim 7x with a C-ring structure for adjusting the set load on the spring 5x are arranged on the outer periphery of the intermediate portion in the axial direction of the first axial portion 30x.

Next, the operation of the fuel injector with the above structure will be described below. First, when the coil 2x is energized, the armature 4x is attracted by an electromagnetic force toward the lift restricting portion 130x. The valve body 3x moves together with the armature 4x to separate the upstream-movable-seat portion 310x from the upstream-body-seat portion 150x, thereby bringing the elastic seal valve portion into a valve-opening state, while separating the downstream-movable-seat portion 320x from the downstream-body-seat portion 140x, thereby bringing the metal seal valve portion into a valve-opening state, so that the gas fuel is injected into the combustion chamber.

The attraction pressure required for opening the valve has a correlation with the following value: (an area for receiving the pressure of the elastic seal valve portion)×(fuel pressure). A seat diameter D2x of the elastic seal valve is smaller than a seat diameter D1x of the metal seal valve, whereby the pressure receiving area of the elastic seal valve is smaller than that of the metal seal valve, resulting in a small attractive force required to open the valve.

When the energization of the coil 2x is stopped, the valve body 3x is urged toward the first cylindrical portion 10x (that is, in the direction for closing the valve) by the spring 5x. Thus, first, the upstream-movable-seat portion 310x is abutted against the upstream-body-seat portion 150x, bringing the elastic seal valve into the valve closing state to stop the injection of the gas fuel. The upstream-movable-seat portion 310x is made of elastic material, which can ensure the good sealability upon closing the valve. The upstream-movable-seat portion 310x is compressed in the axial direction to cause the downstream-movable-seat portion 320x to be into abutment against the downstream-body-seat portion 140x, bringing the metal seal valve into the valve closing state.

In the internal combustion engine of a type in which gas fuel is directly injected into the combustion chamber, the fuel is normally ignited by an ignition plug after the end of injection of the fuel and then burned. When the combustion gas is intended to flow into the fuel injector, the metal seal valve portion is in the valve closing state. Thus, by closing the metal seal valve portion, the combustion gas at high temperature can be prevented from flowing to the elastic seal valve portion, thereby preventing the erosion of the upstream-movable-seat portion 310x.

In an internal combustion engine of a type in which fuel is ignited and burned during the injection of the fuel, the supply pressure of the gas fuel is set higher than the combustion gas pressure, so that the combustion gas cannot reach the upstream-movable-seat portion 310x. The metal seal valve portion allows a slight leak of the fuel even during closing the valve. This is because when the combustion gas is intended to leak, the gas is expanded and then the temperature of the gas is decreased, so that even the high-temperature combustion gas might be brought into a very low-temperature state upon reaching the upstream-movable-seat portion 310x, which does not lead to the erosion of the upstream-movable-seat portion 310x.

As the distance between the elastic seal valve portion and the metal seal valve portion in the axial direction becomes longer, the influence of heat of the combustion gas on the upstream-movable-seat portion 310x can be reduced. The leak of the fuel remaining between the elastic seal valve portion and the metal seal valve portion into the combustion chamber during closing the valve is undesirable from the viewpoint of controlling the combustion of the internal combustion engine. Therefore, taking into consideration both factors described above, the distance between the elastic seal valve portion and the metal seal valve portion in the axial direction is desirably set.

Next, a method for manufacturing the fuel injector with the above structure will be described below.

A target set load on the metal seal valve portion comprised of the downstream-body-seat portion 140x and the downstream-movable-seat portion 320x is set to a metal seal valve portion set-load set value F1x. A target set load on the elastic seal valve portion comprised of the upstream-body-seat portion 150x and the upstream-movable-seat portion 310x is set to an elastic seal valve portion set-load set value F2x. The sum of the metal seal valve portion set-load set value F1x and the elastic seal valve portion set-load set value F2x is set as a whole set-load set value Fx.

The fifth cylindrical portion 14x is assembled to the valve body 3x, and the valve body 3x is urged by use of a first jig (not shown) to press the downstream-movable-seat portion 320x against the downstream-body-seat portion 140x. At this time, the first jig urges the valve body 3x by a load corresponding to the whole set-load set value Fx.

Subsequently, with this state being kept, the sixth cylindrical portion 15x is inserted into the fifth cylindrical portion 14x, and the sixth cylindrical portion 15x is urged by a second jig (not shown) to press the upstream-body-seat portion 150x against the upstream-movable-seat portion 310x. At this time, the second jig urges the sixth cylindrical portion 15x by a load corresponding to the elastic seal valve portion set-load set value F2x.

In this state, a force pressing the downstream-movable-seat portion 320x against the downstream-body-seat portion 140x is decreased by a force pressing the upstream-body-seat portion 150x against the upstream-movable-seat portion 310x with respect to the urged force by the first jig, and thus corresponds to the metal seal valve portion set-load set value F1x.

Thus, the relative positional relationship between the fifth cylindrical portion 14x and the sixth cylindrical portion 15x at this time takes the optimal positional relationship between the fifth cylindrical portion 14x and the sixth cylindrical portion 15x from the viewpoint of managing the set load on the metal seal valve portion and the set load on the elastic seal valve portion with high accuracy.

Subsequently, with the state being kept, the fifth cylindrical portion 14x is integral with the sixth cylindrical portion 15x by welding. At this time, by the full-circle welding, the airtightness between the fifth cylindrical portion 14x and the sixth cylindrical portion 15x is ensured.

Subsequently, the spring 5x is assembled to the spring bearing 6x, and the set length of the spring 5x is adjusted by the shim 7x such that the set load on the spring 5x is a load corresponding to the entire set-load set value Fx. Thus, the metal seal valve portion undergoes the load corresponding to a metal seal valve portion set-load set value F1x, and the elastic seal valve portion undergoes the load corresponding to the elastic seal valve portion set-load set value F2x. As mentioned above, in the present embodiment, the relative positions of the fifth cylindrical portion 14x and the sixth cylindrical portion 15x are adjusted in the assembly stage, which can easily manage the set load on the elastic seal valve portion, and the set load on the metal seal valve portion with high accuracy even though the body 1x or valve body 3x is not processed with high accuracy.

The seat diameter D2x of the elastic seal valve portion is smaller than the seat diameter D1x of the metal seal valve portion, which can decrease the attractive force required to open the valve.

Figure 16:
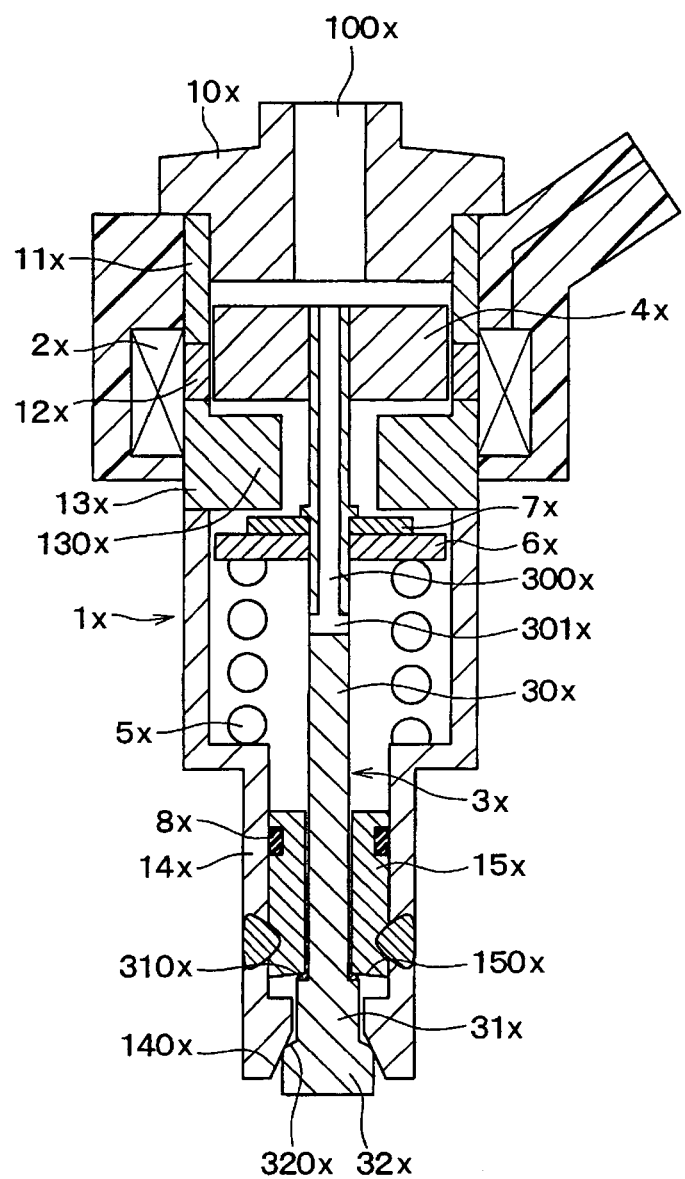
FIG. 16 is a cross-sectional view showing a first modification of the ninth embodiment.

Although in the above embodiments, the fifth cylindrical portion 14x and the sixth cylindrical portion 15x are subjected to the full-circle welding, in a first modified example of the ninth embodiment shown in FIG. 16, the fifth cylindrical portion 14x may be discontinuously integral with the sixth cylindrical portion 15x to seal the clearance between the fifth cylindrical portion 14x and the sixth cylindrical portion 15x with a seal member 8x. This method can reduce a welding cost as compared to full-circle welding.

Figure 17:
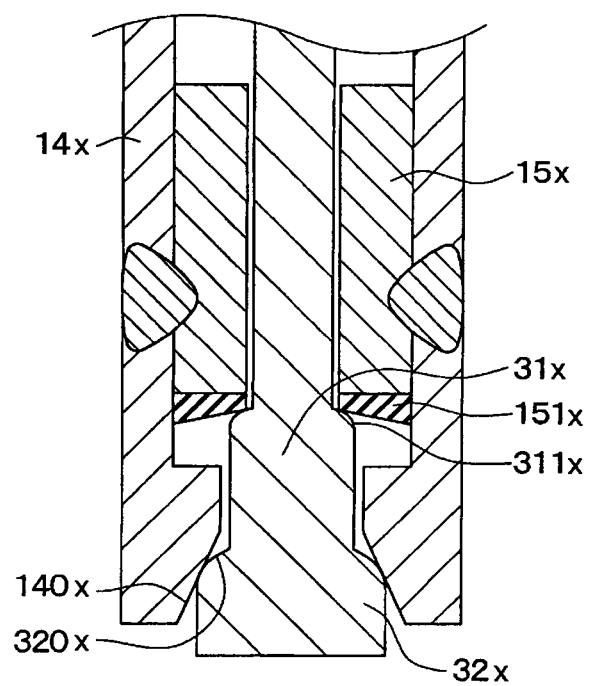
FIG. 17 is a cross-sectional view showing a second modification of the ninth embodiment.

In the above embodiments, the upstream-movable-seat portion 310x is formed of elastic material, and the upstreambody-seat portion 150x is made of metal. In a second modified example of the ninth embodiment shown in FIG. 17, a disk-like upstream-body-seat portion 151x made of elastic material with more excellent elasticity and heat resistance than metal is bonded to the end part of the sixth cylindrical portion 15x downstream of the fuel flow. An upstream-movable-seat portion 311x may be formed at an upstream end of the fuel flow of the second axis portion 31x. The movable seat portion 311x is adapted to open and close the fuel passage by connecting and disconnecting to or from the upstream-body-seat portion 151x. That is, the upstream-body-seat portion 151x may be formed of elastic material, whereas the upstream-movable-seat portion 311x may be formed of metal.

The upstream-body-seat portion 151x forms a taper expanding from the upstream of the fuel flow toward the downstream of the fuel flow. The taper angle of the upstream-body-seat portion 151x is larger than that of the downstream-body-seat portion 140x.

In the second modified example, the upstream-body-seat portion 151x is bonded to the sixth cylindrical portion 15x having a simpler structure than the valve body 3x. The bonding is easily performed.

TENTH EMBODIMENT

Figure 18:
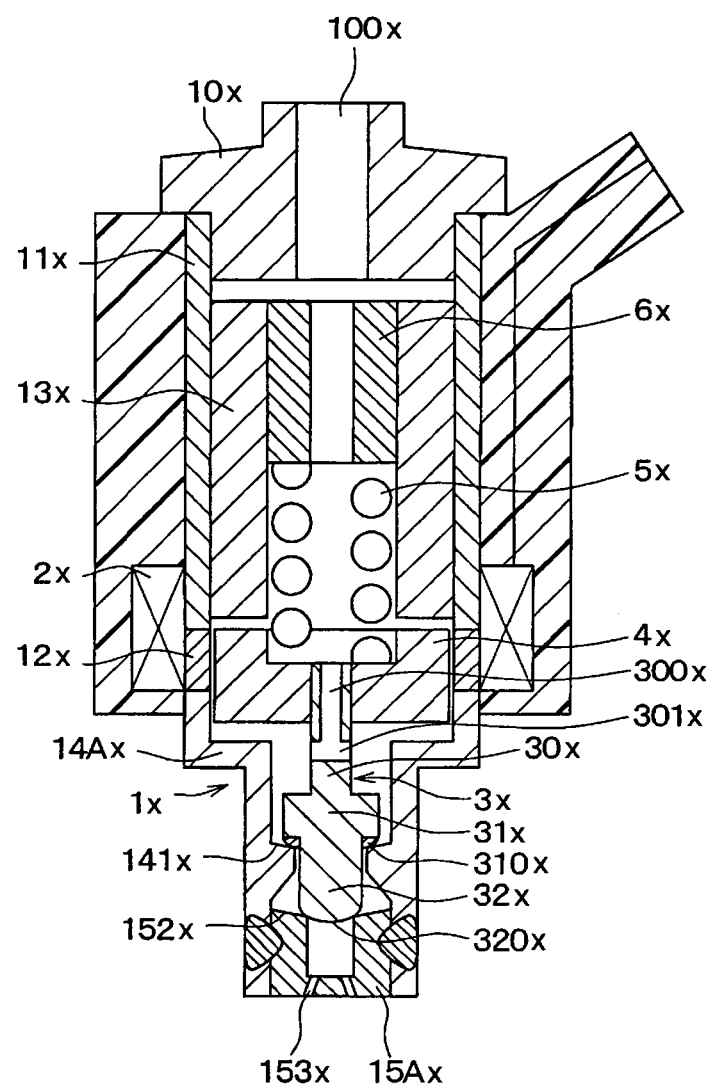
FIG. 18 is a cross-sectional view showing a fuel injector according to a tenth embodiment.

A tenth embodiment of the invention will be described below. FIG. 18 shows a cross-sectional view of a fuel injector according to a tenth embodiment of the invention.

The fuel injector of the ninth embodiment is the so-called outward-opening valve. On the other hand, the fuel injector of the present embodiment is the so-called inward-opening valve. In the following, only different parts from in the ninth embodiment will be described.

As shown in FIG. 18, in the body 1x, the fourth cylindrical portion 13x is disposed in the second cylindrical portion 11x, and the sixth cylindrical portion 15Ax with a bottom is disposed in the fifth cylindrical portion 14Ax. The fourth cylindrical portion 13x is made of magnetic metal, and serves as a lift restricting portion disposed opposed to the armature 4x.

An upstream-body-seat portion 141x is formed at the center of the fifth cylindrical portion 14A as the first body in the axial direction. The upstream-body-seat portion is adapted for opening and closing the fuel passage by connecting and disconnecting to and from the upstream-movable-seat portion (to be described in detail below) of the valve body 3x. The upstream-body-seat portion 141x forms a taper expanding from downstream to upstream of the fuel flow.

The sixth cylindrical portion 15Ax as the second body is disposed downstream of the fuel flow with respect to the upstream-body-seat portion 141x. A downstream-body-seat portion 152x is formed at the upstream end of the fuel flow in the sixth cylindrical portion 15Ax. The seat portion 152x is adapted for opening and closing the fuel passage by connecting and disconnecting to and from the downstream-movable-seat portion (to be described in detail below) of the valve body 3x. The downstream-body-seat portion 152x forms a taper expanding from the downstream of the fuel flow toward the upstream of the fuel flow.

An injection port 153x is formed at the end of the sixth cylindrical portion 15Ax downstream of the fuel flow. The injection port 153x is effective for making the particles of liquid fuel into very fine particles. Thus, the fuel injector of the present embodiment is suitable for use in liquid fuel.

The valve body 3x includes cylindrical first to third axial portions 30x, 31x, and 32x arranged in that order from the upstream of the fuel flow toward the downstream of the fuel flow. Among the first to third axial portions 30x, 31x, and 32x, the first axial portion 30x has the smallest diameter, and the second axial portion 31x has the largest diameter.

The end of the second axial portion 31x downstream of the fuel flow is bonded to a ring-shaped upstream-movable-seat portion 310x made of elastic material having more excellent heat resistance and elasticity than metal. The upstream-movable-seat portion 310x is adapted to open and close the fuel passage by being connected and disconnected to and from the upstream-body-seat portion 141x of the body 1x.

Specifically, the upstream-movable-seat portion 310x can be formed using fluororubber, acrylonitrile butadiene rubber (NBR), fluororesin, tetrafluoro ethylene (PTFE), polybutylene terephthalate (PBT), and the like.

In the upstream valve body comprised of the upstream-body-seat portion 141x and the upstream-movable-seat portion 310x, one of the seat portions is formed of elastic material. Hereinafter, the upstream valve body is referred to as an "elastic seal valve portion".

A downstream-movable-seat portion 320x is formed at the end of the third axial portion 32x downstream of the fuel flow. The downstream-movable-seat portion 320x is adapted to open and close the fuel passage by being connected and disconnected to and from the downstream-body-seat portion 152x of the body 1x. The downstream-movable-seat portion 320x is positioned above the downstream of the fuel flow with respect to the upstream-movable-seat portion 310x.

In the downstream valve body comprised of the downstream-body-seat portion 152x and the downstream-movable-seat portion 320x, both the seat portions are formed of metal. Hereinafter, the downstream valve body is referred to as a "metal seal valve portion".

The upstream-movable-seat portion 310x and the downstream-movable-seat portion 320x are arranged along the reciprocating direction (that is, the axial direction) of the valve body 3x. The valve body 3x moves in the direction from the downstream-movable-seat portion 320x to the upstream-movable-seat portion 310x (that is, upward shown on the paper surface of FIG. 18) to thereby open the fuel passage. In short, the fuel injector of the present embodiment serves as the so-called inward opening valve.

The armature 4x made of magnetic metal is bonded to the end of the first axis portion 30x upstream of the fuel flow. In more details, the armature 4x is positioned in a space enclosed by the second to fifth cylindrical portions 11x to 14x of the body 1x, that is, downstream of the fuel flow with respect to the fourth cylindrical portion 13x.

A cylindrical spring bearing 6x is fitted into the fourth cylindrical portion 13x. The spring 5x is disposed between the spring bearing 6x and the armature 4x to urge the valve body 3x in the direction for closing the valve.

Next, the operation of the fuel injector with the above structure will be described below. First, when the coil 2x is energized, the armature 4x is attracted toward the fourth cylindrical portion 13x by the electromagnetic force. The valve body 3x moves together with the armature 4x to separate the upstream-movable-seat portion 310x from the upstream-body-seat portion 141x, thereby bringing the elastic seal valve portion into a valve-opening state, while separating the downstream-movable-seat portion 320x from the downstream-body-seat portion 152x, thereby bringing the metal seal valve portion into a valve-opening state, so that the fuel is injected into the combustion chamber via the injection port 153x.

When the energization of the coil 2x is stopped, the valve body 3x is urged toward the sixth cylindrical portion 15Ax (that is, in the direction for closing the valve) by the spring 5x. Thus, first, the upstream-movable-seat portion 310x is abutted against the upstream-body-seat portion 141x, bringing the elastic seal valve portion into the valve closing state to stop the injection of the fuel. The upstream-movable-seat portion 310x is made of elastic material, which can ensure the good sealability upon closing the valve. The upstream-movable-seat portion 310x is compressed in the axial direction to cause the downstream-movable-seat portion 320x to be into abutment against the downstream-body-seat portion 152x, bringing the metal seal valve into the valve closing state. The upstream-movable-seat portion 310x is made of elastic material, which can ensure the good sealability upon closing the valve. The upstream-movable-seat portion 310x is compressed in the axial direction to cause the downstream-movable-seat portion 320x to be into abutment against the downstream-body-seat portion 152x, bringing the metal seal valve into the valve closing state.

Next, a method for manufacturing the fuel injector with the above structure will be described below.

A target set load on the metal seal valve portion comprised of the downstream-body-seat portion 152x and the downstream-movable-seat portion 320x is set to a metal seal valve portion set-load set value F1x. A target set load on the elastic seal valve portion comprised of the upstream-body-seat portion 141x and the upstream-movable-seat portion 310x is set to an elastic seal valve portion set-load set value F2x. The sum of the metal seal valve portion set-load set value F1 and the elastic seal valve portion set-load set value F2x is set as a whole set-load set value Fx.

First, the second cylindrical portion 11x, the third cylindrical portion 12x, and the fifth cylindrical portion 14Ax are bonded together into an integrated member, to which the valve body 3x is assembled. The valve body 3x is urged by the first jig (not shown), thereby pressing the upstream-movable-seat portion 310x with the upper body seat portion 141x. At this time, the first jig urges the valve body 3x by a load corresponding to the whole set-load set value Fx.

Subsequently, with this state being kept, the sixth cylindrical portion 15Ax is inserted into the fifth cylindrical portion 14Ax, and the sixth cylindrical portion 15Ax is urged by a second jig (not shown) to press the downstream-body-seat portion 152x against the downstream-movable-seat portion 320x. At this time, the second jig urges the sixth cylindrical portion 15Ax by use of a load corresponding to the metal seal valve portion set-load set value F1x.

In this state, a force actually pressing the upstream-movable-seat portion 310x against the upstream-body-seat portion 141x is decreased by a force pressing the downstream-body-seat portion 152x against the downstream-movable-seat portion 320x with respect to the urged force by the first jig, and thus corresponds to the elastic seal valve portion set-load set value F2x.

Thus, the relative positional relationship between the fifth cylindrical portion 14Ax and the sixth cylindrical portion 15Ax at this time takes the optimal positional relationship between the fifth cylindrical portion 14Ax and the sixth cylindrical portion 15Ax from the viewpoint of managing the set load on the metal seal valve portion and the set load on the elastic seal valve portion with high accuracy.

Subsequently, with the state being kept, the fifth cylindrical portion 14Ax is integral with the sixth cylindrical portion 15Ax by welding. At this time, by the full-circle welding, the airtightness between the fifth cylindrical portion 14Ax and the sixth cylindrical portion 15Ax is ensured.

Subsequently, the spring 5x is assembled, and then the set length of the spring 5x is adjusted by adjusting the amount of press-fitting of the spring bearing 6x such that the set load on the spring 5x becomes a load corresponding to the entire set-load set value Fx. Thus, the metal seal valve portion undergoes the load corresponding to a metal seal valve portion set-load set value F1x, and the elastic seal valve portion undergoes the load corresponding to the elastic seal valve portion set-load set value F2x.

When a load urging the valve body 3x by the fuel pressure in the direction closing the valve is indicated by reference character F3, the set length of the spring 5x may be adjusted by controlling the amount of press-fitting of the spring bearing 6x such that the set load on the spring 5x becomes Fx-F3x. Thus, when the fuel pressure is applied to the valve body 3x, the metal seal valve portion undergoes the load corresponding to the metal seal valve portion set-load set value F1x, and the elastic seal valve portion undergoes the load corresponding to the elastic seal valve portion set-load set value F2x.

As mentioned above, in the present embodiment, the relative positions of the fifth cylindrical portion 14Ax and the sixth cylindrical portion 15Ax are adjusted in the assembly stage, which can easily manage the set load on the elastic seal valve portion, and the set load on the metal seal valve portion with high accuracy even though the body 1x or valve body 3x are not processed with high accuracy.

Figure 19:
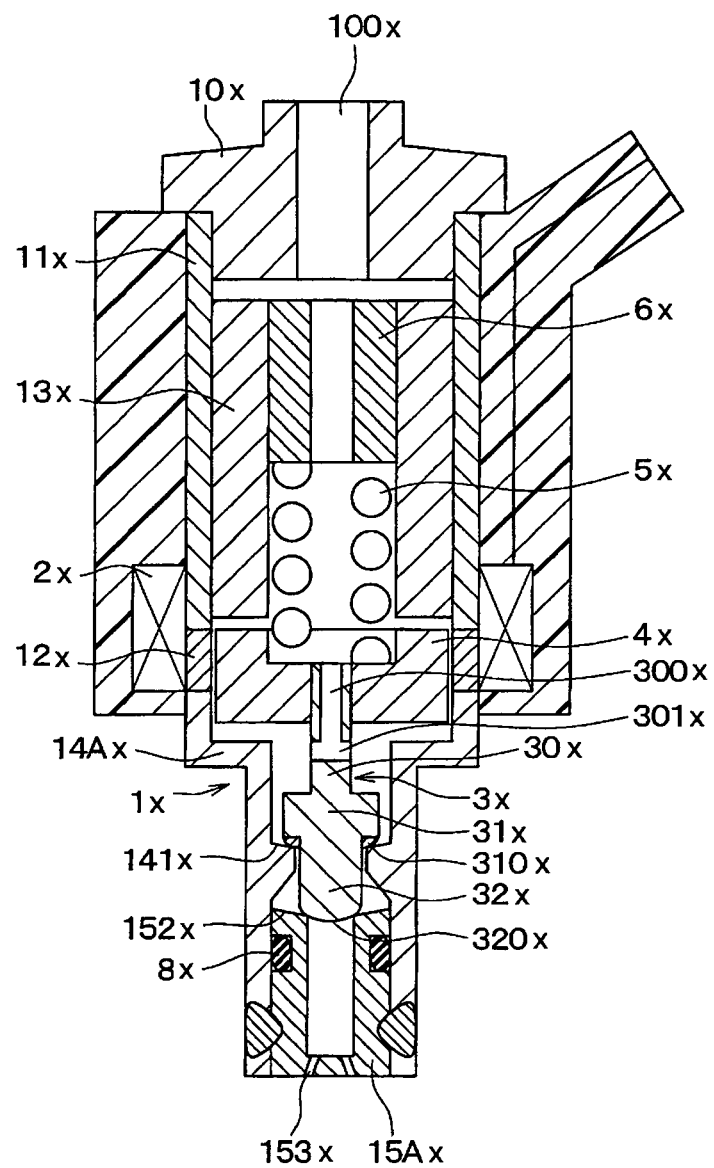
FIG. 19 is a cross-sectional view showing a first modification of the tenth embodiment.

In the above embodiment, the fifth cylindrical portion 14Ax and the sixth cylindrical portion 15Ax are subjected to the full-circle welding. Like a first modified example of the tenth embodiment shown in FIG. 19, the fifth cylindrical portion 14Ax and the sixth cylindrical portion 15Ax may be discontinuously integral with each other by welding to seal a clearance between the fifth and sixth cylindrical portions 14Ax and 15Ax with a sealing member 8x. This method can reduce a welding cost as compared to the full-circle welding.

ELEVENTH EMBODIMENT

Figure 20:
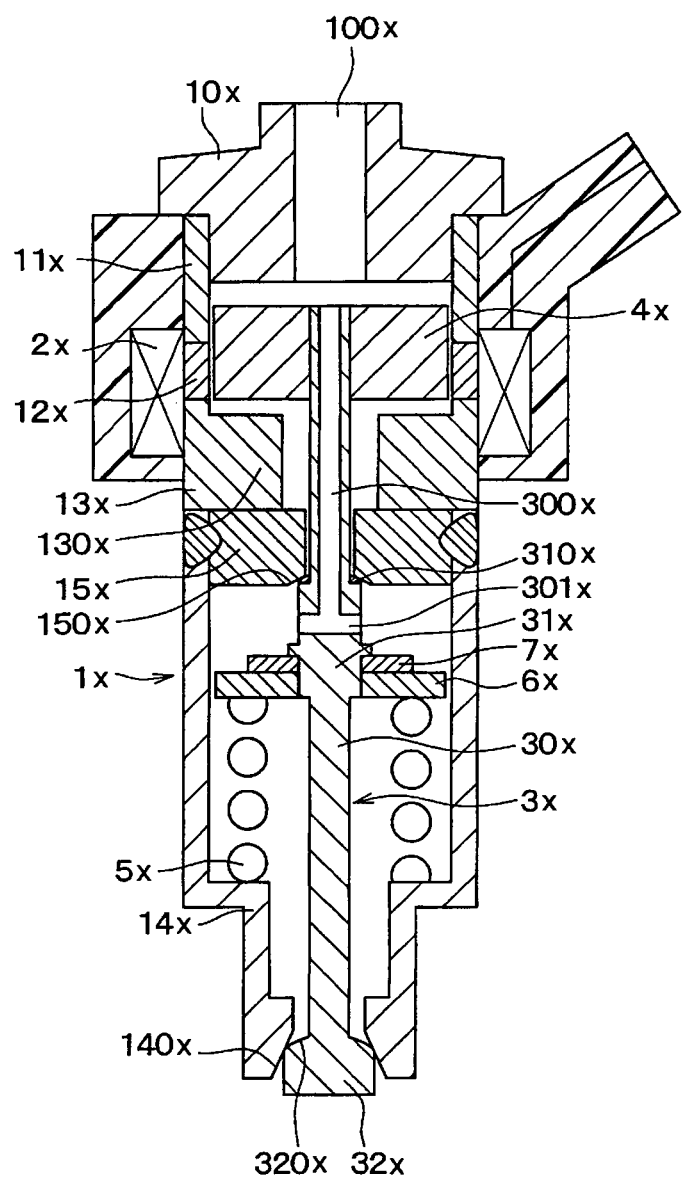
FIG. 20 is a cross-sectional view showing a fuel injector according to an eleventh embodiment.

An eleventh embodiment of the invention will be described below. FIG. 20 shows a cross-sectional view of a fuel injector according to an eleventh embodiment of the invention.

The present embodiment of the invention differs from the ninth embodiment in position of the elastic seal valve portion. In other points, the present embodiment is the same as the ninth embodiment, and thus only the different parts of the present embodiment from the ninth embodiment will be described below.

As shown in FIG. 20, the upstream-body-seat portion 150x formed in the sixth cylindrical portion 15x, and the upstream-movable-seat portion 310x bonded to the second axial portion 31x are disposed upstream of the fuel flow with respect to the spring 5x, spring bearing 6x, and shim 7x. That is, the elastic seal valve portion comprised of the upstream-body-seat portion 150x and the upstream-movable-seat portion 310x is located upstream of the fuel flow with respect to the spring 5x, spring bearing 6x, and shim 7x.

The valve body vertical hole 300x extends to the second axial portion 31x. The valve body transverse hole 301x is formed in the second axial portion 31x downstream of the fuel flow with respect to the upstream-movable-seat portion 310x.

Next, a method for manufacturing the fuel injector with the above structure will be described below.

First, the fifth cylindrical portion 14x, the valve body 3x, the spring 5x, the spring bearing 6x, and the shim 7x are assembled together to cause the spring 5x to urge the valve body 3x to thereby press the downstream-movable-seat portion 320x against the downstream-body-seat portion 140x. At this time, the set length of the spring 5x is adjusted by the shim 7x such that the set load on the spring 5x is a load corresponding to the entire set-load set value Fx.

Subsequently, with this state being kept, the sixth cylindrical portion 15x is inserted into the fifth cylindrical portion 14x, and the sixth cylindrical portion 15x is urged by a jig (not shown) to press the upstream-body-seat portion 150x against the upstream-movable-seat portion 310x. At this time, the jig urges the sixth cylindrical portion 15x by a load corresponding to the elastic seal valve portion set-load set value F2x.

In this state, a force pressing the downstream-movable-seat portion 320x against the downstream-body-seat portion 140x is decreased by a force pressing the upstream-body-seat portion 150x against the upstream-movable-seat portion 310x with respect to the set load on the spring 5x, and thus corresponds to the metal seal valve portion set-load set value F1x.

Subsequently, with the state being kept, the fifth cylindrical portion 14x is integral with the sixth cylindrical portion 15x by welding. At this time, by the full-circle welding, the airtightness between the fifth cylindrical portion 14x and the sixth cylindrical portion 15x is ensured.

Thus, the metal seal valve portion undergoes the load corresponding to the metal seal valve portion set-load set value F1x, and the elastic seal valve portion undergoes the load corresponding to the elastic seal valve portion set-load set value F2x.

As mentioned above, in the present embodiment, the relative positions of the fifth cylindrical portion 14x and the sixth cylindrical portion 15x are adjusted in the assembly stage, which can easily manage the set load on the elastic seal valve portion, and the set load on the metal seal valve portion with high accuracy even though the body 1x or valve body 3x are not processed with high accuracy.

The elastic seal valve portion is disposed upstream of the fuel flow with respect to the spring 5x or the like, and the metal seal valve portion is disposed downstream of the fuel flow with respect to the spring 5x or the like, which can increase the distance between the elastic seal valve portion and the metal seal valve portion in the axial direction to further reduce the influences of heat of the combustion gas on the upstream-movable-seat portion 310x.

TWELFTH EMBODIMENT

Figure 21:
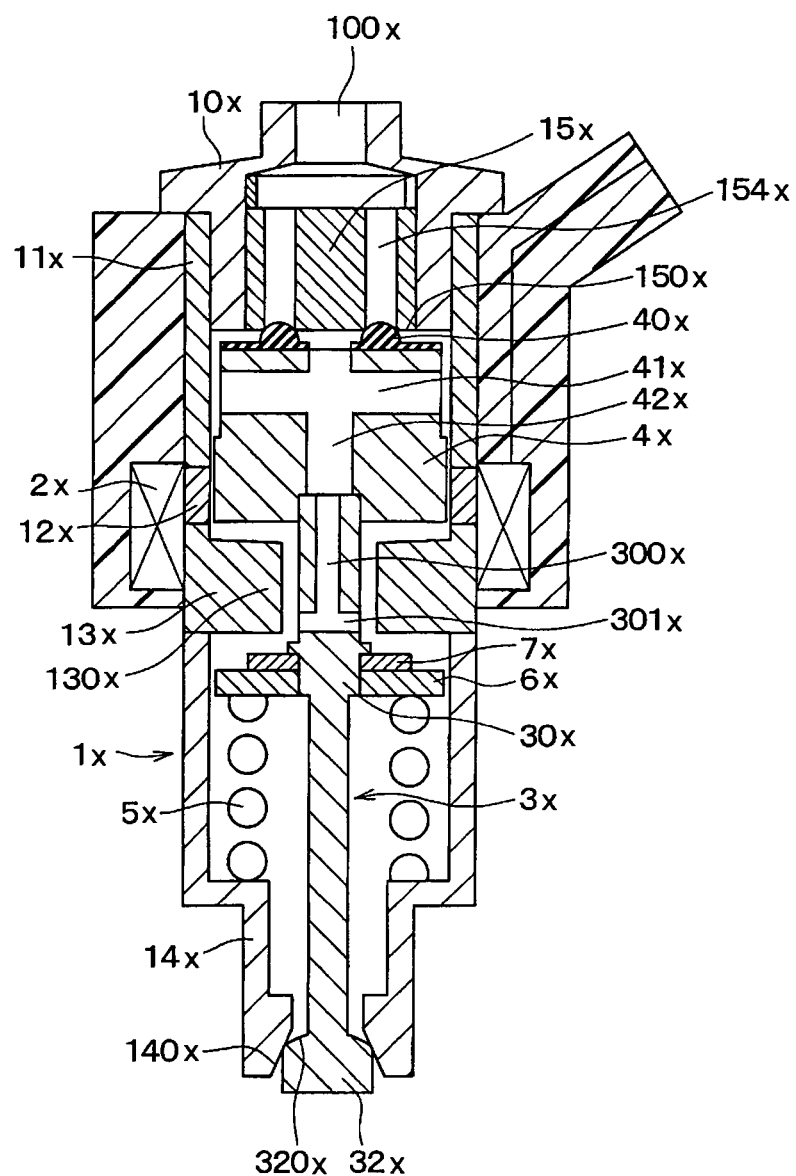
FIG. 21 is a cross-sectional view showing a fuel injector according to a twelfth embodiment.

A twelfth embodiment of the invention will be described below. FIG. 21 shows a cross-sectional view of a fuel injector according to the twelfth embodiment of the invention. In the following, only different parts from in the ninth embodiment will be described.

As shown in FIG. 21, the valve body 3x includes a first axial portion 30x and a third axial portion 32x without having the second axial portion.

The sixth cylindrical portion 15x as the first body is disposed in the first cylindrical portion 10x. In other words, the sixth cylindrical portion 15x is positioned above the upstream of the fuel flow with respect to the lift restricting portion 130x or armature 4x of the fourth cylindrical portion 13x. The sixth cylindrical portion 15x has a cylindrical vertical hole 154x formed therein as a fuel passage. An upstream-body-seat portion 150x is formed downstream end of the fuel flow of the cylindrical vertical hole 154x in the sixth cylindrical portion 15x, and adapted for opening and closing the fuel passage by connecting and disconnecting to and from the upstream-movable-seat portion (to be described in detail below).

The end of the armature 4x upstream of the fuel flow is bonded to an upstream-movable-seat portion 40x made of elastic material having more excellent heat resistance and elasticity than metal. The armature 4x has an armature transverse hole 41x and an armature vertical hole 42x formed as the fuel passage.

The upstream-movable-seat portion 40x is adapted to open and close the fuel passage by being connected and disconnected to and from the upstream-body-seat portion 150x of the body 1x. Specifically, the upstream-movable-seat portion 40x can be formed using fluororubber, acrylonitrile butadiene rubber (NBR), fluororesin, tetrafluoroethylene (PTFE), polybutylene terephthalate resin (PBT), and the like.

In the upstream valve body comprised of the upstream-body-seat portion 150x and the upstream-movable-seat portion 40x, one of the seat portions is formed of elastic material. Hereinafter, the upstream valve body is referred to as an "elastic seal valve portion".

Next, the operation of the fuel injector with the above structure will be described below. First, when the coil 2x is energized, the armature 4x is attracted toward the lift restricting portion 130x by the electromagnetic force. The valve body 3x moves together with the armature 4x to separate the upstream-movable-seat portion 40x from the upstream-body-seat portion 150x, thereby bringing the elastic seal valve portion into a valve-opening state, while separating the downstream-movable-seat portion 320x from the downstream-body-seat portion 140x, thereby bringing the metal seal valve portion into a valve-opening state, so that the gas fuel is injected into the combustion chamber.

When the energization of the coil 2x is stopped, the valve body 3x is urged toward the first cylindrical portion 10x and the sixth cylindrical portion 15x (that is, in the direction closing the valve) by the spring 5x. Thus, first, the upstream-movable-seat portion 40x is abutted against the upstream-body-seat portion 150x, bringing the elastic seal valve portion into the valve closing state to stop the injection of the gas fuel. The upstream-movable-seat portion 40x is made of elastic material, which can ensure the good sealability upon closing the valve. The upstream-movable-seat portion 40x is compressed in the axial direction to cause the downstream-movable-seat portion 320x to be into abutment against the downstream-body-seat portion 140x, bringing the metal seal valve portion into the valve closing state.

Next, a method for manufacturing the fuel injector with the above structure will be described below.

A target set load on the metal seal valve portion comprised of the downstream-body-seat portion 140x and the downstream-movable-seat portion 320x is set to the metal seal valve portion set-load set value F1x. A target set load on the elastic seal valve portion comprised of the upstream-body-seat portion 150x and the upstream-movable-seat portion 40x is set to the elastic seal valve portion set-load set value F2x. The sum of the metal seal valve portion set-load set value F1x and the elastic seal valve portion set-load set value F2x is set as the whole set-load set value Fx.

First, the fifth cylindrical portion 14x, the valve body 3x, the spring 5x, the spring bearing 6x, and the shim 7x are assembled together to cause the spring 5x to urge the valve body 3x to thereby press the downstream-movable-seat portion 320x against the downstream-body-seat portion 140x. At this time, the set length of the spring 5x is adjusted by the shim 7x such that the set load on the spring 5x is a load corresponding to the entire set-load set value Fx.

Subsequently, the second to fourth cylindrical portions 11x to 13x are bonded to the fifth cylindrical portion 14x, and the armature 4x bonded to the upstream-movable-seat portion 40x is bonded to the valve body 3x.

Subsequently, the first cylindrical portion 10x and the sixth cylindrical portion 15x which are previously bonded together are inserted into the second cylindrical portion 11x, and the first cylindrical portion 10x and the sixth cylindrical portion 15x are urged by a jig (not shown) to press the upstream-body-seat portion 150x against the upstream-movable-seat portion 40x. At this time, the jig urges the first and sixth cylindrical portions 10x and 15x by a load corresponding to the elastic seal valve portion set-load set value F2x.

In this state, a force actually pressing the downstream-movable-seat portion 320x against the downstream-body-seat portion 140x is decreased by a force pressing the upstream-body-seat portion 150x against the upstream-movable-seat portion 40x with respect to the set load on the spring 5x, and thus corresponds to the metal seal valve portion set-load set value F1x.

Subsequently, with the state being kept, the first cylindrical portion 10x is integral with the second cylindrical portion 11x by welding. At this time, by the full-circle welding, the airtightness between the first cylindrical portion 10x and the second cylindrical portion 11x is ensured.

Thus, the metal seal valve portion undergoes the load corresponding to the metal seal valve portion set-load set value F1x, and the elastic seal valve portion undergoes the load corresponding to the elastic seal valve portion set-load set value F2x.

In the present embodiment, the pressure receiving area of the elastic seal valve portion is set equal to that of the metal seal valve portion. In this way, the set load on the elastic seal valve portion and the set load on the metal seal valve portion can be set constant regardless of the pressure of a clearance between the elastic seal valve portion and the elastic seal valve portion.

As mentioned above, in the present embodiment, the relative positions of the first cylindrical portion 10x and the second cylindrical portion 11x are adjusted in the assembly stage, which can easily manage the set load on the elastic seal valve portion, and the set load on the metal seal valve portion with high accuracy even though the body 1x or valve body 3x is not processed with high accuracy.

The elastic seal valve portion is positioned above the upstream of the fuel flow with respect to the lift restricting portion 130x of the fourth cylindrical portion 13x and the armature 4x, whereas the metal seal valve portion is disposed downstream of the fuel flow with respect to the spring 5x. As the distance between the elastic seal valve portion and the metal seal valve portion in the axial direction becomes longer, the influence of heat of the combustion gas on the upstream-movable-seat portion 40x can be further reduced.

THIRTEENTH EMBODIMENT

Figure 22:
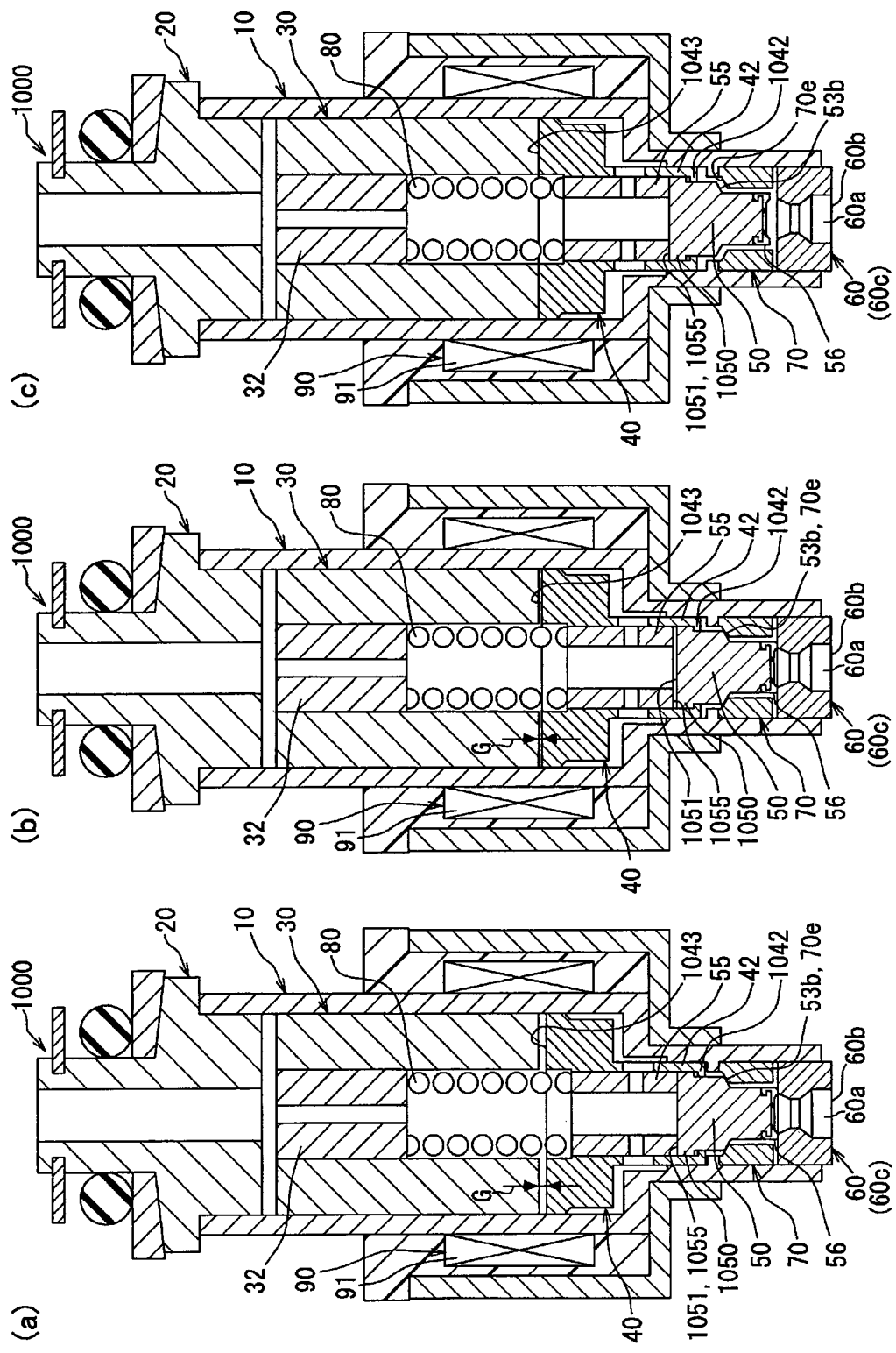
FIGS. 22(*a*), (*b*) and (*c*) are cross-sectional views showing a fuel injector according to a thirteenth embodiment.

FIG. 22 shows a cross-sectional view of a fuel injector 1000 according to the present embodiment. The fuel injector 1000, like the fuel injector 10 of the first embodiment, includes the housing 10, the inlet member 20, the fixed core 30, the movable core 40, the valve body 50, the elastic portion 56, the nozzle member 60, the stopper 70, and the driving unit 90. In FIG. 22, the same components as those shown in FIG. 1 are designated by the same reference numerals to assist the description. That is, the stopper 70 (movement restricting portion) corresponds to the "first body" according to the second invention. The nozzle member 60 (passage formation portion) corresponds to the "second body". In the same way as the above embodiments, the stopper 70 and the nozzle member 60 are separately formed of different materials, and after the formation, those components are integral with each other by welding or the like.

The movable core 40 and the valve body 50 correspond to a "movable portion". The housing 10, the inlet member 20, and the nozzle member 60 correspond to a "body". The elastic portion 56 (elastic member) corresponds to a "downstream-movable-seat portion". The valve seat 60c of the nozzle member 60 corresponds to a "downstream-body-seat portion". The abutment surface 53b of the valve body 50 corresponds to an "upstream-movable-seat portion". The tapered surface 70e of the stopper 70 corresponds to an "upstream-body-seat portion".

The following will mainly refer to different points of the structure of the fuel injector 1000 of the present embodiment shown in FIG. 22 from the fuel injector 10 shown in FIG. 1. In the fuel injector 10 shown in FIG. 1, the valve body 50 reciprocates along the axial direction together with the movable core 40. In the fuel injector 1000 shown in FIG. 22, the valve body 50 is coupled to the movable core 40 in such a manner as to be movable with respect to the movable core 40. That is, the movable core 40 is movable without moving the valve body 50. Conversely, the valve body 50 is movable even when the movable core 40 is being stopped.

In more detail, in the fuel injector 10 shown in FIG. 1, the coupling portion 55 of the valve body 50 are connected to the receiving portion 42 of the movable core 40 by laser welding or the like. In contrast, in the fuel injector 1000 of FIG. 22, the coupling portion 55 is separated from the valve body 50 and connected to the movable core 40. In detail, the coupling portion 55 is welded and connected to the receiving portion 42 of the movable core 40, and the end of the valve body 50 is accommodated in the receiving portion 42 while the movable core is being movable in the axial direction.

A core-side engagement portion 1042 formed in the receiving portion 42 is engaged with a valve body-side engagement portion 1050 formed in the valve body 50 to thereby restrict the relative movement of the valve body 50 in the direction closing the valve. The lower end surface 1055 of the coupling portion 55 is abutted against the upper end surface 1051 of the valve body 50 to restrict the relative movement of the valve body 50 in the valve opening direction.

Figure 23:
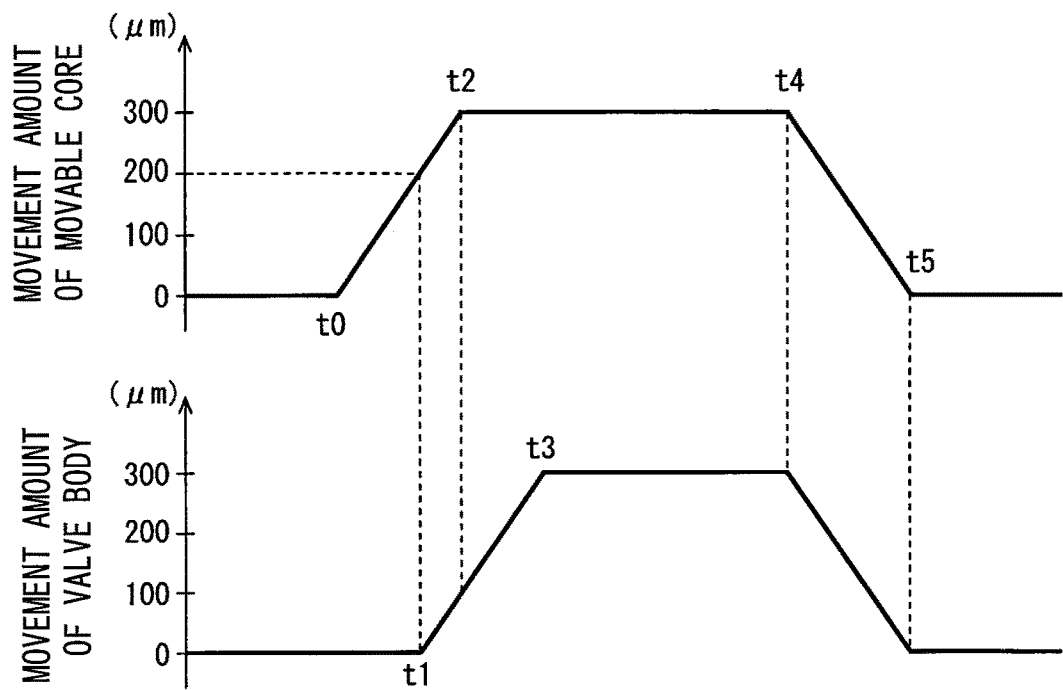
FIG. 23 is a time chart showing the operation of the fuel injector in the thirteenth embodiment.

The operation of the valve body 50 and the movable core 40 which are configured to be relatively movable in this way upon opening the valve will be described below with reference to FIGS. 22(a), 22(b), 22(c), and 23. The upper part of FIG. 23 shows the amount of movement of the movable core 40, and the lower part of FIG. 23 shows the amount of movement of the valve body 50. When the valve body 50 is in the valve closing state, the amount of movement is set to zero. When the energization of the electromagnetic coil 91 for the driving unit 90 is turned off not to attract the movable core 40, the amount of movement is set to zero.

When the energization of the electromagnetic coil 91 is started, first, the movable core 40 is attracted and moved by the fixed core 30. Reference character t0 in FIG. 23 indicates an energization start time. At the energization start time t0, as shown in FIG. 22(a), the core-side engagement portion 1042 is not engaged with the valve-side engagement portion 1050, so that the movable core 40 moves without moving the valve body 50 from the valve closing position.

When the energization of the electromagnetic coil 91 is started, first, the movable core 40 is attracted and moved by the fixed core 30. Reference character t0 in FIG. 23 indicates an energization start time. At the energization start time t0, as shown in FIG. 22(a), the core-side engagement portion 1042 is not engaged with the valve-side engagement portion 1050, so that the movable core 40 moves without moving the valve body 50 from the valve closing position.

Thereafter, when the movable core 40 moves by a predetermined distance, as shown in FIG. 22(b), the core-side engagement portion 1042 is abutted against the valve-body engagement portion 1050, so that both engagement portions 1042 and 1050 are engaged with each other. Thus, after the engagement, the valve body 50 also moves in the valve opening direction by being pulled by the movable core 40 attracted by the fixed core 30. That is, at the time t1 when the movable core 40 is lifted up by 200 mm, both the engagement portions 1042 and 1050 are engaged with each other. Thus, the valve body 50 starts lifting up at the time t1.

A force lifting up the valve body 50 after the time t2 is due to a fuel pressure (lifting-up fuel pressure) applied to the valve body 50 from the injection port 60b in the valve body 50. That is, when the valve body 50 is positioned in the valve closing position, a lifting-up fuel pressure is not applied to a part of the valve body 50 downstream with respect to the abutment surface 53b. However, when the valve body 50 is opened to allow the fuel to flow into the downstream with respect to the abutment surface 53b, the lifting-up fuel pressure is applied to the valve body 50. Thus, even while the movable core 40 is abutted against the fixed core 30 to be stopped, the valve body 50 can be lifted up.

Then, as shown in FIG. 22(c), the upper end surface 1051 of the valve body 50 is abutted against the lower end surface 1055 of the coupling portion 55 to thereby stop lifting up of the valve body 50. In an example shown in FIG. 23, at a time t3 when the valve body 50 is lifted up by 300 mm, the valve body 50 is abutted, thereby stopping the lifting up of the valve body 50. When the energization of the electromagnetic coil 91 is turned off for lifting down, the valve body 50 is also lifted down together with the movable core 40. In the example shown in FIG. 23, at a time t4 when the energization is turned off, both the movable core 40 and the valve body 50 start lifting down, and then at a time t5, the lifting down is ended, whereby the elastic portion 56 sits on the nozzle member 60 to close the valve. When the energization of the electromagnetic coil 91 is turned off for lifting down, the valve body 50 is also lifted down together with the movable core 40. In the example shown in FIG. 23, at a time t4 when the energization is turned off, both the movable core 40 and the valve body 50 start lifting down, and then at a time t5, the lifting down is ended, whereby the elastic portion 56 sits on the nozzle member 60 to close the valve.

Figure 24:
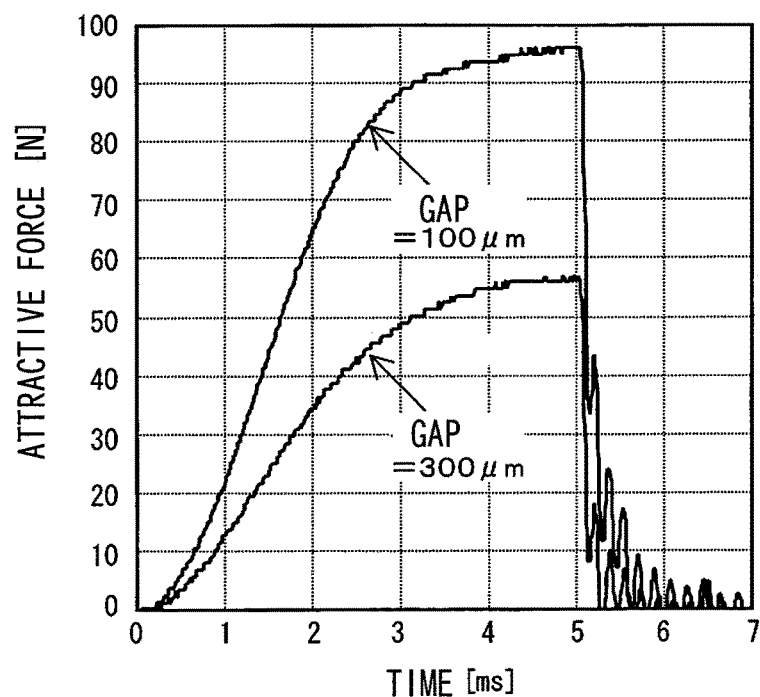
FIG. 24 is a test result showing the relationship between an attraction force generated by electromagnetic force and gaps in the thirteenth embodiment.

As a gap G between the upper end surface 1043 of the movable core 40 and the lower end surface of the fixed core 30 becomes smaller, the force induced by the fixed core 30 to attract the movable core 40 can be made larger. In short, the size of the driving unit 90 can be decreased. FIG. 24 shows the result of a test of changes in attractive force over time with the gap G kept at a predetermined distance when the electromagnetic coil 91 is energized. The test result was obtained by setting the predetermined distance to 100 mm and 300 mm, respectively. In a gap G of 300 mm, the attractive force is about 55 N. In a gap G of 100 mm, the attractive force is about 95 N.

When the gap G becomes smaller, the amount of lifting up of the valve body 50 becomes smaller. The fuel injector 1000 is supposed to inject the gas fuel. Thus, the fuel injector 1000 is required to increase the lift up amount in order to ensure the sufficient injection amount (mass flow rate), as compared to the case where liquid fuel having a large density is injected.

In view of this point, in the present embodiment, at the lifting up start time t0 of the movable core 40, the movable core 40 is lifted up without lifting up the valve body 50. Thus, at the start time t0 with the large gap G, the necessary attractive force can be decreased. At the lift up start time t1 of the valve body 50, the gap G is small as compared to that at the time t0, so that the necessary attractive force can be decreased, as shown in the result of the test in FIG. 24.

In the present embodiment, the valve body 50 is further lifted up even after the end time t2 of the lifting up of the movable core 40. Thus, the amount of lifting up the valve body 50 can be increased without setting the gap G large.

As mentioned above, in the present embodiment, the valve body 50 is coupled to the movable core 40 so as to be movable with respect to the movable core 40, which can suppress the increase in gap G to prevent an increase in size of the driving unit 90, and can also achieve the increase in lifting up of the valve body 50.

FOURTEENTH EMBODIMENT

Figure 25:
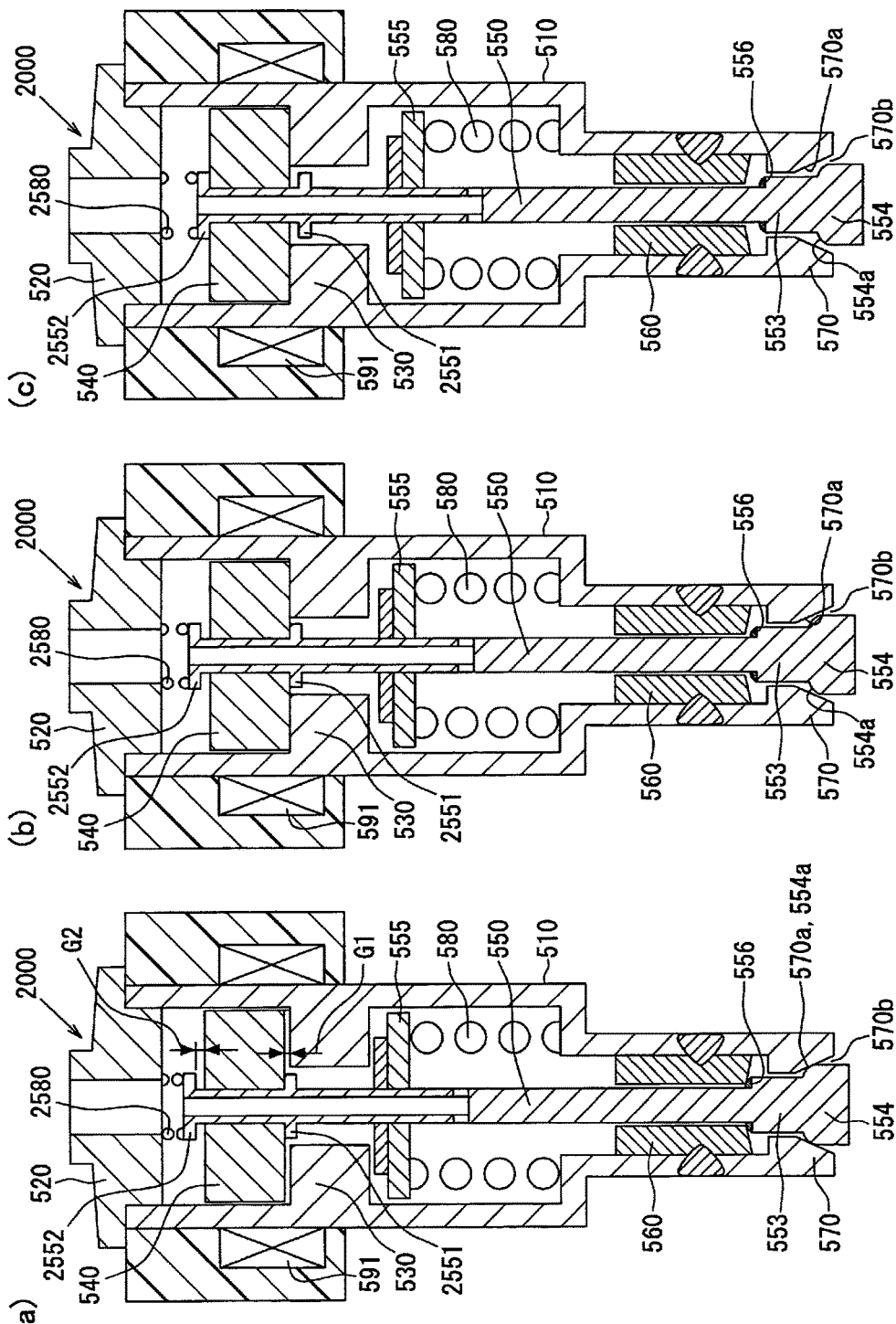
FIGS. 25(*a*), (*b*) and (*c*) are cross-sectional views showing a fuel injector according to a fourteenth embodiment of the invention.

The fuel injector 1000 of the thirteenth embodiment has the inward-opening valve structure for opening and closing the injection port 60b from the upstream. In contrast, a fuel injector 2000 of the present embodiment shown in FIG. 25 has the outward-opening valve for opening and closing the injection port 570b from the downstream. The outward-opening valve structure has the same as that of the fuel injector 500 shown in FIG. 10. In FIG. 25, the same components as those shown in FIG. 10 are designated by the same reference numerals to assist the description.

In contrast, in the fuel injector 2000 of the present embodiment, like the fuel injector 1000 shown in FIG. 22, the valve body 550 is coupled to the movable core 540 in such a manner as to be movable with respect to the movable core 540. That is, the movable core 540 is movable without moving the valve body 550. Conversely, the valve body 550 is movable while the movable core 540 is being stopped.

In more detail, the valve body 550 is provided with a downstream engagement portion 2551, and an upstream engagement portion 2552. The movable core 540 is disposed in between these engagement portions 2551 and 2552. The valve body 550 can be movable relative to the movable core 540 in a range from the position shown in FIG. 25(a) where the downstream engagement portion 2551 is abutted against the lower end surface of the movable core 540, to the position shown in FIG. 25(c) where the upper engagement portion 2552 is abutted against the upper end surface of the movable core 540.

In the following, an operation for opening the fuel injector 2000 will be described.

When the energization of the electromagnetic coil 591 is started, first, the movable core 540 is attracted and moved by the fixed core 530. At the energization start time, as shown in FIG. 25(a), the downstream engagement portion 2551 is abutted against the movable core 540, causing the valve body 550 to be pushed against the movable core 540 and to move in the valve opening direction.

Then, as shown in FIG. 25(b), the lower end surface of the movable core 40 is abutted against the upper end surface of the fixed core 530 to thereby stop the movement of the movable core 540. Also, after the abutment, the valve body 550 continues moving in the valve opening direction.

After the abutment of the movable core 540, the force moving the valve body 550 is an elastic force of a spring 2580. Thus, even though the movable core 540 is abutted against the fixed core 530 to stop its movement, the valve body 550 is movable in the valve opening direction. Thereafter, as shown in FIG. 25(c), the upstream engagement portion 2552 is abutted against the upper end surface of the movable core 540 to thereby stop the movement of the valve body 550.

As mentioned above, in the present embodiment, after the movable core 540 is abutted against the fixed core 530 and ends moving, the valve member 550 also moves by a clearance G2 between the upper end surface of the movable core 540 and the upstream engagement portion 2552 in the valve opening direction. Thus, the amount of valve opening movement of the valve body 550 with respect to the gap G1 between the movable core 540 and the fixed core 530 can be increased by a clearance G2. Thus, the amount of lifting up of the valve body 550 can be increased without setting the gap G1 large.

FIFTEENTH EMBODIMENT

Figure 26:
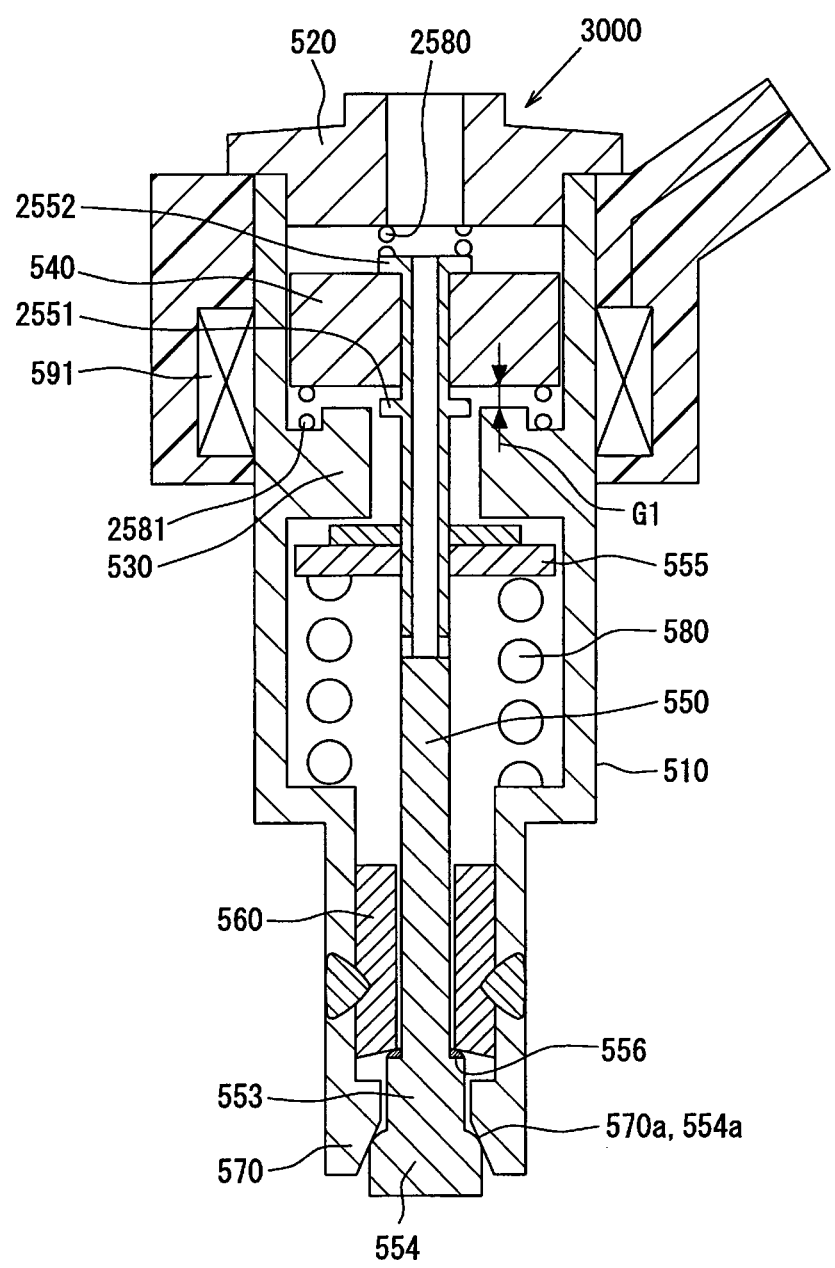
FIG. 26 is a cross-sectional view showing a modification of the fourteenth embodiment.
Figure 27:
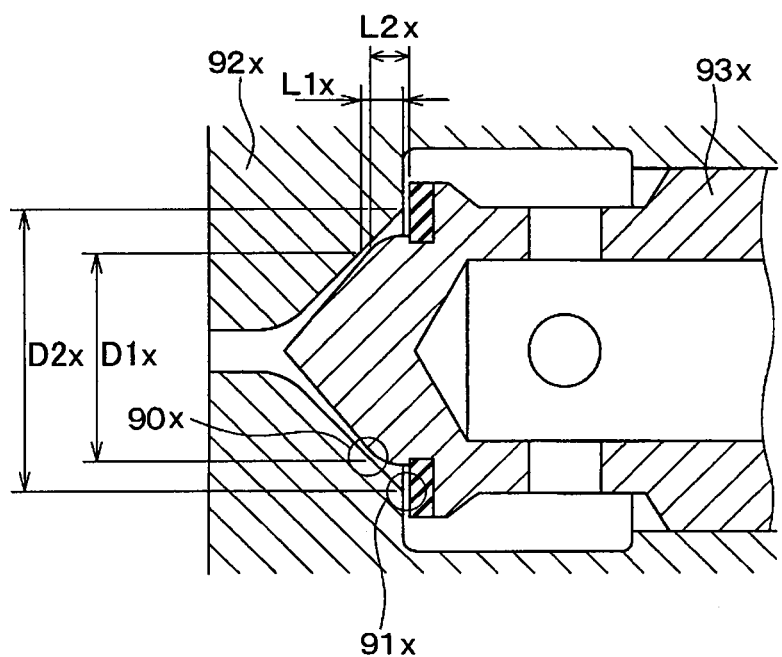
FIG. 27 is a cross-sectional view showing a main part of a conventional fuel injector.

In the present embodiment shown in FIG. 26, a spring 2581 is provided for urging the movable core 540 in the direction away from the fixed core 530. Thus, at a time when the energization of an electromagnetic coil 591 is started, the downstream engaging portion 2551 is spaced away from the movable core 540. Thus, at the energization start time, like the thirteenth embodiment, the movable core 540 is moved without moving the valve body 550.

Thereafter, when the movable core 540 is abutted against a downstream engagement portion 2551, then the valve body 550 starts moving by being pushed by the movable core 540. Then, in the same way as the fourteenth embodiment, after the movable core 540 is abutted against the fixed core 530, the valve body 550 continues moving in the valve opening direction until the upstream engagement portion 2552 is abutted against the upper end surface of the movable core 540.

As mentioned above, according to the present embodiment, at the energization start time, the movable core 540 is moved without moving the valve body 550. Thus, at the start time with the large gap G1, the necessary attractive force can be decreased. At the lift-up start time of the valve body 550, the gap G1 is small as compared to that at the movement start time of the movable core 540, so that the necessary attractive force can be decreased, as shown in the result of the test in FIG. 24.

In the present embodiment, also after the end of movement of the movable core 540, the valve body 550 further moves. Thus, the amount of moving the valve body 550 can be increased without setting the gap G1 large.

As mentioned above, in the present embodiment, the valve body 550 is coupled to the movable core 540 so as to be movable with respect to the movable core 540, which can suppress the increase in gap G1 to prevent an increase in size of the driving unit 90, and can also achieve the increase in amount of lifting up the valve body 550.

OTHER EMBODIMENTS

Although the first to fifteenth embodiments of the disclosure have been explained above, the disclosure is not limited to the first to fifteenth embodiments. It can be understood that various modifications and changes can be made to the embodiments without departing from the scope of the disclosure. For example, the disclosure may be applied to a fuel injector for injecting not gas fuel, but liquid fuel.

In the eleventh embodiment, the fifth cylindrical portion 14x and the sixth cylindrical portion 15x are subjected to the full-circle welding. In the twelfth embodiment, the first cylindrical portion 10x and the second cylindrical portion 11x are subjected to the full-circle welding. Alternatively, these elements may be integral together by the discontinuous welding, and a clearance therebetween may be sealed with a seal member.

In the first to eighth embodiments, the movement restricting portion is positioned such that the movement restricting portion is abutted against the valve member in a position where the crushing margin of the elastic portion is a predetermined value in the state of closing the valve. Alternatively, the movement restricting portion may be positioned without taking into consideration the crushing margin.

In the ninth to twelfth embodiments, one of the upstream-movable-seat portions 40x, 310x, and 311x, and the upstream-body-seat portions 141x, 150x, and 151x is formed of elastic material. The downstream-movable-seat portion 320x and the downstream-body-seat portions 140x and 152x are formed of metal material. In contrast, the arrangement of the elastic material and the metal material may be reversed. That is, one of the upstream-movable-seat portions 40x, 310x, and 311x, and the upstream-body-seat portions 141x, 150x, and 151x is formed of metal material. The downstream-movable-seat portion 320x and the downstream-body-seat portions 140x and 152x are formed of elastic material. While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injector comprising:
a passage formation portion provided in a main body, the passage formation portion having a fuel passage leading to an injection port from which fuel is injected;
a valve member reciprocatingly accommodated in the main body, the valve member being adapted to open and close the fuel passage by reciprocating;
a valve seat formed at a peripheral edge of the fuel passage;
a rubber member that is attached to an end of the valve member in such a manner as to confront the valve seat, the rubber member being elastically deformable by a movement of the valve member in a valve closing direction in closing the fuel passage, the rubber member being adapted to close the fuel passage by being abutted against the valve seat when the valve member moves in the valve closing direction; and
a movement restricting portion provided in the main body for restricting the movement of the valve member in the valve closing direction by being abutted against the valve member, wherein
the movement restricting portion is formed of material different from the passage formation portion,
the movement restricting portion is formed in a cylindrical shape which has a first inner peripheral surface, a second inner peripheral surface, and a surface connecting the first inner peripheral surface to the second inner peripheral surface, an inner diameter of the first inner peripheral surface is larger than an inner diameter of the second inner peripheral surface, and the valve member is configured to abut the surface connecting the first inner peripheral surface to the second inner peripheral surface.

2. A fuel injector according to claim 1, wherein the movement restricting portion is abutted against the valve member in a position where a crushing margin of the elastic member elastically deformed reaches a predetermined value with a fuel passage closed by movement of the valve member to thereby restrict the movement of the valve member in the valve closing direction.

3. A fuel injector according to claim 1, wherein the passage formation portion is located downstream of the movement restricting portion with respect to a fuel flow toward the injection port within the main body.

4. A fuel injector according to claim 3, wherein the movement restricting portion is cylindrically formed to reciprocatingly accommodate the valve member on an inner periphery thereof, and while the valve member is abutted against the movement restricting portion, a clearance is formed between an inner peripheral surface of the movement restricting portion and an outer peripheral surface of the valve member to allow fuel flow into the passage formation portion.

5. A fuel injector according to claim 3, wherein the elastic member is attached to the valve member, the elastic member includes a seat portion protruding toward the passage formation portion on an outer peripheral surface of the elastic member opposed to the passage formation portion, and the seat portion is abutted to enclose an outer periphery of an opening of the fuel passage on the valve member, so that the fuel passage is closed.

6. A fuel injector according to claim 5, wherein the seat portion has a recessed portion of which an inner peripheral surface is inclined such that the recessed portion becomes deeper toward a center in a radial direction of the recessed portion.

7. A fuel injector according to claim 3, wherein the elastic member is attached to the passage formation portion, the elastic member has an opening leading to the fuel passage, the valve member includes a seat portion protruding toward the elastic member on an outer peripheral surface of the valve member opposed to the elastic member, and the seat portion is abutted to enclose an outer periphery of the opening, so that the fuel passage is closed.

8. A fuel injector according to claim 1, wherein the injection port is formed at a downstream end of the fuel passage.

9. A fuel injector according to claim 1, wherein the elastic member has an anchor portion fixed to one of the passage formation portion and the valve member in a direction to intersect a reciprocating direction of the valve body.

10. A fuel injector according to claim 1, wherein the main body is cylindrically formed, and has an opening formed at a downstream end with respect to fuel flow within the main body, one of the movement restricting portion and the passage formation portion is disposed between one end and the other end of the main body in its axial direction, and another of the movement restricting portion and the passage formation portion is formed of a material different from the main body, and is provided in the main body by being inserted into the opening and fixed to the opening.

11. A fuel injector according to claim 10, wherein one of the movement restricting portion and the passage formation portion is formed of a material different from the main body, and a stepped portion is formed between the one end and the other end of the main body in its axial direction, and another one of the movement restricting portion and the passage formation portion is abutted against the stepped portion to be positioned with respect to the main body.

12. A fuel injector according to claim 1, wherein the movement restricting portion is formed of a material different from the main body.

13. A fuel injector according to claim 1, wherein a part of the movement restricting portion abutted against the valve member is formed of a same material as that of a part of the valve member abutted against the movement restricting portion.

14. A fuel injector according to claim 13, wherein at least one of a part of the movement restricting portion abutted against the valve member, and a part of the valve member abutted against the movement restricting portion has a coated layer formed on a surface thereof.

15. A fuel injector according to claim 1, wherein the rubber contains fluoro-rubber.

16. A fuel injector according to claim 1, wherein a gas fuel flows into the main body.

17. A fuel injector according to claim 1, further comprising:

a fixed core fixed to the main body;

a movable core reciprocatingly accommodated in the main body; and an electromagnetic coil for generating an electromagnetic force so as to attract the movable core toward the fixed core, wherein the valve member is coupled to the movable core so as to be relatively movable with respect to the movable core, when the energization of the electromagnetic coil is started, the movable core is attracted and moved to the fixed core and the valve member moves in a valve opening direction, and after the movable core is abutted against the fixed core, the valve member further moves in the valve opening direction.

18. A fuel injector according to claim 17, wherein until the movable core moves by a predetermined distance after a startup of the energization, the movable core moves without moving the valve member, and until the movable core is abutted against the fixed core after moving by the predetermined distance, the movable core moves along with the valve member.

19. A fuel injector according to claim 1, wherein the valve member has a quadrangular prism portion, a columnar portion and a tapered surface connecting the quadrangular prism portion to the columnar portion.

20. A method for manufacturing a fuel injector,
the fuel injector including:
a passage formation portion provided in a main body, the passage formation portion having a fuel passage leading to an injection port from which fuel is injected;
a valve member reciprocatingly accommodated in the main body to open and close the fuel passage by reciprocating;
a valve seat formed at a peripheral edge of the fuel passage;
a rubber member that is attached to an end of the valve member in such a manner as to confront the valve seat, the rubber member being elastically deformable by movement of the valve member in a valve closing direction in closing the fuel passage, the rubber member being adapted to close the fuel passage by being abutted against the valve seat when the valve member moves in the valve closing direction; and
a movement restricting portion provided in the main body, the movement restricting portion being formed of a material different from the passage formation portion, the movement restricting portion is formed in a cylindrical shape which has a first inner peripheral surface, a second inner peripheral surface, and a surface connecting the first inner peripheral surface to the second inner peripheral surface, an inner diameter of the first inner peripheral surface is larger than an inner diameter of the second inner peripheral surface, the valve member is configured to abut the surface connecting the first inner peripheral surface to the second inner peripheral surface, and the movement restricting portion restricting a movement of the valve member in a closing direction of the valve member by being abutted against the valve member in a position where a crushing margin of the rubber member elastically deformed is a predetermined value while the fuel passage is closed by the valve member, the method for manufacturing the fuel injector comprising:

an adjusting step adjusting the crushing margin of the rubber member to the predetermined value by adjusting relative positions of the passage formation portion and the movement restricting portion in a direction along a reciprocating direction of the valve member.

21. A method for manufacturing a fuel injector according to claim 20, wherein the adjustment step includes:

an installing step installing one of the movement restricting portion and the passage formation portion in between one end and another end of the main body in an axial direction; and an inserting step inserting another one of the movement restricting portion and the passage formation portion which are formed of material different from the main body, into an opening of the main body formed at a downstream end of fuel flow within the main body so as to adjust an amount of insertion of another one into the main body.

22. A method for manufacturing a fuel injector according to claim 21, wherein in the installation step, one of the movement restricting portion and the passage formation portion formed of the material different from the main body is abutted against a stepped portion formed between one end and another end of the main body in the axial direction to perform positioning of the one of the movement restricting portion and the passage formation portion with respect to the main body.

23. A method for manufacturing a fuel injector according to claim 20, further comprising:

a relative position fixing step fixing the relative positions of the passage formation portion and the movement restricting portion after the adjustment step.

* * * * *